United States Patent
White et al.

(10) Patent No.: US 8,023,805 B2
(45) Date of Patent: Sep. 20, 2011

(54) SPLICING SYSTEM

(75) Inventors: David White, Dorset (GB); Kevin A. Murray, Fordingbridge (GB); Ezra Darshan, Beit Shemesh (IL); Moshe Shlissel, Jerusalem (IL); David Fink, Efrat (IL); David Whittaker, Watford (GB); Zeev Geyzel, Alon Shvut (IL); Reuven Wachtfogel, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 1247 days.

(21) Appl. No.: 11/628,402

(22) PCT Filed: Jun. 8, 2005

(86) PCT No.: PCT/IL2005/000608
§ 371 (c)(1),
(2), (4) Date: Feb. 21, 2007

(87) PCT Pub. No.: WO2005/122688
PCT Pub. Date: Dec. 29, 2005

(65) Prior Publication Data
US 2008/0044161 A1 Feb. 21, 2008

Related U.S. Application Data

(60) Provisional application No. 60/581,583, filed on Jun. 21, 2004.

(30) Foreign Application Priority Data

Jun. 18, 2004 (GB) .................................. 0413723.8

(51) Int. Cl.
*H04N 5/93* (2006.01)
*H04N 5/917* (2006.01)
(52) U.S. Cl. ........................................ 386/353; 386/356
(58) Field of Classification Search .................. None
See application file for complete search history.

(56) References Cited

U.S. PATENT DOCUMENTS 5,724,091 A 3/1998 Freeman et al.
(Continued)

FOREIGN PATENT DOCUMENTS

CN 1164162 A 11/1997
(Continued)

OTHER PUBLICATIONS

Feb. 25, 2009 Office Communication concerning EP 05 750 203.1-1247.
(Continued)

*Primary Examiner* — Thai Tran
*Assistant Examiner* — Oluwaseun A Adegeye
(74) *Attorney, Agent, or Firm* — Husch Blackwell LLP

(57) ABSTRACT

A method for switching from playing a first compressed data segment to playing a second compressed recorded data segment, the method including playing an uncompressed copy of a start of the second compressed recorded data segment upon switching from playing the first compressed data segment, decoding the second compressed recorded data segment from a preceding random access point, the preceding random access point preceding, in the second compressed recorded data segment, a point at which playing is to be switched to the second compressed recorded data segment, stopping the decoding of the second compressed recorded data segment when reaching a point beyond a point currently being played in the uncompressed copy, and switching to playing the second compressed recorded data segment when playing the uncompressed copy of a start of the second compressed recorded data segment reaches the point at which the decoding of the second compressed recorded data segment was stopped. Related apparatus and methods are also provided.

60 Claims, 38 Drawing Sheets

U.S. PATENT DOCUMENTS

| | | | |
|---|---|---|---|
| 5,774,186 | A | 6/1998 | Brodsky et al. |
| 6,591,013 | B1 | 7/2003 | Taunton |
| 6,628,712 | B1 | 9/2003 | Le Maguet |
| 7,200,859 | B1 * | 4/2007 | Perlman et al. ............... 725/133 |
| 7,272,298 | B1 * | 9/2007 | Lang et al. .................... 386/291 |
| 2002/0080875 | A1 | 6/2002 | Tahara et al. |
| 2002/0097801 | A1 | 7/2002 | Martin |
| 2002/0129374 | A1 | 9/2002 | Freeman et al. |
| 2002/0154694 | A1 | 10/2002 | Birch |
| 2003/0228018 | A1 | 12/2003 | Vince |

FOREIGN PATENT DOCUMENTS

| | | |
|---|---|---|
| EP | 0 989 756 A2 | 3/2000 |
| WO | WO 99/13648 | 3/1999 |
| WO | WO 99/14955 | 3/1999 |
| WO | WO 00/16544 | 3/2000 |

OTHER PUBLICATIONS

Office Communication in connection with Chinese Application No. 2005800201921 (with English translation).

Aug. 28, 2009 Office Communication in connection with Chinese Application No. 2005800201921 (with English translation).

Oct. 17, 2008 transmission of Supplementary European Search Report in connection with counterpart foreign patent application.

Dec. 27, 2010 Office Communication in connection with prosecution of EP 05 750 203.1.

* cited by examiner

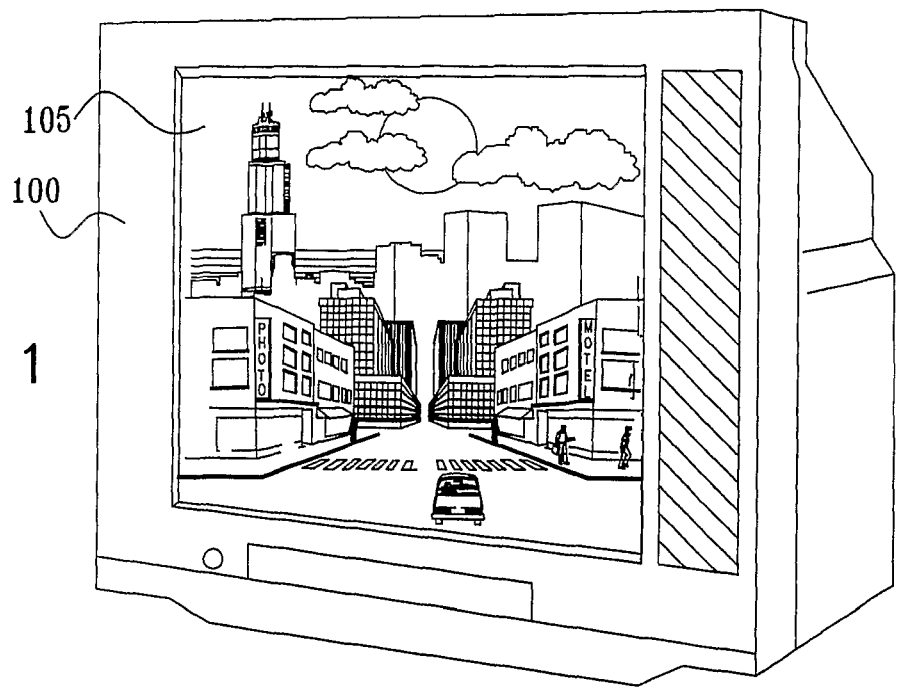
FIG. 1
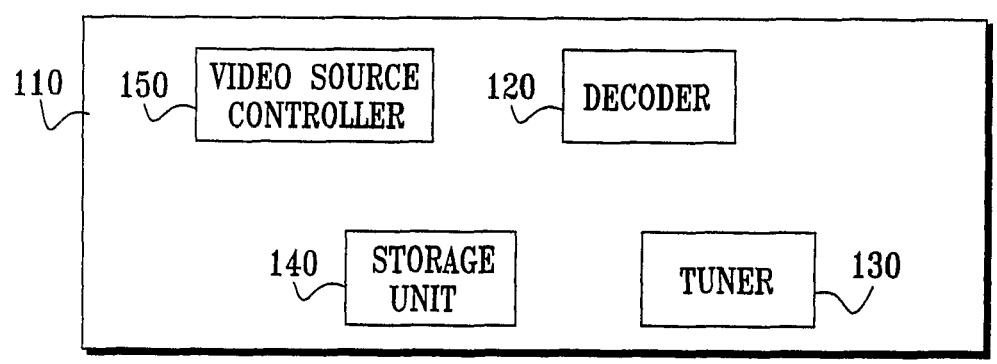

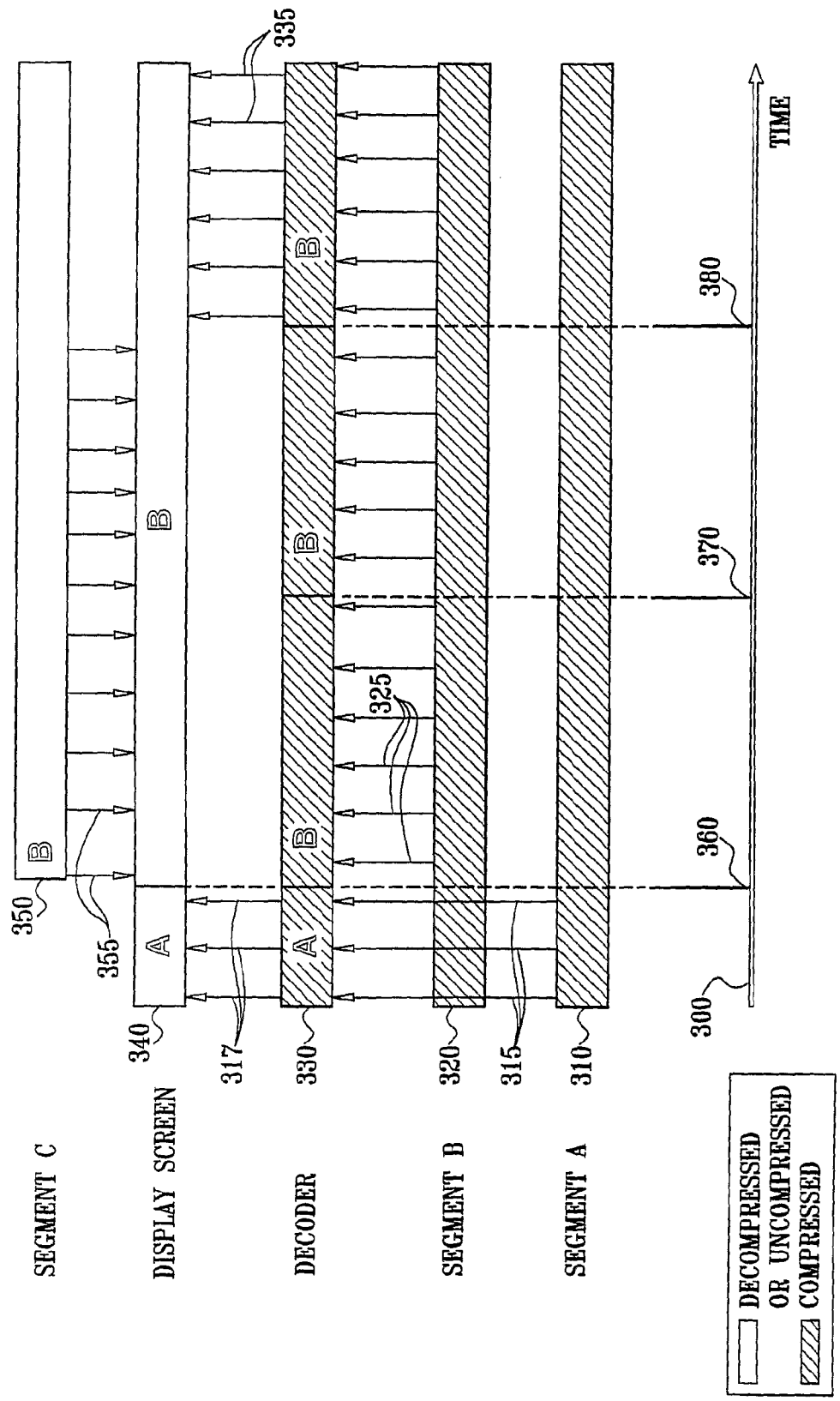

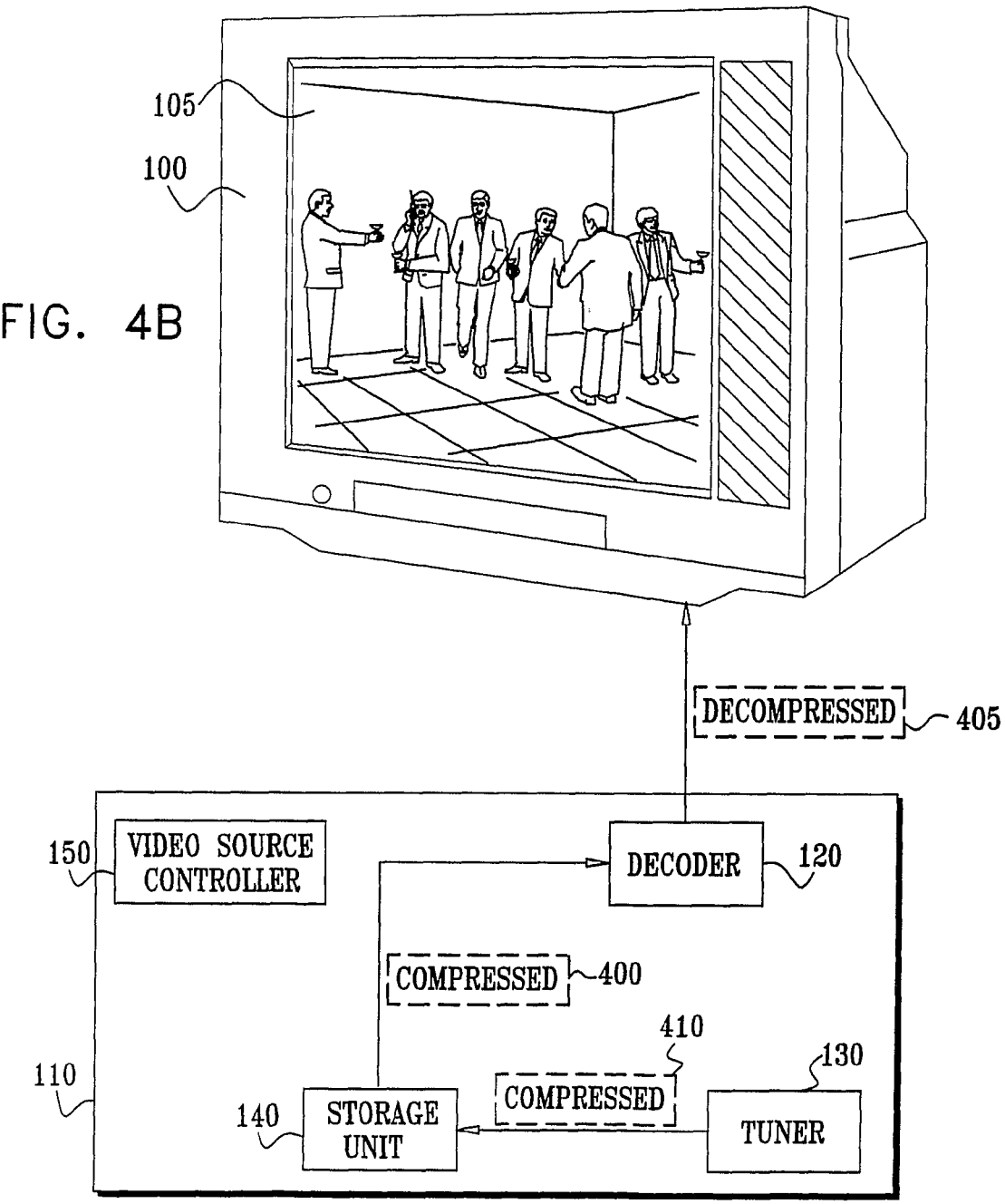

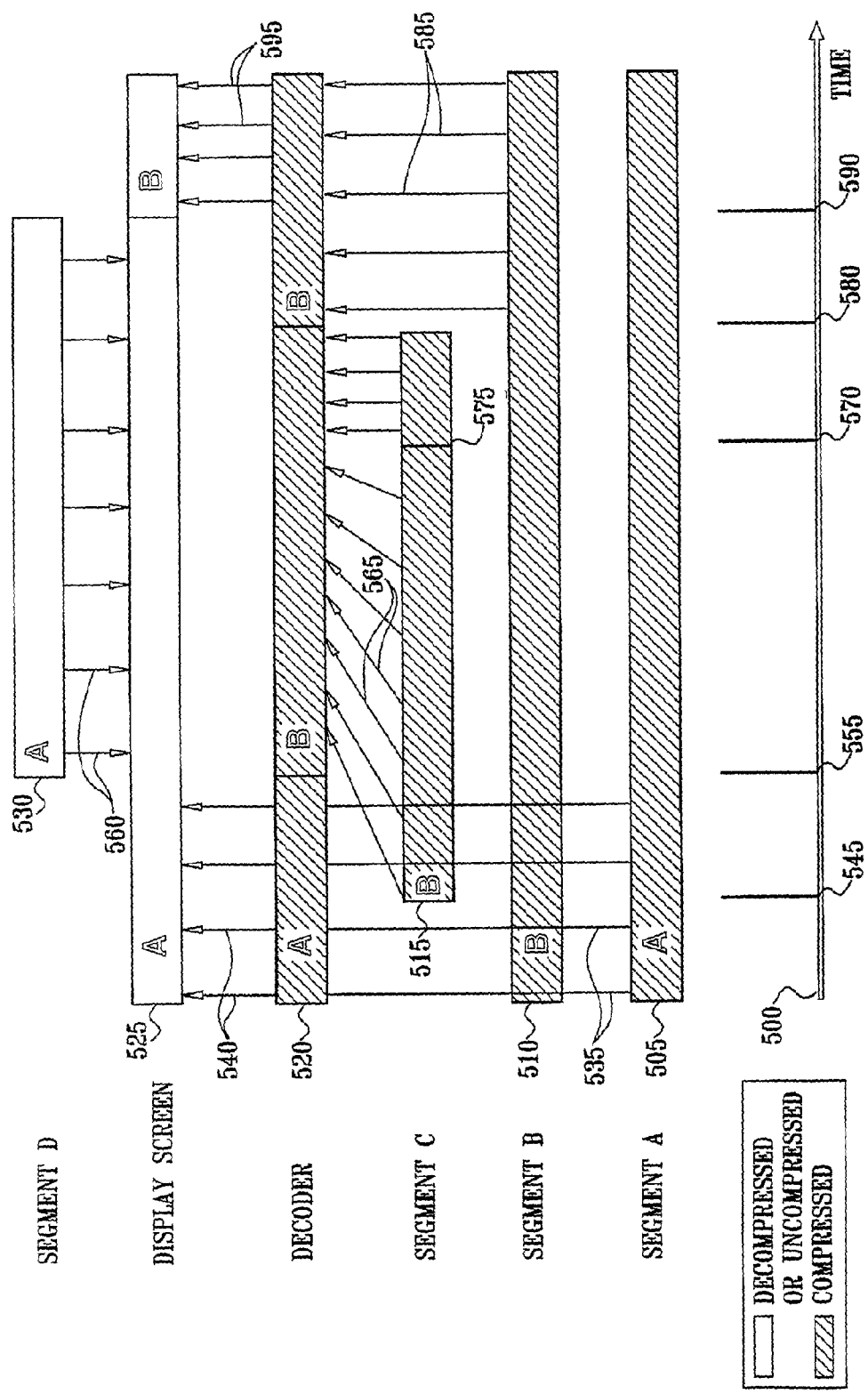

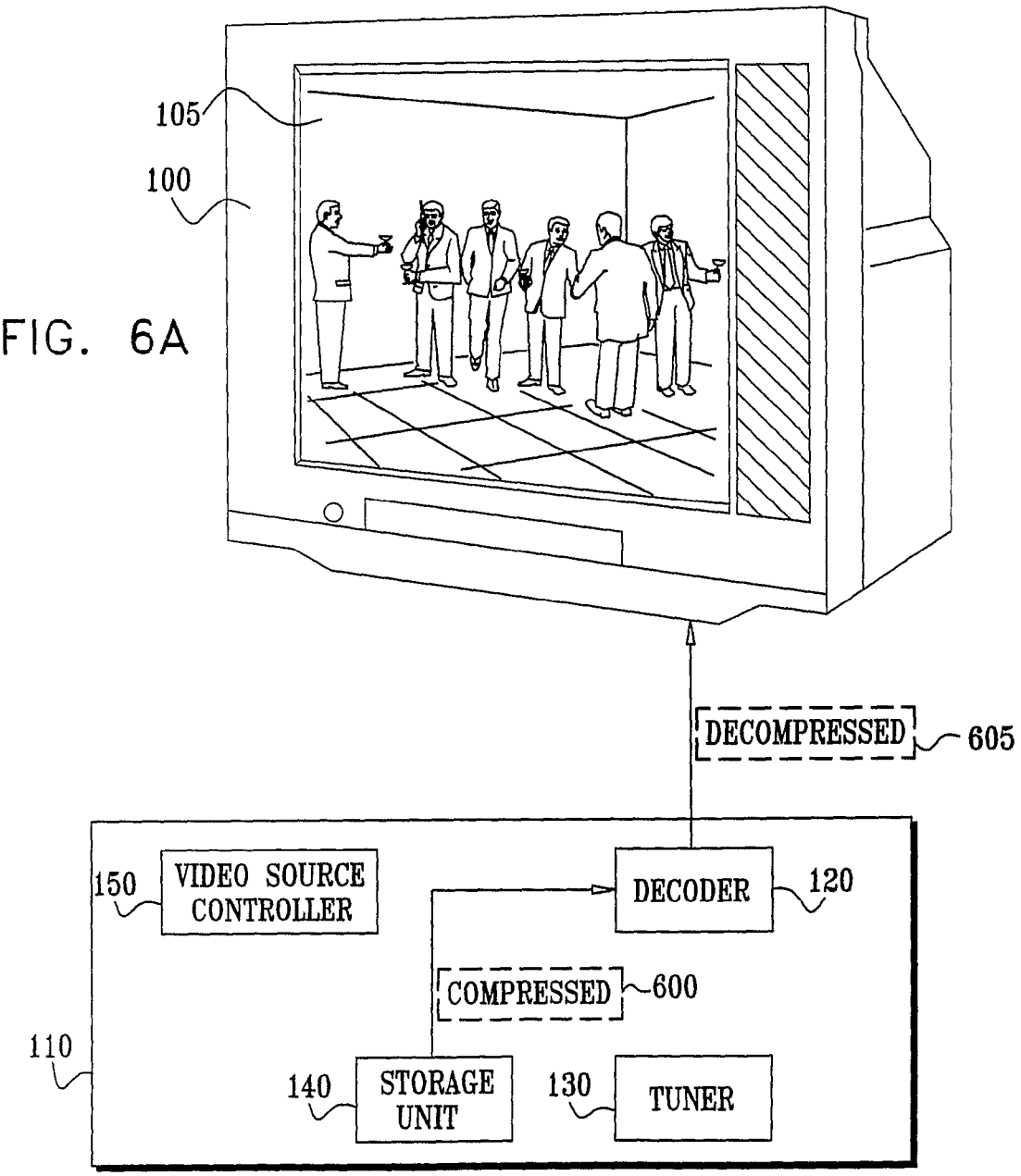

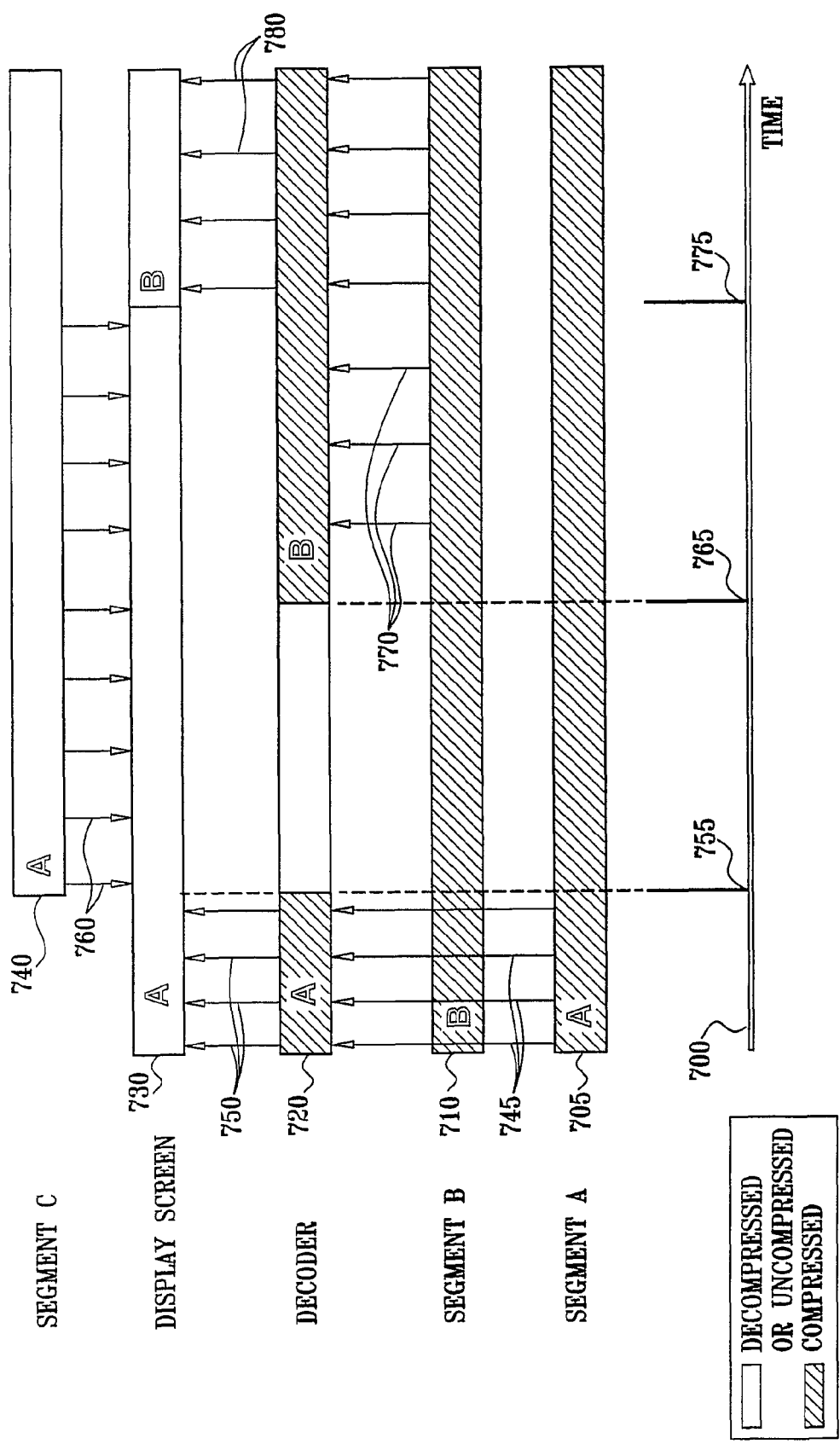

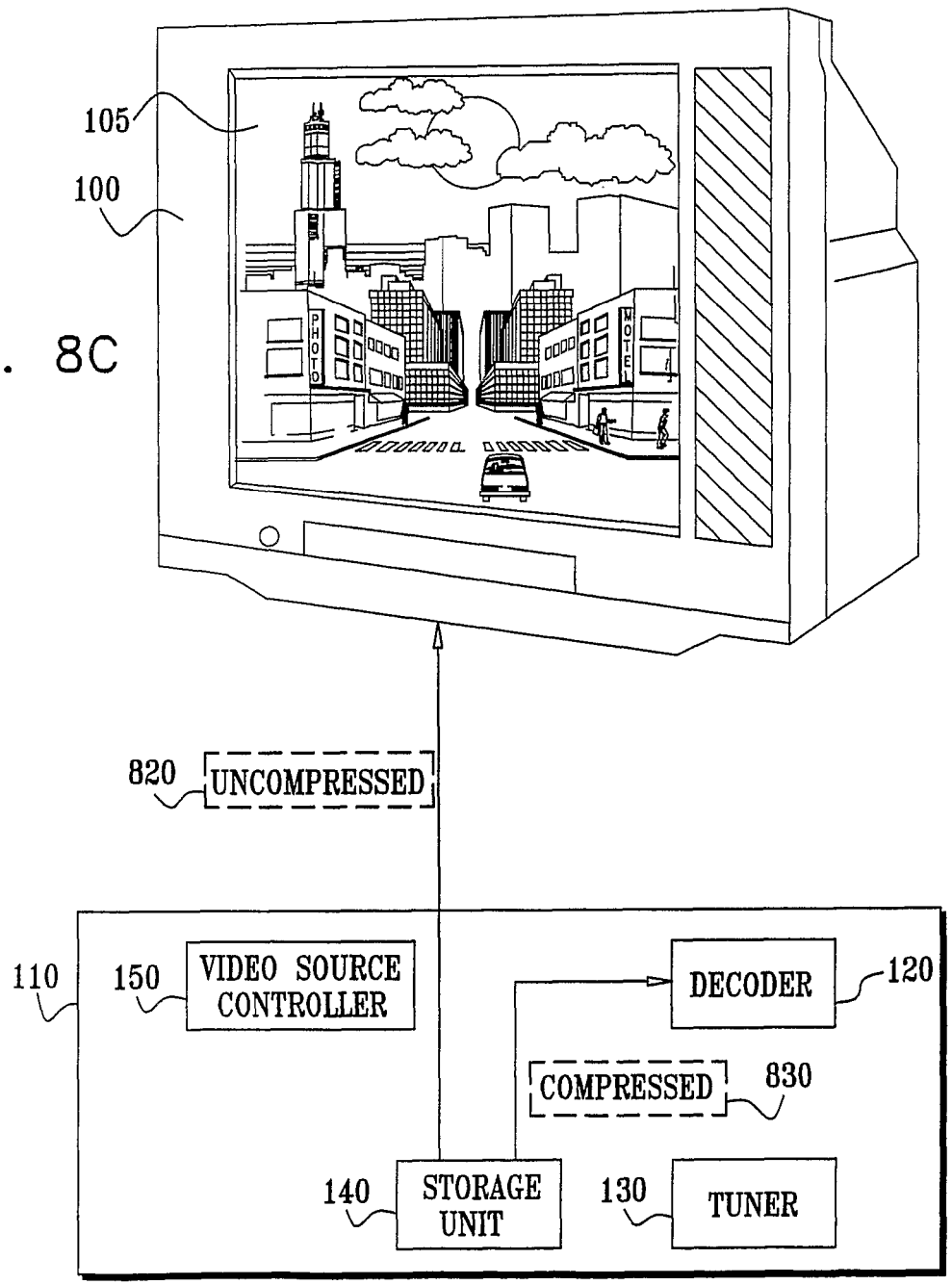

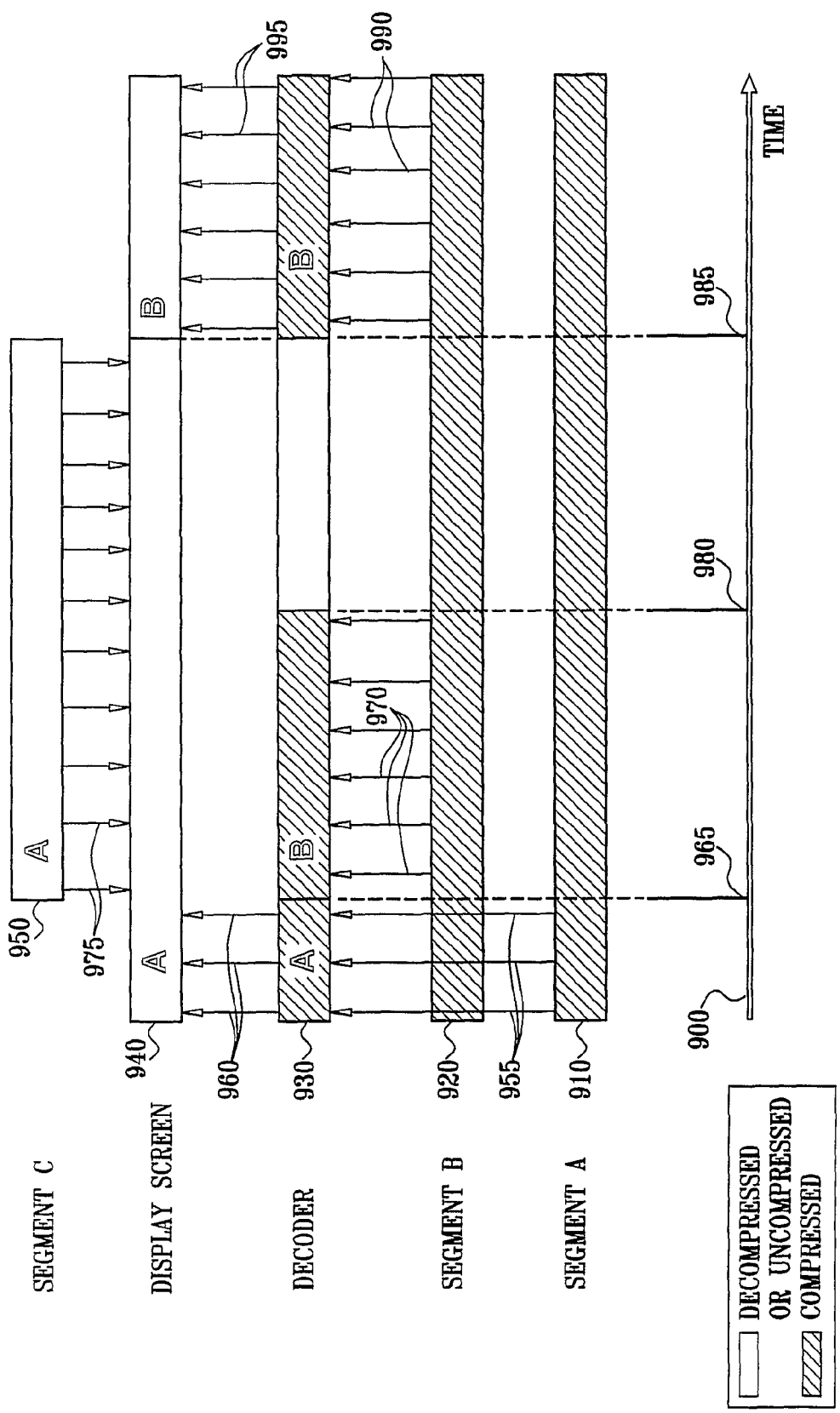

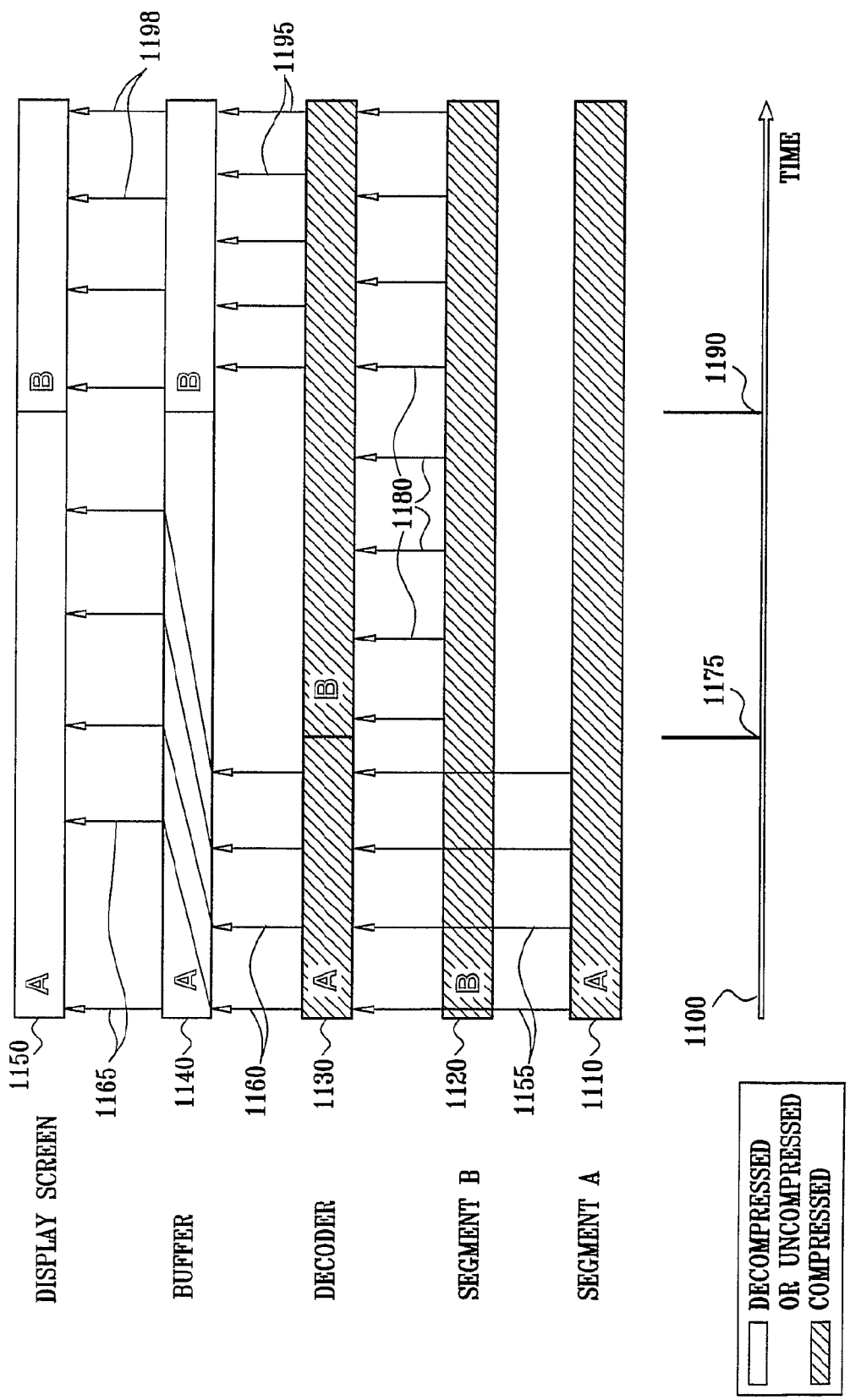

SPLICING SYSTEM

CROSS REFERENCE TO RELATED APPLICATIONS

The present application is a 35 USC §371 application of PCT Patent Application PCT/IL2005/000608, filed on 8 Jun. 2005, published in the English language as WO 2005/122688 on 29 Dec. 2005, which claims priority from the following applications, the disclosures of which are hereby incorporated herein by reference: UK Patent Application No. 0413723.8 of NDS Limited, filed 18 Jun. 2004; and U.S. Provisional Patent Application 60/581,583, of Shlissel, et al., filed 21 Jun. 2004.

FIELD OF THE INVENTION

The present invention relates to systems that utilize compressed information.

BACKGROUND OF THE INVENTION

Digital Video Recorders (DVRs), also known as Personal Video Recorders (PVRs), record streamed compressed digital television broadcasts onto a storage medium, and allow a later playback of such broadcasts. Recordings are decompressed during playback using a decoder which is typically implemented in hardware and is comprised in a Set-Top Box (STB) that comprises a DVR or is associated with a DVR. One example of such a DVR is an XTV™ system, commercially available from NDS Limited, One London Road, Staines, Middlesex, TW18 4EX, United Kingdom.

Common video compression methods include MPEG-1, MPEG-2 and MPEG-4 (MPEG—Moving Picture Experts Group). Such compression methods typically compress video by broadcasting differences between frames of video. A decoder cannot typically immediately start decoding a recording at any arbitrary location; rather the decoding can be started only from specific random access points in a broadcast video stream or, in a case where a DVR is used, from random access points in a video file stored in the DVR. If playing from a specific video frame in a video recording is desired, decoding is performed from a preceding random access point. The decoding can generally run faster than normal speed.

Present generation DVRs typically have only one decoder. Thus, when an STB which includes a DVR or is associated a DVR plays one compressed video segment immediately after another, switching from playing a compressed live video broadcast to playing a compressed recorded video segment, or switching from playing a compressed recorded video segment to playing a compressed live broadcast is not "seamless"; that is, there is a delay between playing the compressed live broadcast and playing the compressed recorded video segment, or between playing the compressed recorded video segment and playing the compressed live broadcast. Such a delay also occurs when switching from playing a first compressed recorded video segment to playing a second compressed recorded video segment.

SUMMARY OF THE INVENTION

The present invention, in preferred embodiments thereof, seeks to provide a method for seamlessly switching between playing a compressed recorded video segment and playing compressed live video, between playing compressed live video and playing a compressed recorded video segment, and between playing a first compressed recorded video segment and playing a second compressed recorded video segment.

In the present invention, in preferred embodiments thereof, a DVR uses a copy of a sub-segment of a video segment to be switched to or from in a format that does not require extensive decompression. One desirable technical effect which results from switching from viewing a video segment to viewing a copy of a sub-segment of the video segment is provision of a frame synchronous presentation so that a viewer does not see any transitional effect. Such a copy may include uncompressed video, or video compressed using a simple algorithm, such as, for example, Huffman coding, for which decompression can be performed simply and quickly without requiring a decoder. Such a copy is referred to throughout the present specification and claims as an "Uncompressed Copy". The Uncompressed Copy may, for example, include an Uncompressed Copy of a start of a video segment or an Uncompressed Copy of an end of a video segment.

Systems other than video systems which utilize compressed information, compressed into "packets" or "frames", can also use the current invention to enable seamlessly switching between playing one compressed information stream to playing another compressed information stream.

The term "frame" in all its grammatical forms is used throughout the present specification and claims interchangeably with the term "packet" and its corresponding grammatical forms.

There is thus provided in accordance with a preferred embodiment of the present invention a method for switching from playing a first compressed data segment to playing a second compressed recorded data segment, the method including playing an uncompressed copy of a start of the second compressed recorded data segment upon switching from playing the first compressed data segment, decoding the second compressed recorded data segment from a preceding random access point, the preceding random access point preceding, in the second compressed recorded data segment, a point at which playing is to be switched to the second compressed recorded data segment, stopping the decoding of the second compressed recorded data segment when reaching a point beyond a point currently being played in the uncompressed copy, and switching to playing the second compressed recorded data segment when playing the uncompressed copy of a start of the second compressed recorded data segment reaches the point at which the decoding of the second compressed recorded data segment was stopped.

There is also provided in accordance with another preferred embodiment of the present invention a method for switching from playing a first compressed data segment to playing a second compressed recorded data segment, the method including playing an uncompressed copy of a start of the second compressed recorded data segment upon switching from playing the first compressed data segment, decoding the second compressed recorded data segment from a preceding random access point, the preceding random access point preceding, in the second compressed recorded data segment, a point at which playing is to be switched to the second compressed recorded data segment, and switching to playing the second compressed recorded data segment when the decoding the second compressed recorded data segment reaches a point currently being played in the uncompressed copy of a start of the second compressed recorded data segment.

Further in accordance with a preferred embodiment of the present invention the first compressed data segment includes a first compressed recorded data segment.

Still further in accordance with a preferred embodiment of the present invention the first compressed data segment includes a compressed broadcast data segment.

Additionally in accordance with a preferred embodiment of the present invention the second compressed data segment includes a compressed broadcast data segment.

Moreover in accordance with a preferred embodiment of the present invention the first compressed data segment includes a compressed live broadcast data segment.

Further in accordance with a preferred embodiment of the present invention the preceding random access point precedes the start of the uncompressed copy.

Still further in accordance with a preferred embodiment of the present invention the preceding random access point corresponds with the start of the uncompressed copy.

Additionally in accordance with a preferred embodiment of the present invention the preceding random access point follows the start of the uncompressed copy.

Moreover in accordance with a preferred embodiment of the present invention the decoding includes decoding the compressed recorded data segment from the preceding random access point at a faster than normal speed.

There is also provided in accordance with another preferred embodiment of the present invention a method for switching from playing a compressed recorded data segment to playing a compressed live data broadcast, the method including playing a portion of the compressed recorded data segment, recording the compressed live data broadcast before reaching the end of playing the compressed recorded data segment, thereby ensuring that a random access point is encountered in the compressed live data broadcast before reaching the end of playing the compressed recorded data segment, switching to playing an uncompressed copy of an end of the compressed recorded data segment before reaching the end of the compressed recorded data segment, decoding the recording of the compressed live data broadcast from the random access point until a point catching up with the compressed live data broadcast, and switching to playing the compressed live data broadcast when playing of the uncompressed copy of the end of the compressed recorded data segment ends.

There is also provided in accordance with still another preferred embodiment of the present invention a method for switching from playing a compressed recorded data segment to playing a compressed live data broadcast, the method including playing a portion of the compressed recorded data segment, recording the compressed live data broadcast before reaching the end of playing the compressed recorded data segment, thereby ensuring that a random access point is encountered in the compressed live data broadcast before the end of playing the compressed recorded data segment, switching to playing an uncompressed copy of an end of the compressed recorded data segment before reaching the end of the compressed recorded data segment, decoding the recording of the compressed live data broadcast from the random access point until a point catching up with the compressed live data broadcast, and switching to playing the compressed live data broadcast.

Further in accordance with a preferred embodiment of the present invention the decoding includes decoding the recording of the compressed live data broadcast from the random access point at a faster than normal speed.

There is also provided in accordance with another preferred embodiment of the present invention a method for switching from playing a first compressed recorded data segment to playing a second compressed "live" data segment, the method including playing a portion of the first compressed recorded data segment, switching to playing an uncompressed copy of an end of the first compressed recorded data segment before reaching the end of the first compressed recorded data segment, decoding the second compressed "live" data segment from a first random access point in the second compressed "live" data segment, and switching to playing the second compressed "live" data segment when the decoding of the second compressed "live" data segment reaches a point at which playing is to be switched to the second compressed "live" data segment.

There is also provided in accordance with still another preferred embodiment of the present invention a method for switching from playing a first compressed recorded data segment to playing a second compressed "live" data segment, the method including playing a portion of the first compressed recorded data segment, playing an uncompressed copy of an end of the first compressed recorded data segment before reaching the end of the first compressed recorded data segment, decoding the second compressed "live" data segment from a first random access point in the second compressed "live" data segment, and switching to playing the second compressed "live" data segment when playing of the uncompressed copy of the end of the first compressed recorded data segment ends.

Further in accordance with a preferred embodiment of the present invention the decoding includes decoding the second compressed "live" data segment from the first random access point at a faster than normal speed.

There is also provided in accordance with another preferred embodiment of the present invention a method for switching from playing a first compressed recorded data segment to playing a second compressed recorded data segment, the method including playing a portion of the first compressed recorded data segment, switching to playing an uncompressed copy of an end of the first compressed recorded data segment before reaching the end of the first compressed recorded data segment, decoding the second compressed recorded data segment from a random access point, the random access point preceding or corresponding to, in the second compressed recorded data segment, a point at which playing is to be switched to the second compressed recorded data segment, and switching to playing the second compressed recorded data segment when the decoding of the second compressed recorded data segment reaches the point at which playing is to be switched to the second compressed recorded data segment.

There is also provided in accordance with still another preferred embodiment of the present invention a method for switching from playing a first compressed recorded data segment to playing a second compressed recorded data segment, the method including playing a portion of the first compressed recorded data segment, switching to playing an uncompressed copy of an end of the first compressed recorded data segment before reaching the end of the first compressed recorded data segment, decoding the second compressed recorded data segment from a random access point, the random access point preceding or corresponding to, in the second compressed recorded data segment, a point at which playing is to be switched to the second compressed recorded data segment, stopping decoding at the point at which playing is to be switched to the second compressed recorded data segment, and switching to playing the second compressed recorded data segment when playing of the uncompressed copy of the end of the first compressed recorded data segment ends.

There is also provided in accordance with another preferred embodiment of the present invention a method for switching from playing a first compressed recorded data segment to playing a second compressed recorded data segment, the method including playing a portion of the first compressed recorded data segment, switching to playing an uncompressed copy of an end of the first compressed recorded data segment before reaching the end of the first compressed recorded data segment, decoding the second compressed recorded data segment from a random access point, the random access point preceding or corresponding to, in the second compressed recorded data segment, a point at which playing is to be switched to the second compressed recorded data segment, stopping decoding at the point at which playing is to be switched to the second compressed recorded data segment, and switching to playing the second compressed recorded data segment some time before playing of the uncompressed copy of the end of the first compressed recorded data segment ends.

Further in accordance with a preferred embodiment of the present invention the decoding includes decoding the second compressed recorded data segment from a preceding random access point at a faster than normal speed.

There is also provided in accordance with another preferred embodiment of the present invention a method for switching from playing a first compressed data segment to playing a second compressed data segment, the method including decoding the first compressed data segment into a first portion of a buffer, playing the first data segment from the first portion of the buffer, while continuing to play the first data segment from the first portion of the buffer, ceasing to decode the first compressed data segment into the first portion of the buffer; decoding the second compressed data segment into a second portion of the buffer; and when a switching point is reached, ceasing to play the first data segment from the first portion of the buffer; and playing the second data segment from the second portion of the buffer.

Further in accordance with a preferred embodiment of the present invention the first compressed data segment includes a first compressed recorded data segment.

Still further in accordance with a preferred embodiment of the present invention the decoding the second compressed data segment into a second portion of the buffer includes decoding the second compressed data segment at a faster than normal speed.

There is also provided in accordance with another preferred embodiment of the present invention a method for switching from playing a first compressed data segment to playing a second compressed data segment, the method including decoding the first compressed data segment into a buffer, playing the first data segment from the buffer, while continuing to play the first data segment from the buffer, ceasing to decode the first compressed data segment into the buffer, decoding the second compressed data segment, and when a switching point is reached, ceasing to play the first data segment from the buffer, and playing the second video segment.

Further in accordance with a preferred embodiment of the present invention the second compressed data segment includes a second compressed live broadcast data segment.

Still further in accordance with a preferred embodiment of the present invention the switching point is reached as soon as the decoding the second compressed data segment has decoded enough of the second compressed data segment to be played.

Additionally in accordance with a preferred embodiment of the present invention the switching point is reached when the playing the first data segment from the first portion of the buffer has reached the end of the first data segment.

Moreover in accordance with a preferred embodiment of the present invention the broadcast includes a digital terrestrial broadcast.

Further in accordance with a preferred embodiment of the present invention the broadcast includes a satellite broadcast.

Still further in accordance with a preferred embodiment of the present invention the broadcast includes a cable broadcast.

Additionally in accordance with a preferred embodiment of the present invention the broadcast includes an Internet broadcast.

Moreover in accordance with a preferred embodiment of the present invention the broadcast includes a 3GPP broadcast.

Further in accordance with a preferred embodiment of the present invention the broadcast includes a 3GPP2 broadcast.

Still further in accordance with a preferred embodiment of the present invention the broadcast includes a DVB-H broadcast.

Additionally in accordance with a preferred embodiment of the present invention the broadcast includes a DMB broadcast.

Moreover in accordance with a preferred embodiment of the present invention the broadcast includes a DAB broadcast.

Further in accordance with a preferred embodiment of the present invention the data includes digital video.

Still further in accordance with a preferred embodiment of the present invention the data includes digital audio.

Additionally in accordance with a preferred embodiment of the present invention the data includes MPEG-2 encoded data.

Moreover in accordance with a preferred embodiment of the present invention the data includes MPEG-4 encoded data.

There is also provided in accordance with another preferred embodiment of the present invention apparatus for switching from playing a first compressed data segment to playing a second compressed recorded data segment which includes a source controller which plays an uncompressed copy of a start of the second compressed recorded data segment upon switching from playing the first compressed data segment, and a decoder which, under control of the source controller, decodes the second compressed recorded data segment from a preceding random access point, the preceding random access point preceding, in the second compressed recorded data segment, a point at which playing is to be switched to the second compressed recorded data segment, and stops the decoding of the second compressed recorded data segment upon receiving a signal from the source controller indicating that a point has been reached beyond a point currently being played in the uncompressed copy, wherein the source controller switches to playing the second compressed recorded data segment when playing of the uncompressed copy reaches a point at which the decoding of the second compressed recorded data segment was stopped.

There is also provided in accordance with still another preferred embodiment of the present invention apparatus for switching from playing a first compressed data segment to playing a second compressed recorded data segment which includes a source controller which plays an uncompressed copy of a start of the second compressed recorded data segment upon switching from playing the first compressed data segment, and a decoder which, under control of the source controller, decodes the second compressed recorded data segment from a preceding random access point, the preceding random access point preceding, in the second compressed recorded data segment, a point at which playing is to be switched to the second compressed recorded data segment, wherein the source controller switches to playing the second compressed recorded data segment when the decoder which decodes the second compressed recorded data segment reaches a point currently being played in the uncompressed copy of a start of the second compressed recorded data segment.

There is also provided in accordance with another preferred embodiment of the present invention apparatus for switching from playing a compressed recorded data segment to playing a compressed live data broadcast which includes a source controller which plays a portion of the compressed recorded data segment, a recorder which, under control of the source controller, records the compressed live data broadcast before the source controller reaches the end of playing the compressed recorded data segment, thereby ensuring that a random access point is encountered in the compressed live data broadcast before the source controller reaches the end of playing the compressed recorded data segment, and a decoder which is operative to decode compressed data, wherein the source controller switches to playing an uncompressed copy of an end of the compressed recorded data segment before the source controller has reached the end of the compressed recorded data segment, the decoder, under control of the source controller, decodes the recording of the compressed live data broadcast from the random access point until a point catching up with the compressed live data broadcast, and the source controller switches to playing the compressed live data broadcast when playing of the uncompressed copy of the end of the compressed recorded data segment ends.

There is also provided in accordance with still another preferred embodiment of the present invention apparatus for switching from playing a compressed recorded data segment to playing a compressed live data broadcast which includes a source controller which plays a portion of the compressed recorded data segment, a recorder which, under control of the source controller, records the compressed live data broadcast before the source controller reaches the end of playing the compressed recorded data segment, thereby ensuring that a random access point is encountered in the compressed live data broadcast before the source controller reaches the end of playing the compressed recorded data segment, and a decoder which is operative to decode compressed data, wherein the source controller switches to playing an uncompressed copy of an end of the compressed recorded data segment before reaching the end of the compressed recorded data segment, the decoder, under control of the source controller, decodes the recording of the compressed live data broadcast from the random access point until a point catching up with the compressed live data broadcast, and the source controller switches to playing the compressed live data broadcast.

There is also provided in accordance with another preferred embodiment of the present invention apparatus for switching from playing a first compressed recorded data segment to playing a second compressed "live" data segment which includes a source controller which plays a portion of the first compressed recorded data segment, and switches to playing an uncompressed copy of an end of the first compressed recorded data segment before reaching the end of the first compressed recorded data segment, and a decoder which, under control of the source controller, decodes the second compressed "live" data segment from a first random access point in the second compressed "live" data segment, wherein the source controller switches to playing the second compressed "live" data segment when the decoder which decodes the second compressed "live" data segment reaches a point at which playing is to be switched to the second compressed "live" data segment.

There is also provided in accordance with still another preferred embodiment of the present invention apparatus for switching from playing a first compressed recorded data segment to playing a second compressed "live" data segment which includes a source controller which plays a portion of the first compressed recorded data segment, and switches to playing an uncompressed copy of an end of the first compressed recorded data segment before reaching the end of the first compressed recorded data segment, and a decoder which, under control of the source controller, decodes the second compressed "live" data segment from a first random access point in the second compressed "live" data segment, wherein the source controller switches to playing the second compressed "live" data segment when playing of the uncompressed copy of the end of the first compressed recorded data segment ends.

There is also provided in accordance with another preferred embodiment of the present invention apparatus for switching from playing a first compressed recorded data segment to playing a second compressed recorded data segment which includes a source controller which plays a portion of the first compressed recorded data segment, and switches to playing an uncompressed copy of an end of the first compressed recorded data segment before reaching the end of the first compressed recorded data segment, and a decoder which, under control of the source controller, decodes the second compressed recorded data segment from a random access point, the random access point preceding or corresponding to, in the second compressed recorded data segment, a point at which playing is to be switched to the second compressed recorded data segment, wherein the source controller switches to playing the second compressed recorded data segment when the decoder which decodes the second compressed recorded data segment reaches the point at which playing is to be switched to the second compressed recorded data segment.

There is also provided in accordance with still another preferred embodiment of the present invention apparatus for switching from playing a first compressed recorded data segment to playing a second compressed recorded data segment which includes a source controller which plays a portion of the first compressed recorded data segment, and switches to playing an uncompressed copy of an end of the first compressed recorded data segment before reaching the end of the first compressed recorded data segment, and a decoder which, under control of the source controller decodes the second compressed recorded data segment from a random access point, the random access point preceding or corresponding to, in the second compressed recorded data segment, a point at which playing is to be switched to the second compressed recorded data segment, and stops decoding upon receiving a signal from the source controller indicating that a point has been reached at which playing is to be switched to the second compressed recorded data segment, wherein the source controller switches to playing the second compressed recorded data segment when playing of the uncompressed copy of the end of the first compressed recorded data segment ends.

There is also provided in accordance with another preferred embodiment of the present invention apparatus for switching from playing a first compressed recorded data segment to playing a second compressed recorded data segment which includes a source controller which plays a portion of the first compressed recorded data segment, and switches to playing an uncompressed copy of an end of the first compressed recorded data segment before reaching the end of the first compressed recorded data segment, and a decoder which, under control of the source controller decodes the second compressed recorded data segment from a random access point, the random access point preceding or corresponding to, in the second compressed recorded data segment, a point at which playing is to be switched to the second compressed recorded data segment, and stops decoding upon receiving a signal from the source controller indicating that a point has been reached at which playing is to be switched to the second compressed recorded data segment, wherein the source controller switches to playing the second compressed recorded data segment some time before playing of the uncompressed copy of the end of the first compressed recorded data segment ends.

There is also provided in accordance with still another preferred embodiment of the present invention apparatus for switching from playing a first compressed data segment to playing a second compressed data segment which includes a decoder which, under control of the source controller, decodes the first compressed data segment into a first portion of a buffer, and a source controller which plays the first data segment from the first portion of the buffer, wherein, while the source controller continues to play the first data segment from the first portion of the buffer, the decoder, under control of the source controller, ceases to decode the first compressed data segment into the first portion of the buffer, and decodes the second compressed data segment into a second portion of the buffer, and wherein, when a switching point is reached, the source controller ceases to play the first data segment from the first portion of the buffer, and plays the second data segment from the second portion of the buffer.

There is also provided in accordance with another preferred embodiment of the present invention apparatus for switching from playing a first compressed data segment to playing a second compressed data segment which includes a decoder which, under control of the source controller, decodes the first compressed data segment into a buffer, and a source controller which plays the first data segment from the buffer, wherein, while the source controller continues to play the first data segment from the buffer, the decoder, under control of the source controller, ceases to decode the first compressed data segment into the buffer, and decodes the second compressed data segment, and when a switching point is reached, the source controller ceases to play the first data segment from the buffer, and plays the second data segment.

BRIEF DESCRIPTION OF THE DRAWINGS

The present invention will be understood and appreciated more fully from the following detailed description, taken in conjunction with the drawings in which:

FIG. 1 is a simplified pictorial illustration of a system for switching between different types of video content, the system being constructed and operative in accordance with a preferred embodiment of the present invention;

FIG. 3 is a simplified pictorial illustration of a timeline of switching from playing a first compressed video segment to playing a second compressed video segment, useful in understanding the preferred mode of operation of the system of FIG. 1 shown in FIGS. 2A-2D;

FIGS. 4A-4E are simplified pictorial illustrations of an alternative preferred mode of operation of the system of FIG. 1;

FIG. 5 is a simplified pictorial illustration of a timeline of switching from playing a first compressed video segment to playing a second compressed video segment, useful in understanding the preferred mode of operation of the system of FIG. 1 depicted in FIGS. 4A-4E;

FIGS. 6A-6D are simplified pictorial illustrations of another alternative preferred mode of operation of the system of FIG. 1;

FIG. 7 is a simplified pictorial illustration of a timeline of switching from playing a first compressed video segment to playing a second compressed video segment, useful in understanding the preferred mode of operation of the system of FIG. 1 depicted in FIGS. 6A-6D;

FIGS. 8A-8D are simplified pictorial illustrations of still another alternative preferred mode of operation of the system of FIG. 1;

FIG. 9 is a simplified pictorial illustration of a timeline of switching from playing a first compressed video segment to playing a second compressed video segment, useful in understanding the preferred mode of operation of the system of FIG. 1 depicted in FIGS. 8A-8D;

FIG. 11 is a simplified pictorial illustration of a timeline of switching from playing a first compressed video segment to playing a second compressed video segment, useful in understanding the preferred mode of operation of the system of FIG. 1 depicted in FIGS. 10A-10D.

DETAILED DESCRIPTION OF PREFERRED EMBODIMENTS

Figure 2A:
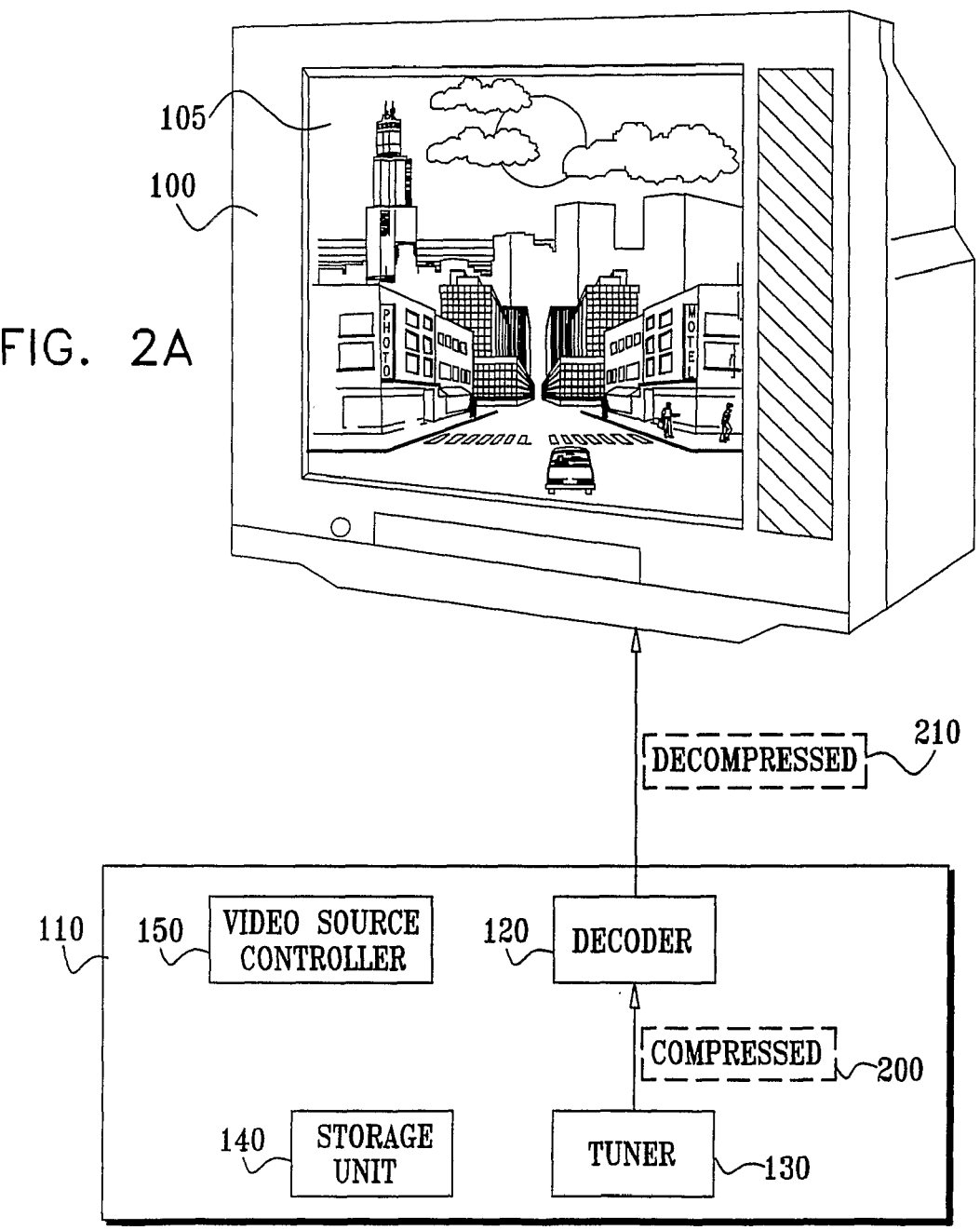
FIGS. 2A-2D are simplified pictorial illustrations of a preferred mode of operation of the system of FIG. 1.

Reference is now made to FIG. 1, which is a simplified pictorial illustration of a system for switching between different types of video content, the system being constructed and operative in accordance with a preferred embodiment of the present invention.

The system of FIG. 1 preferably comprises a video display 100 and a Set Top Box (STB) 110. It is appreciated that the STB 110 alone, without the video display 100, may comprise an alternative preferred embodiment of the present invention.

As mentioned above, systems other than video systems which utilize compressed information, compressed into "packets" or "frames", can also use the current invention to enable seamlessly switching between playing one compressed information stream to playing another compressed information stream. The example of video is used throughout the present specification for purposes of simplicity of description, it being appreciated that the present invention is not limited to video.

The video display 100, which may be any appropriate conventional video display as is well known in the art, comprises a display screen 105.

The STB 110 preferably comprises the following components: a decoder 120; a tuner 130; a storage unit 140; and a Video Source Controller (VSC) 150. The STB 110 also preferably comprises conventional components (not shown), which are well known in the art. The components comprised in the STB 110 are preferably implemented in any appropriate combination of hardware and software.

The components comprised in the STB 110 are described throughout the present specification in terms of their functionality; persons skilled in the art will appreciate that some of the components comprised in the STB 110 which are described as separate components may be implemented together in any appropriate combination. Persons skilled in the art will also appreciate that certain components, such as the storage unit 140, described throughout the present specification as comprised in the STB 110, may be provided externally to the STB 110 and operatively associated therewith.

The decoder 120 is preferably operative to decompress compressed video, producing decompressed video. The term "decompress" in all its grammatical forms is used throughout the present specification and claims interchangeably with the term "decode" and its corresponding grammatical forms. Typically, compressed video is compressed in accordance with a standard; by way of example and without limiting the generality of the foregoing, video may be compressed in accordance with the MPEG-2 standard. Persons skilled in the art will appreciate that the decoder 120 is preferably constructed and operative so as to be capable of decompressing one or more types of compressed video which are intended to be used in the system of FIG. 1.

The tuner 130 is preferably operative to receive video broadcasts. Such broadcasts may be delivered by any appropriate method of delivery such as, for example, any one or appropriate combination of the following: digital terrestrial; satellite; cable; Internet; 3GPP (3rd Generation Partnership Project, the specifications of which are based on evolved GSM specifications now generally known as the UMTS system); 3GPP2 (3rd Generation Partnership Project 2, which is a specification setting project for a 3G technology based on CDMA networks, commonly known as CDMA2000); DVB-H ("Digital Video Broadcasting: Handhelds", which is an extension to an older DVB standard); DMB (Digital Multimedia Broadcasting); DAB (Digital Audio Broadcasting, also being used to deliver video); and any other appropriate delivery method.

The storage unit 140 is preferably operative to store and retrieve video, typically upon request by another component of the STB 110, as is well known in the art.

The VSC 150 is preferably operative to control the operation of the other elements depicted as comprised in the STB 110 (including the decoder 120, the tuner 130, and the storage unit 140), and in particular to determine inputs to and outputs from those elements and to synchronize the operation thereof, as described in more detail below.

For purposes of simplicity of depiction, control and data connections between the elements of the STB 110 are not shown; persons skilled in the art will appreciate that various methods may be used for making such connections.

The operation of a preferred embodiment of the system depicted in FIG. 1 is now described. Reference is now additionally made to FIGS. 2A-2D, which are simplified pictorial illustrations of a preferred mode of operation of the system of FIG. 1. FIGS. 2A-2D describe a sequence of states, over time, of the system of FIG. 1. The transition between states is controlled by the VSC 150.

FIGS. 2A-2D relate to a case where, when switching from a first compressed video segment to a second compressed video segment, an uncompressed copy of a sub-segment of the second compressed video segment already exists within the system.

In FIG. 2A the tuner 130 sends a compressed video segment 200 to the decoder 120. Persons skilled in the art will appreciate that the compressed video segment 200 may originate in the storage unit 140 or may be received, through any appropriate conventional mechanism, from a source external to the system of FIG. 1 such as, for example, a live broadcast.

The decoder 120 decompresses the compressed video segment 200, producing a decompressed video segment 210 for display on the video display 100.

During the time when the system of FIG. 1 is in the state depicted by FIG. 2A, the display screen 105 of the video display 100 displays the decompressed video segment 210.

Figure 2B:
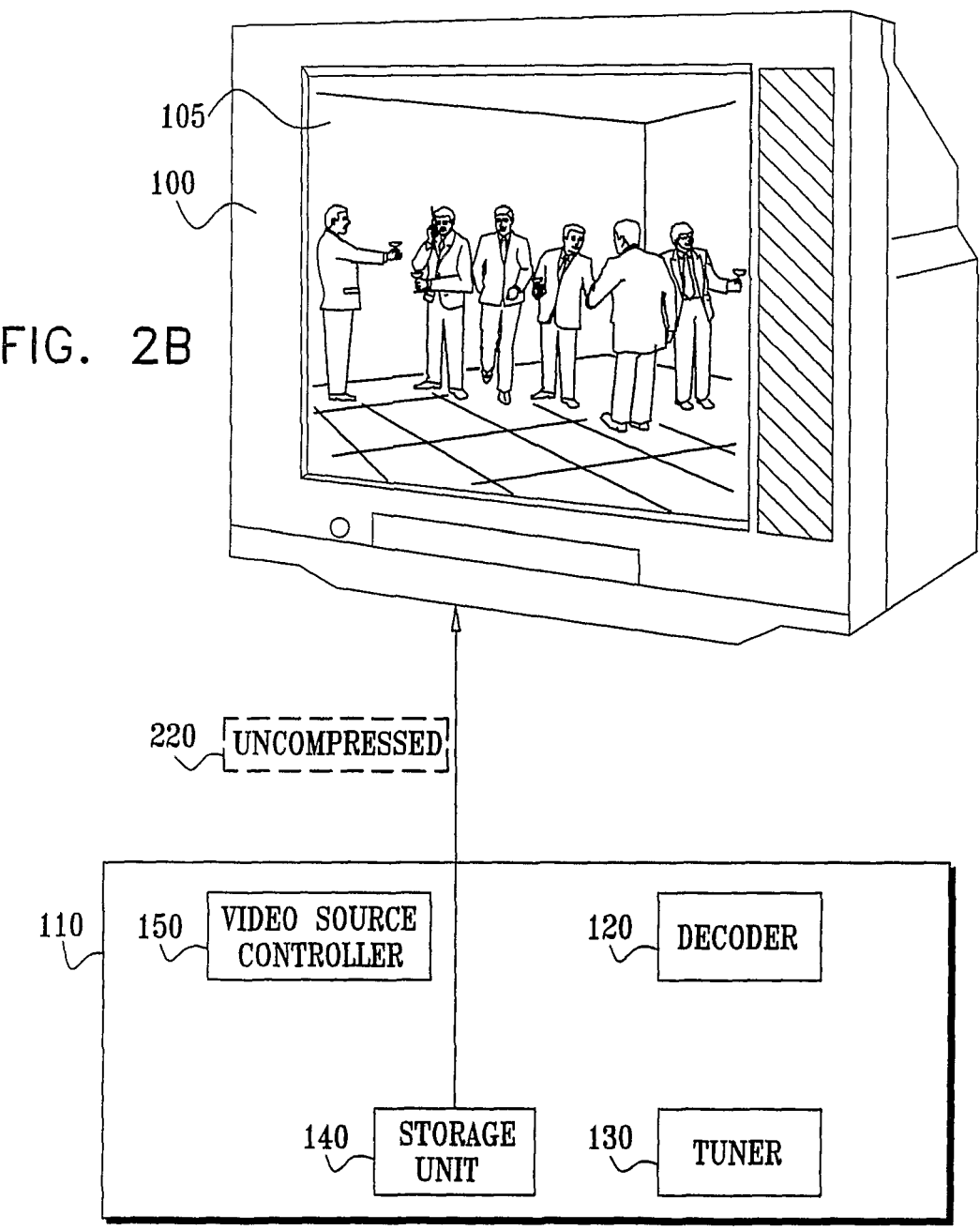

FIG. 2B depicts the system of FIG. 2A, where the VSC 150 has caused:
the tuner 130 to stop sending the compressed video segment 200 to the decoder 120; and
the storage unit 140 to retrieve an uncompressed video segment 220 and send the uncompressed video segment 220 for display to the video display 100.

During the time when the system of FIG. 1 is in the state depicted by FIG. 2B, the display screen 105 of the video display 100 displays at least a portion of the uncompressed video segment 220 from the storage unit 140.

Figure 2C:
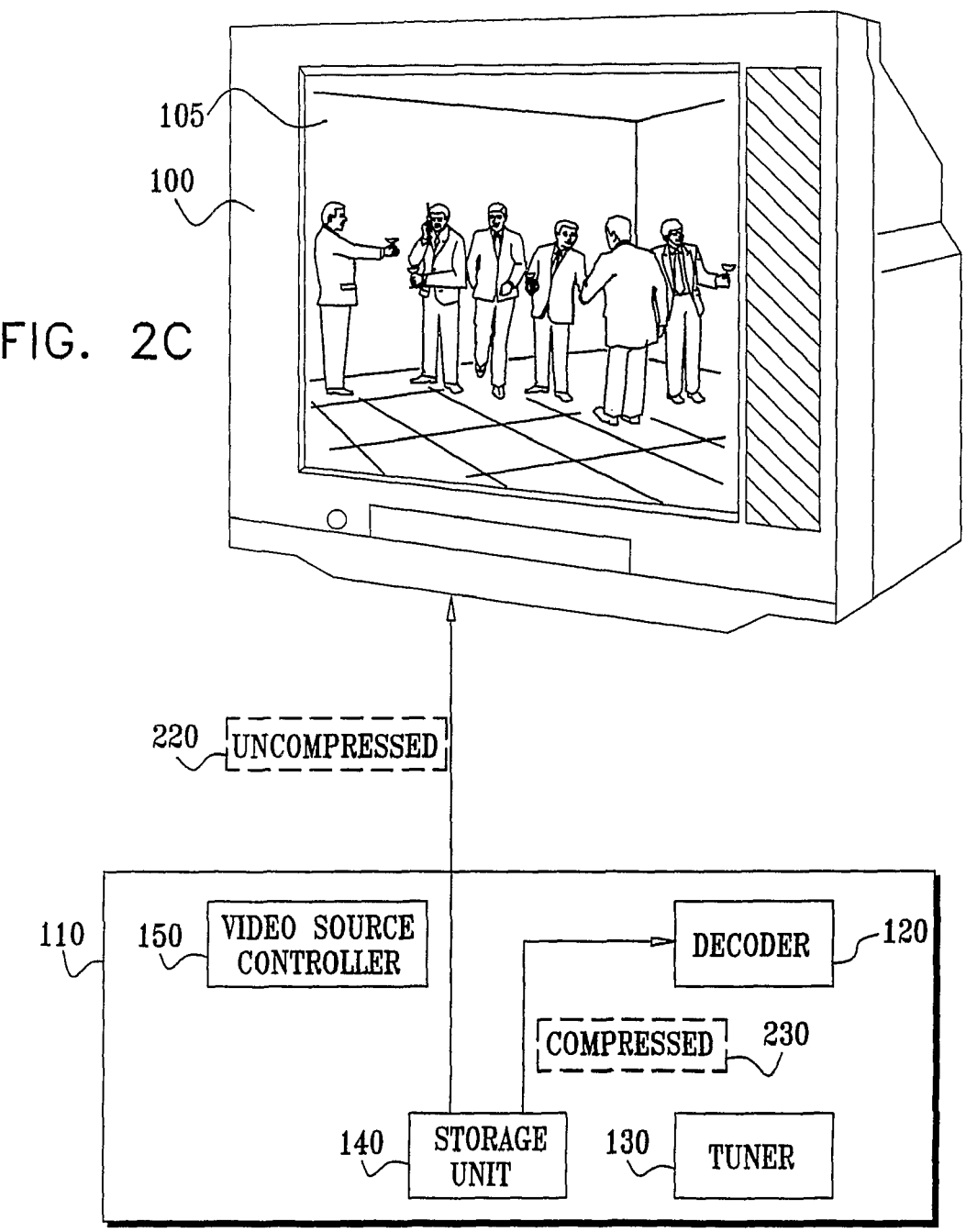

FIG. 2C depicts the system of FIG. 2B, where the VSC 150 has caused:
the storage unit 140 to additionally retrieve a compressed video segment 230, and send the compressed video segment 230 to the decoder 120; and
the decoder 120 to decompress the compressed video segment 230; however, the decoder 120 does not send output to the video display 100.

During the time when the system of FIG. 1 is in the state depicted by FIG. 2C, the display screen 105 of the video display 100 continues to display at least a portion of the uncompressed video segment 220 from the storage unit 140.

Figure 2D:
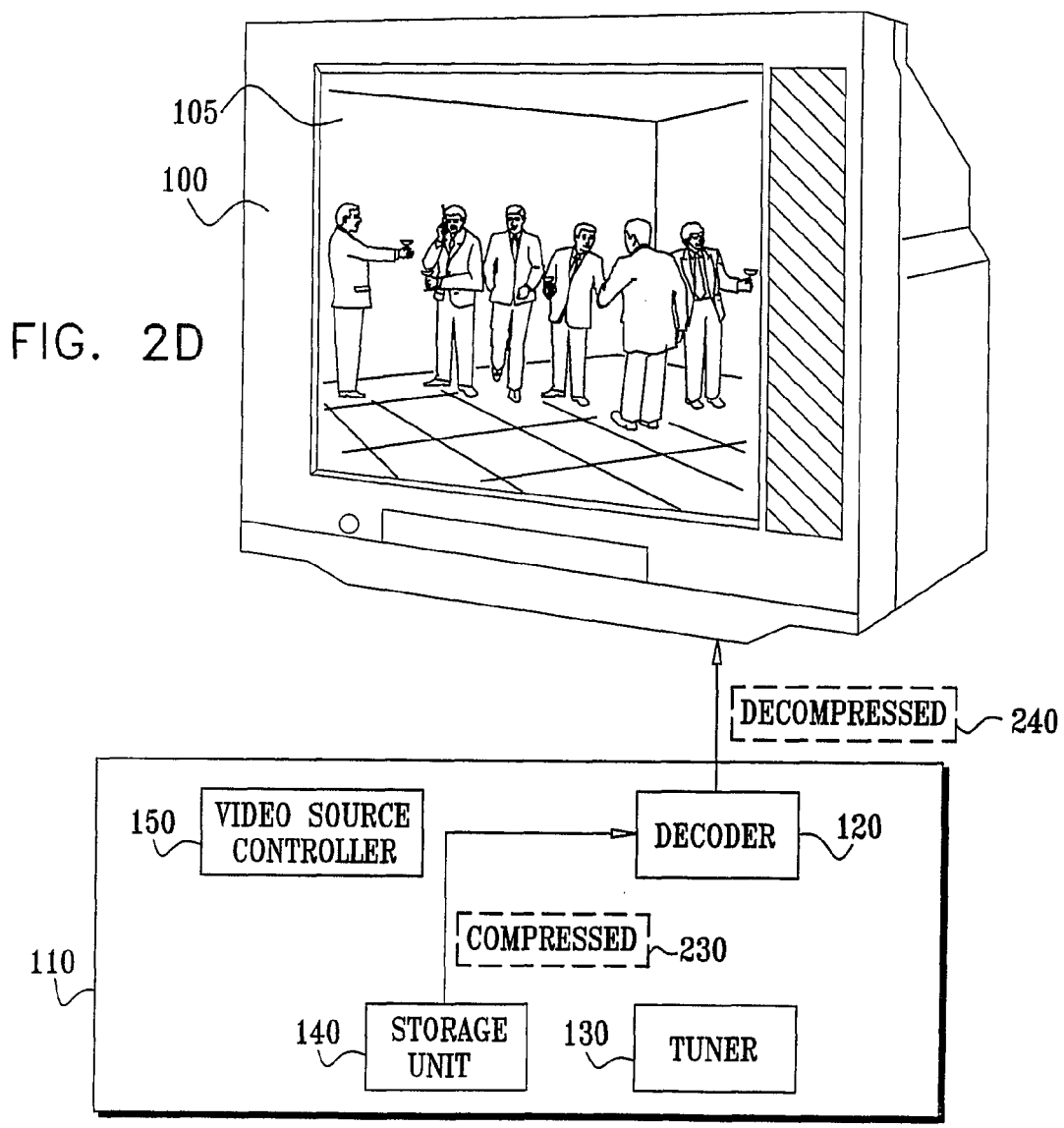

FIG. 2D depicts the system of FIG. 2C, where the VSC 150 has caused the decoder 120 to send a decompressed video segment 240, which corresponds to the compressed video segment 230, to the video display 100, and the storage unit 140 to stop sending the video segment 220 for display to the video display 100.

During the time when the system of FIG. 1 is in the state depicted by FIG. 2D, the display screen 105 of the video display 100 displays the decompressed video segment 240.

Reference is now made to FIG. 3, which is a simplified pictorial illustration of a timeline of switching from playing a first compressed video segment to playing a second compressed video segment, useful in understanding the preferred mode of operation of the system of FIG. 1 shown in FIGS. 2A-2D.

FIG. 3 depicts time from left to right, and the following from bottom to top:
a timeline 300 including significant events;
a first time bar 310 depicting a compressed video segment A, which, by way of example and without limiting the generality of the foregoing, is a compressed "live" video segment;
a second time bar 320 depicting a compressed video segment B, which, by way of example and without limiting the generality of the foregoing, is a compressed recorded video segment;
a third time bar 330 depicting the decoder 120 of FIG. 1;
a fourth time bar 340 depicting the display screen 105 of the video display 100 of FIG. 1; and
a fifth time bar 350 depicting an uncompressed video segment C, representing an uncompressed copy of a sub-segment of the video segment B.

The mode of operation of FIGS. 2A-2D is now further described using the timeline 300 of FIG. 3, following the timeline 300 from left to right:

At the start of the timeline 300, the compressed "live" video segment 310 is provided as input 315 to the decoder 330; the decoder 330 decompresses the input 315 and produces a decompressed output 317. The decompressed output 317 of the decoder 330 is provided to the display screen 340. The display screen 340 displays decompressed segment A.

At the time labeled 360 of the timeline 300, the VSC 150 of FIG. 1 causes the uncompressed copy 350 to be provided as an input 355 to the display screen 340, and the compressed recorded video segment 320 to be provided as an input 325 to the decoder 330. From this time on, the uncompressed copy 350 is provided as an input 355 to the display screen 340, freeing the decoder 330 to decompress segment B 320. The decoder 330 decompresses segment B 330, at a rate higher than normal video viewing rate, but the result of the decompression is not sent to the display screen 340.

Persons skilled in the art will appreciate that a short period of time may elapse from the time the decoder 330 stops decompressing the compressed "live" video segment 310 to the time the decoder 330 starts decompressing the compressed recorded video segment 320; this elapsed time is not depicted in FIG. 3.

The decoder 330 starts decompressing segment B 320 at a random access point within segment B that corresponds to one of the three cases listed below:

1) The random access point where the decoder 330 starts decompressing segment B precedes the beginning of the uncompressed copy 350.

2) The random access point where the decoder 330 starts decompressing segment B corresponds exactly to the beginning of the uncompressed copy 350.

3) The random access point where the decoder 330 starts decompressing segment B is after the beginning of the uncompressed copy 350.

FIG. 3 depicts a case where the random access point where the decoder 330 starts decompressing segment B precedes the beginning of the uncompressed copy 350. Persons skilled in the art will appreciate that in all of the three cases described above the decoder 330 decompresses the input 325 until the decoder 330 catches up to the content being shown on the display screen 340 at the time labeled 380 of timeline 300.

At the time labeled 370 of the timeline 300, the decoder 330 reaches a point in the compressed recorded video segment 320 which corresponds to the start of the uncompressed copy 350. The decoder 330 continues decompressing the input 325, at a rate higher than normal video viewing rate. The decoder 330 catches up to the content being shown on the display screen 340 at the time labeled 380 of timeline 300.

At the time labeled 380, the VSC 150 of FIG. 1 causes the decoder 330 to revert to decompressing the input 325 at a normal video viewing rate, causes an output 335 of the decoder 330 to be sent to the display screen 340, and causes the input 355 to stop being used.

It is appreciated that once the decoder 330 catches up to the content being shown on the display screen 340, the VSC 150 of FIG. 1 may:

1) cause the display of the uncompressed copy of a sub-segment of the video segment B 350 to switch from displaying the uncompressed copy of a sub-segment of the video segment B 350 to displaying the decompressed output 335 of the compressed video segment B 320; or 2) cause the decoder 330 to continue decompressing the input 325 at a normal video viewing rate, and the display of the uncompressed copy of a sub-segment of the video segment B 350 to switch to displaying the decompressed output 335 of the compressed video segment B 320 when the end of the uncompressed copy of a sub-segment of the video segment B 350 is reached.

The operation of an alternative preferred embodiment of the system depicted in FIG. 1 is now described.

Reference is now additionally made to FIGS. 4A-4E, which are simplified pictorial illustrations of a preferred mode of operation of the alternative preferred embodiment of the system of FIG. 1. FIGS. 4A-4E depict a sequence of states, over time, of the system of FIG. 1. The transition between states is controlled by the VSC 150.

FIGS. 4A-4D relate to a case where, when switching from a first compressed video segment to a second, "live", compressed video segment, an uncompressed copy of a sub-segment of the first compressed video segment already exists within the system, and a recording of the second, "live", video segment is additionally made, and used to locate a random access point in the second "live" video segment.

Figure 4A:
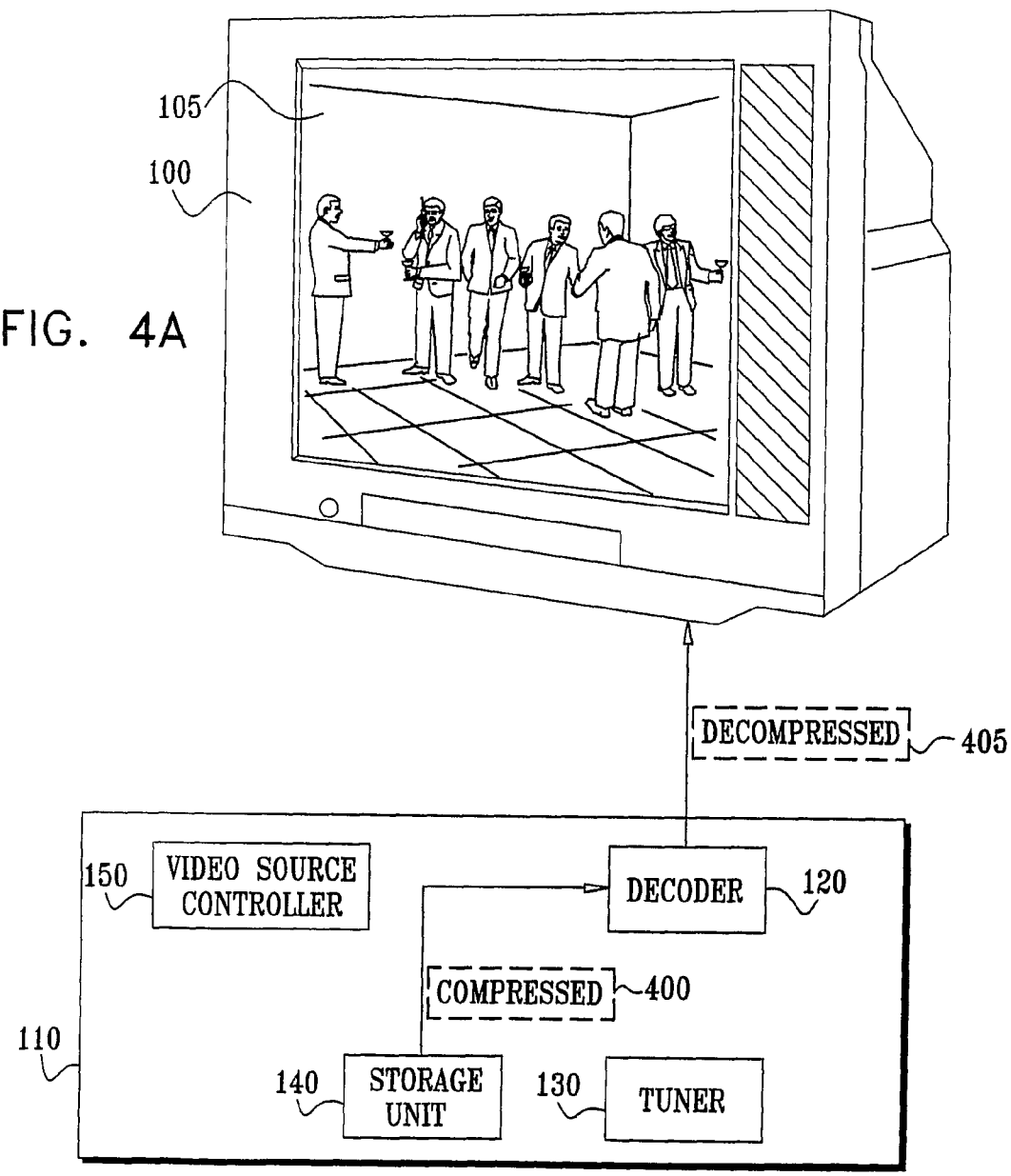

In FIG. 4A the storage unit 140 sends a compressed video segment 400 to the decoder 120. Persons skilled in the art will appreciate that the compressed video segment 400 may originate in the storage unit 140 or may be received, through any appropriate conventional mechanism, from a source external to the system of FIG. 1 such as, for example, a live broadcast.

The decoder 120 decompresses the compressed video segment 400, producing a decompressed video segment 405 for display on the video display 100.

During the time when the system of FIG. 1 is in the state depicted by FIG. 4A, the display screen 105 of the video display 100 displays the decompressed video segment 405.

FIG. 4B depicts the system of FIG. 4A, where the VSC 150 has caused the tuner 130 to start sending a compressed video segment 410 to the storage unit 140 and storage unit 140 to start storing the compressed video segment 410.

During the time when the system of FIG. 1 is in the state depicted by FIG. 4B, the display screen 105 of the video display 100 displays the decompressed video segment 405.

Figure 4C:
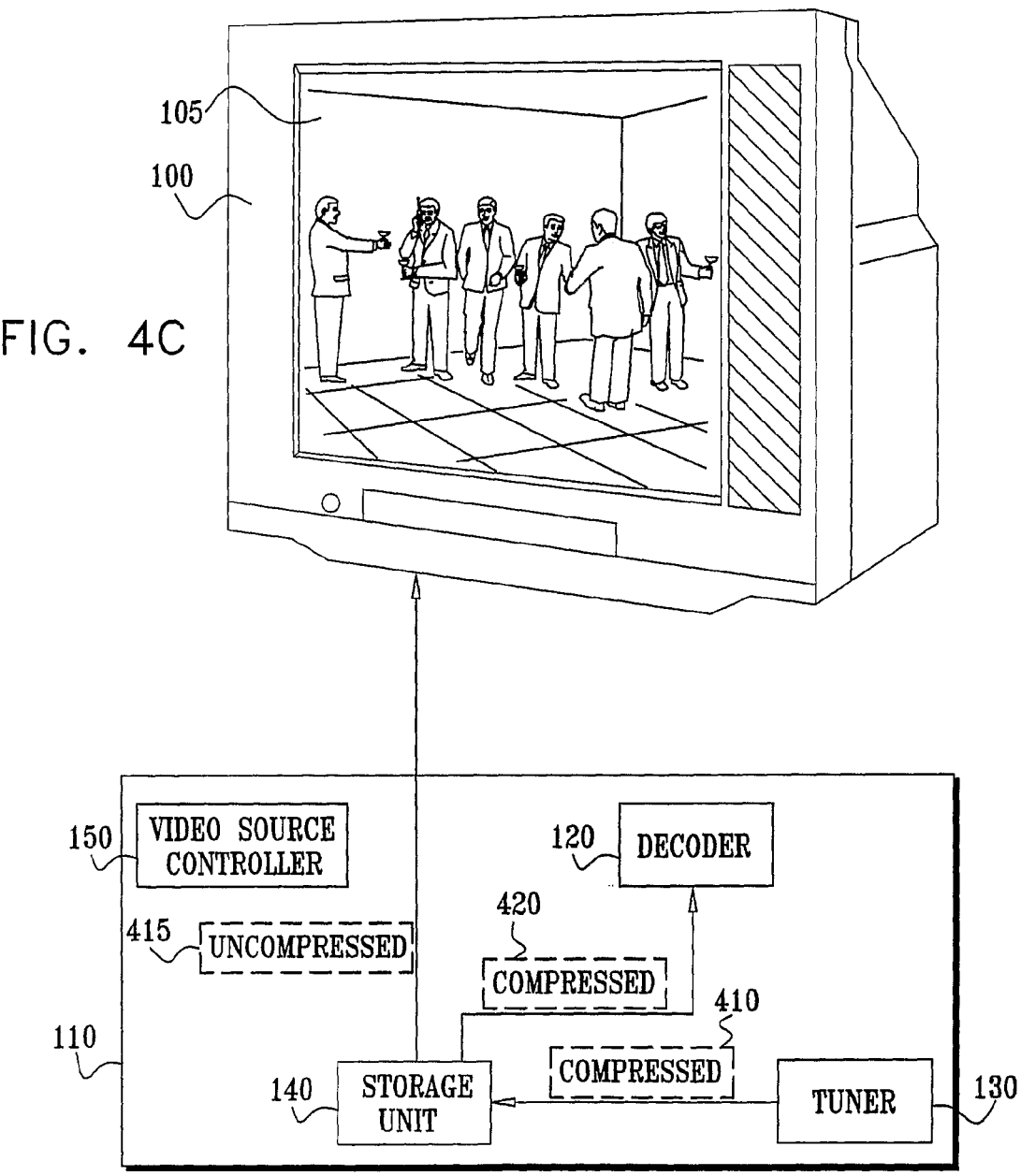

FIG. 4C depicts the system of FIG. 4B, where the VSC 150 has caused:

the storage unit 140 to retrieve an uncompressed video segment 415 and send the uncompressed video segment 415 for display to the video display 100;

the storage unit 140 to retrieve the stored compressed video segment 410 of FIG. 4B and provide the stored compressed video segment 410 of FIG. 4B as input 420 to the decoder 120; and the decoder 120 to start decompressing the input 420.

The decoder 120 initially decompresses the input 420 at a rate higher than normal video viewing rate. When the decoder 120 reaches a point where it has caught up with the input 410 being stored onto storage device 140, the VSC 150 of FIG. 1 causes the decoder 120 to revert to decompressing the input 420 at a normal video viewing rate.

During the time when the system of FIG. 1 is in the state depicted by FIG. 4C, the display screen 105 of the video display 100 displays at least a portion of the uncompressed video segment 415 from the storage unit 140.

Figure 4D:
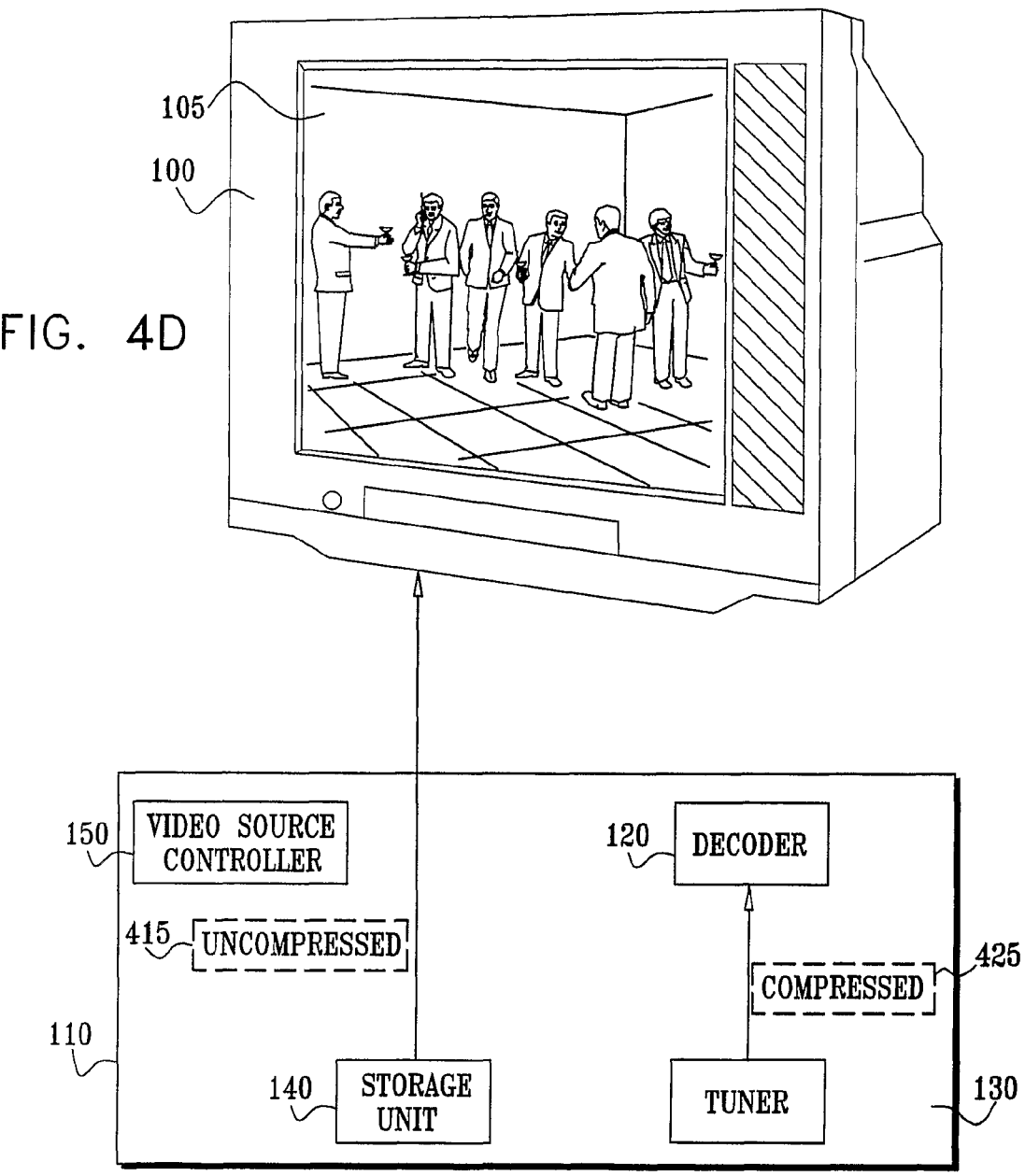

FIG. 4D depicts the system of FIG. 4C where the VSC 150 has caused:

the tuner 130 to stop providing the compressed video segment 410 of FIG. 4D as input to the storage unit 140, and storage unit 140 to stop storing the compressed video segment 410; and the tuner 130 to start providing a compressed video segment 425 as input to the decoder 120.

During the time when the system of FIG. 1 is in the state depicted by FIG. 4D, the display screen 105 of the video display 100 continues displaying the portion of the uncompressed video segment 415 from the storage unit 140.

Figure 4E:
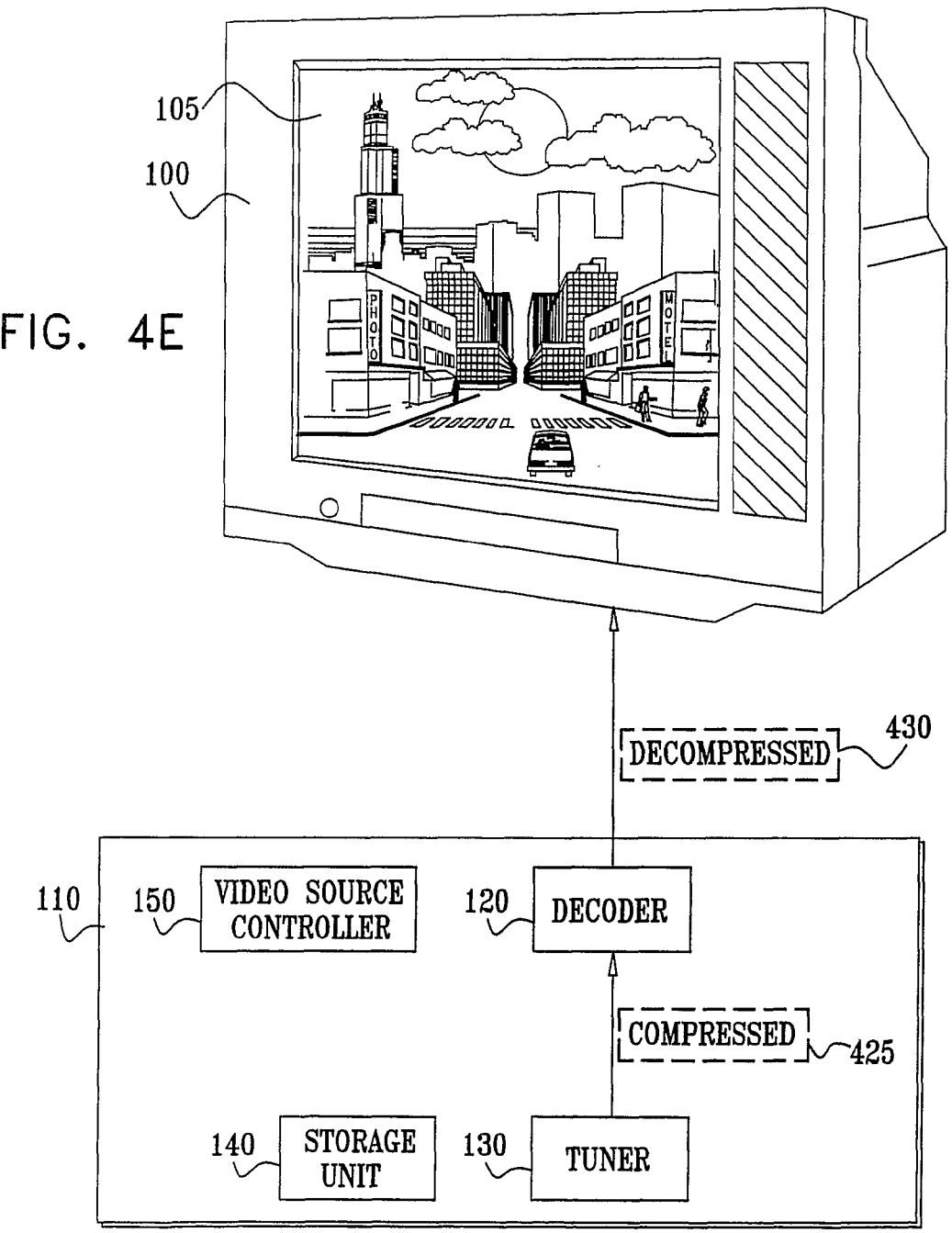

FIG. 4E depicts the system of FIG. 4D after one of two states has been reached:

1) The decoder 120 has decompressed enough of the compressed video segment 425 to have caught up to the "live" compressed video segment 425 being input from the tuner 130; or 2) The decoder 120 has decompressed enough of the compressed video segment 425 to have caught up to the "live" compressed video segment 425 being input from the tuner 130, and the storage unit 140 has retrieved the uncompressed video segment 415 completely and reached the end of the uncompressed video segment 415. FIG. 4E depicts the system of FIG. 4D, in either of the states described above, where the VSC 150 has caused the decoder 120 to start providing a decompressed output 430 as input to the video display 100, replacing the former uncompressed video segment 415, and the storage unit 140 to stop retrieving the uncompressed video segment 415.

During the time when the system of FIG. 1 is in the state depicted by FIG. 4E, the display screen 105 of the video display 100 finally displays the decompressed output 430 that the decoder 120 decompressed from the compressed video segment 425 provided as input by the tuner 130.

Reference is now made to FIG. 5, which is a simplified pictorial illustration of a timeline of switching from playing a first compressed video segment to playing a second, "live", compressed video segment, useful in understanding an alternative preferred mode of operation of the system of FIG. 1.

FIG. 5 depicts time from left to right, and the following from bottom to top:

a timeline 500 including significant events;

a first time bar 505 depicting a first compressed video segment A, which, by way of example and without limiting the generality of the foregoing, is a compressed recorded video segment;

a second time bar 510 depicting a second compressed video segment B, which, by way of example and without limiting the generality of the foregoing, is a compressed "live" video segment;

a third time bar 515 depicting a compressed video segment C, representing a recording of a compressed copy of a sub-segment of the video segment B.

a fourth time bar 520 depicting the decoder 120 of FIG. 1;

a fifth time bar 525 depicting the display screen 105 of the video display 100 of FIG. 1; and a sixth time bar 530 depicting an uncompressed video segment D, representing an uncompressed copy of a sub-segment of the video segment A.

The mode of operation of the alternative preferred mode of operation of the system of FIG. 1 is now further described using the timeline 500 of FIG. 5, following the timeline 500 from left to right:

At the start of the timeline 500, the compressed recorded video segment A 505 is provided as input 535 to the decoder 520; the decoder 520 decompresses the input 535 and produces a decompressed output 540. The decompressed output 540 of the decoder 520 is provided to the display screen 525. The display screen 525 displays decompressed segment A.

At the time labeled 545 of the timeline 500, the VSC 150 of FIG. 1 causes the compressed "live" video segment B 510 to be provided as an input to the storage unit 140 (not shown) of FIG. 1. The storage unit 140 (not shown) of FIG. 1 starts recording the compressed "live" video segment B 510.

At the time labeled 555 of the timeline 500, the VSC 150 of FIG. 1 causes the uncompressed video segment D 530 to be provided as an input 560 to the display screen 525, replacing the former input 540 to the display screen 525, and recorded compressed video segment C 515 to be provided as an input 565 to the decoder 520. At this point in time the display screen starts displaying the uncompressed video segment D 530, which is an uncompressed copy of a sub-segment of the video segment A. At this point in time, or soon thereafter the decoder 520 starts decompressing the input 565 at a higher than normal video viewing rate. Persons skilled in the art will appreciate that a short period of time may elapse from the time the decoder 520 stops decompressing the compressed recorded video segment A 505 to the time the decoder 520 starts decompressing the recorded compressed video segment C 515; this elapsed time is not depicted in FIG. 5.

At the time labeled 570 of the timeline 500, the decoder 520, which is decompressing the recorded compressed video segment C 515 of the compressed "live" video segment B 510 at a higher than normal viewing rate, reaches a point 575 in the recorded compressed video segment C 515 that does not lag behind the "live" video segment B 510. At this point in time the VSC 150 of FIG. 1 causes the decoder 520 to revert to decompressing the input 565 at a normal video viewing rate.

At the time labeled 580 of the timeline 500, the VSC 150 of FIG. 1 causes the compressed "live" video segment B 510 to be provided as input 585 to the decoder 520, replacing the former input 565 to the decoder 520, and causes the storage unit 140 (not shown) of FIG. 1 to stop recording the compressed "live" video segment B 510. At this point in time the decoder 520 starts decompressing the compressed "live" video segment B 510 at a normal video viewing rate.

At the time labeled 590 of the timeline 500, the VSC 150 of FIG. 1 causes the decoder 520 to provide a new input 595 to the display screen 525, replacing the former input 560 to the display screen 525. The VSC 150 causes the switch between the former input 560 to the new input 595 to the display screen when the system of FIG. 1 reaches either one of two states, corresponding to the two states described in the description of FIG. 4E:

1) The decoder 520 has decompressed enough of the compressed video segment B 510 to have caught up to the "live" compressed video segment B 510; or 2) The decoder 520 has decompressed enough of the compressed video segment B 510 to have caught up to the "live" compressed video segment B 510, and the storage unit 140 of FIG. 4E has retrieved the uncompressed video segment D 530 completely and reached the end of the uncompressed video segment D 530.

It is appreciated that once the system of FIG. 4D has reached the first state described above, the VSC 150 may cause a switch from the former input 560 to the new input 595 at any time until the system of FIG. 4D reaches the second state described above. FIG. 5 depicts the system of FIG. 4D in a state where the VSC 150 has caused a switch from the former input 560 to the new input 595 when the display screen 525 has reached the end of the uncompressed video segment D 530.

The operation of another alternative preferred embodiment of the system depicted in FIG. 1 is now described.

Reference is now made to FIGS. 6A-6D, which are simplified pictorial illustrations of the preferred mode of operation of the alternative preferred embodiment of the system of FIG. 1. FIGS. 6A-6D depict a sequence of states, over time, of the system of FIG. 1. The transition between states is controlled by the VSC 150.

FIGS. 6A-6D relate to a case where, when switching from a first compressed video segment to a second compressed video segment, an uncompressed copy of a sub-segment of the first compressed video segment already exists within the system, and the system switches to displaying the second compressed video segment after as enough data has been decompressed to start displaying the second, compressed video segment.

In FIG. 6A the storage unit 140 sends a compressed video segment 600 to the decoder 120. Persons skilled in the art will appreciate that the compressed video segment 600 may originate in the storage unit 140 or may be received, through any appropriate conventional mechanism, from a source external to the system of FIG. 1.

The decoder 120 decompresses the compressed video segment 600, producing a decompressed video segment 605 for display on the video display 100.

During the time when the system of FIG. 1 is in the state depicted by FIG. 6A, the display screen 105 of the video display 100 displays the decompressed video segment 605.

Figure 6B:
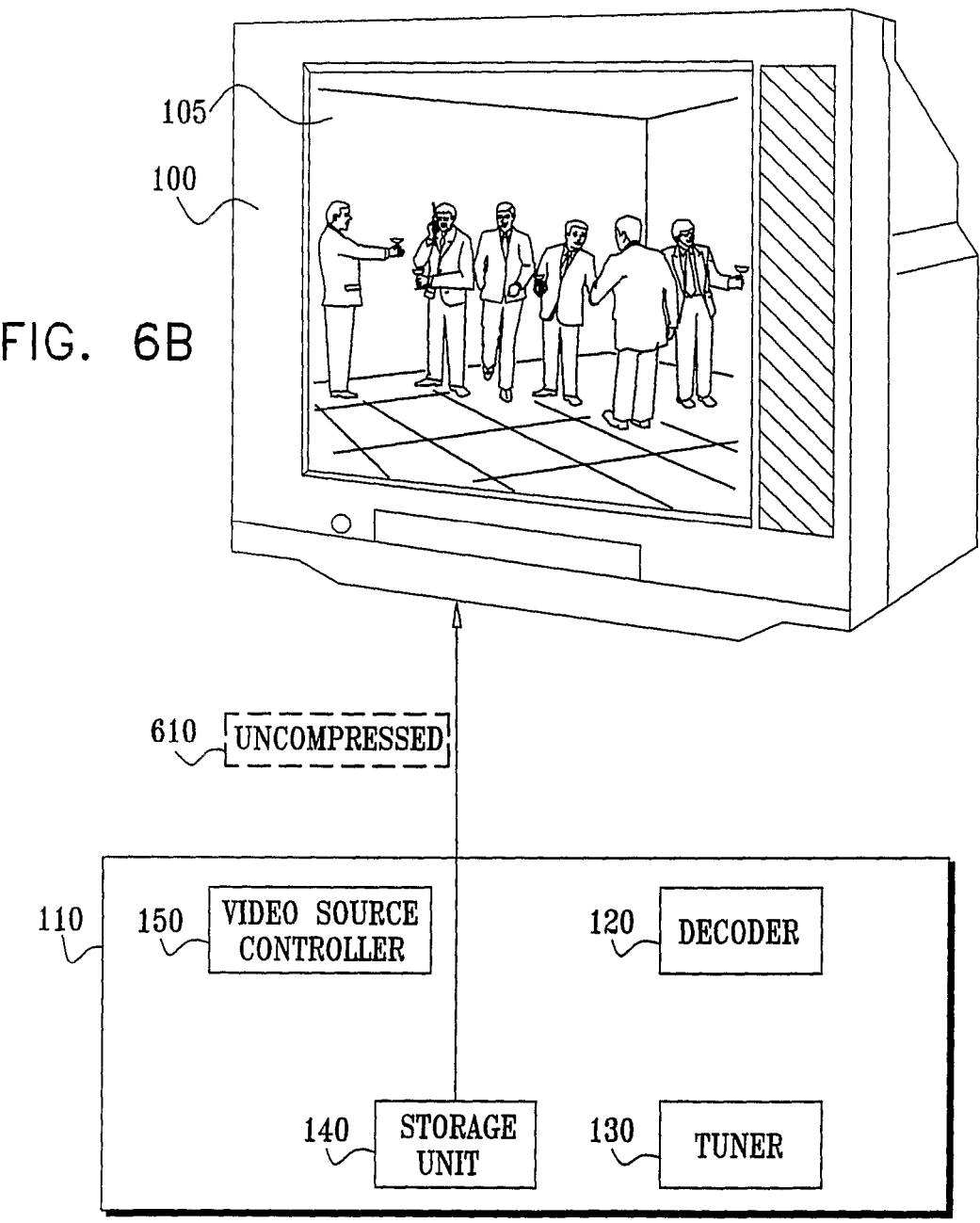

FIG. 6B depicts the system of FIG. 6A, where the VSC 150 has caused:

the storage unit 140 to stop sending the compressed video segment 600 to the decoder 120; and the storage unit 140 to retrieve an uncompressed video segment 610 and send the uncompressed video segment 610 for display to the video display 100.

During the time when the system of FIG. 1 is in the state depicted by FIG. 6B, the display screen 105 of the video display 100 displays at least a portion of the uncompressed video segment 610 from the storage unit 140.

Figure 6C:
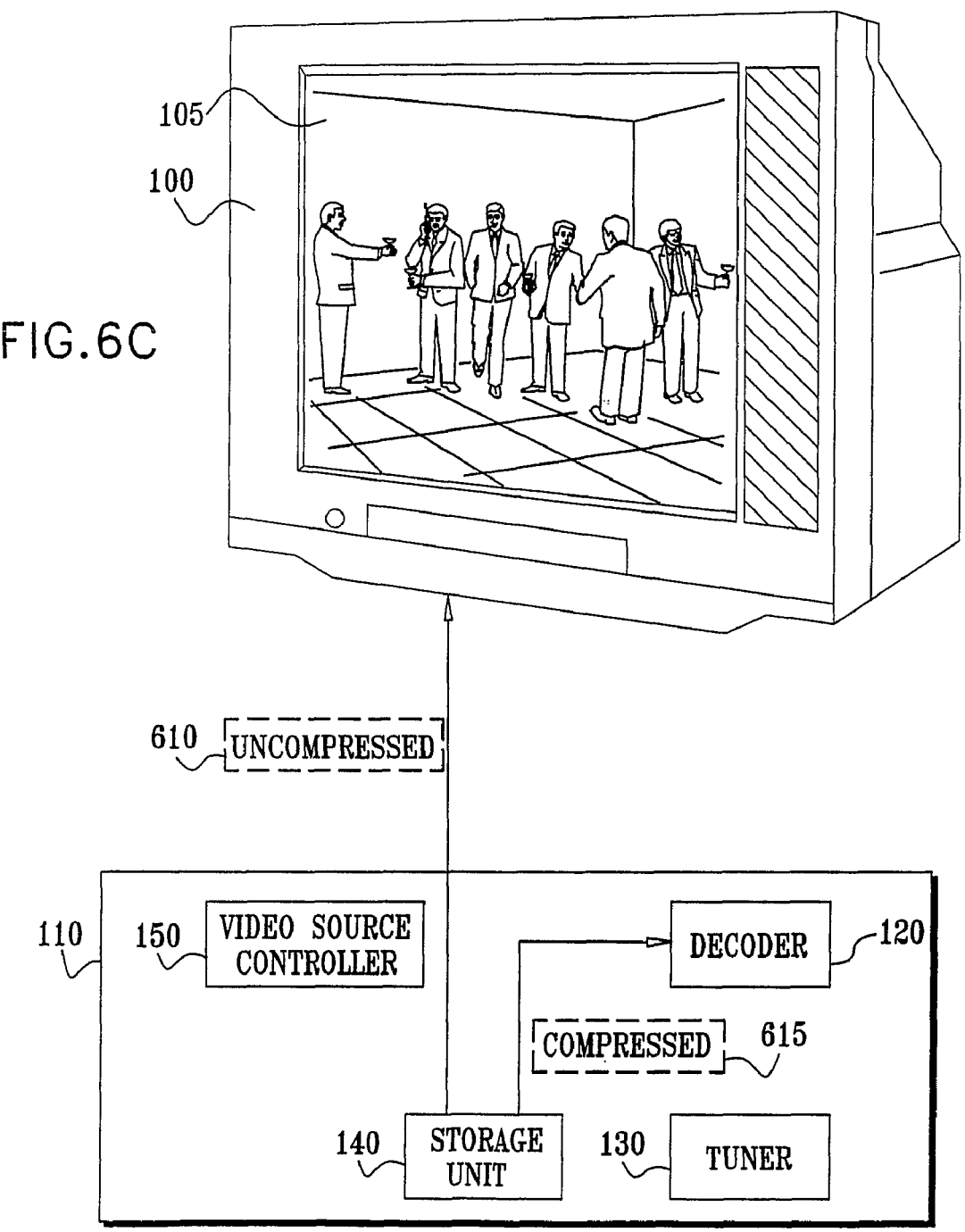

FIG. 6C depicts the system of FIG. 6B, where the VSC 150 has caused:

the storage unit 140 to additionally retrieve a compressed video segment 615, and send the compressed video segment 615 to the decoder 120; and the decoder 120 to decompress the compressed video segment 615; however, the decoder 120 does not send output to the video display 100.

During the time when the system of FIG. 1 is in the state depicted by FIG. 6C, the display screen 105 of the video display 100 continues to display at least a portion of the uncompressed video segment 610 from the storage unit 140.

Figure 6D:
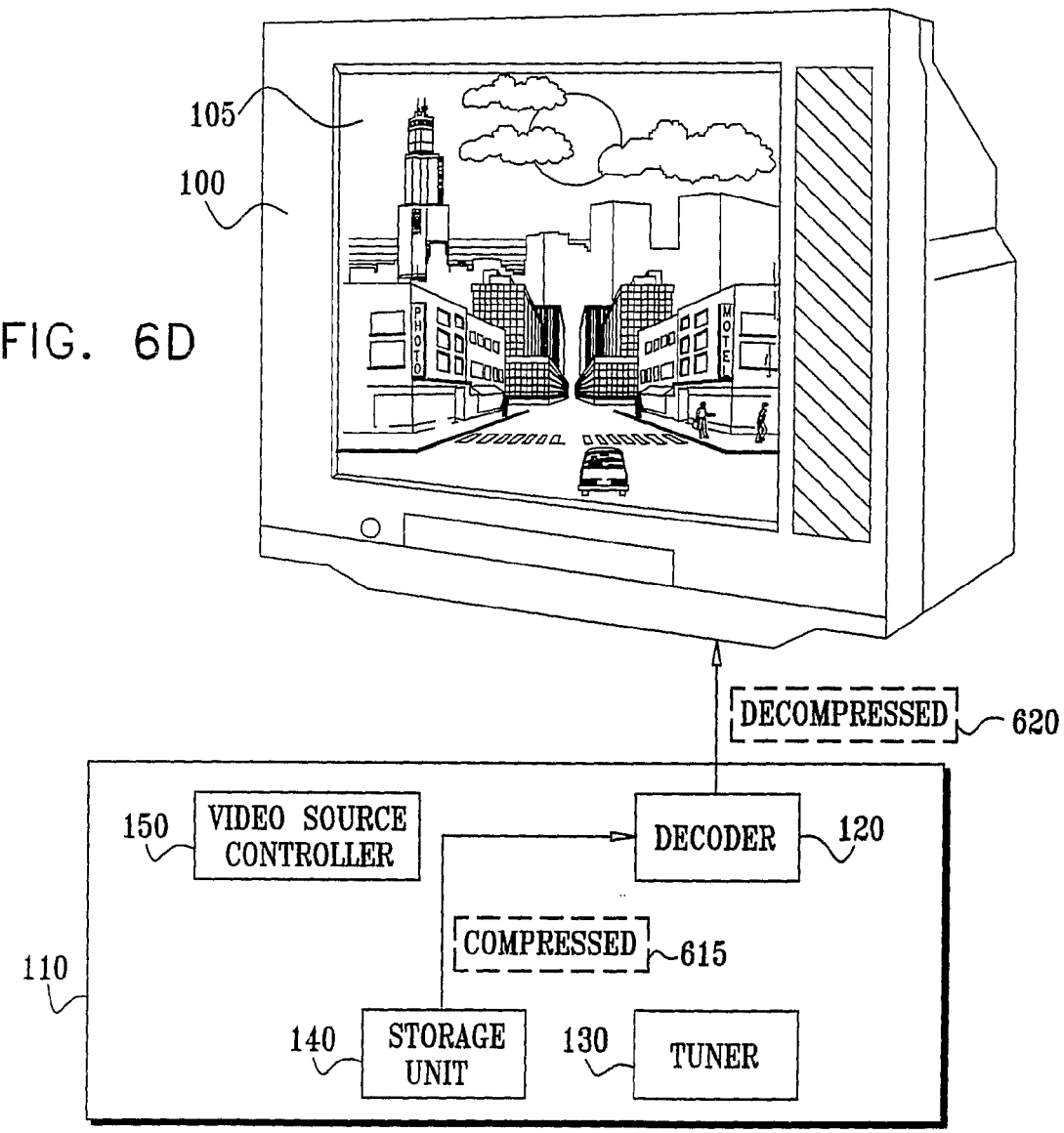

FIG. 6D depicts the system of FIG. 6C, where the VSC 150 has caused:

the decoder 120 to send a decompressed video segment 620, which corresponds to the compressed video segment 615, to the video display 100, and the storage unit 140 to stop sending the video segment 610 for display to the video display 100.

During the time when the system of FIG. 1 is in the state depicted by FIG. 6D, the display screen 105 of the video display 100 displays the decompressed video segment 620.

Reference is now made to FIG. 7, which is a simplified pictorial illustration of a timeline of switching from playing a first compressed video segment to playing a second compressed video segment, useful in understanding the preferred mode of operation of the system of FIG. 1 shown in FIGS. 6A-6D.

FIG. 7 depicts time from left to right, and the following from bottom to top:

a timeline 700 including significant events;

a first time bar 705 depicting a first compressed video segment A, which, by way of example and without limiting the generality of the foregoing, is a compressed recorded video segment;

a second time bar 710 depicting a second compressed video segment B, which, by way of example and without limiting the generality of the foregoing, is a compressed recorded video segment;

a third time bar 720 depicting the decoder 120 of FIG. 1;

a fourth time bar 730 depicting the display screen 105 of the video display 100 of FIG. 1; and a fifth time bar 740 depicting an uncompressed video segment C, representing an uncompressed copy of a sub-segment of the video segment A.

The mode of operation of FIGS. 6A-6D is now further described using the timeline 700 of FIG. 7, following the timeline 700 from left to right:

At the start of the timeline 700, the compressed recorded video segment A 705 is provided as input 745 to the decoder 720; the decoder 720 decompresses the input 745 and produces a decompressed output 750. The decompressed output 750 of the decoder 720 is provided as input to the display screen 730. The display screen 730 displays decompressed segment A.

At the time labeled 755 of the timeline 700, the VSC 150 of FIG. 1 causes the uncompressed copy 740 to be provided as an input 760 to the display screen 730. From this time on, the uncompressed copy 740 is provided as an input 760 to the display screen 730, freeing the decoder 720.

At the time labeled 765 of the timeline 700, the VSC 150 of FIG. 1 causes the compressed video segment B 710 to be provided as input 770 to the decoder 720. The decoder 720 starts decompressing segment B 710. The VSC 150 of FIG. 1 preferably, although not necessarily, causes the compressed video segment B 710 to be provided as input 770 to the decoder 720 from the nearest random access point in the compressed video segment B 710, thus causing the time elapsed from the time labeled 755 of the timeline 700 to the time labeled 765 of the timeline 700 to be as short as possible.

The VSC 150 of FIG. 1 preferably causes the compressed video segment B 710 to be provided as input 770 to the decoder 720 as soon as possible after the time labeled 755 of the timeline 700, and the decoder 720 to start decompressing segment B 710 as efficiently as possible, as described in the cases listed below:

1) The compressed video segment B 710 is a "live" compressed video segment, and the decoder 720 starts decompressing the compressed video segment B 710 at the first random access point of the compressed video segment B 710 that the decoder 720 encounters. As soon as the decoder 720 has decompressed enough data to display an image, the VSC 150 of FIG. 1 causes the decoder 720 to provide the decompressed output 780 as input to the display screen 730, as described below with reference to the timeline 700 at the time labeled 775.

2) The compressed video segment B 710 is a recorded compressed video segment, and the decoder 720 starts decompressing the compressed video segment B 710 at the beginning of the compressed video segment B 710. As soon as the decoder 720 has decompressed enough data to display an image, the VSC 150 of FIG. 1 causes the decoder 720 to provide the decompressed output 780 as input to the display screen 730, as described below with reference to the timeline 700 at the time labeled 775.

3) If it is desired to display the compressed recorded video segment B 710 from a specific video frame, the decompression of the compressed recorded video segment B 710 may have to begin from a random access point corresponding to one of the cases listed below:

3a) The random access point precedes the desired video frame. The decoder 720 preferably decompresses the compressed recorded video segment B 710 from the random access point at a rate that is faster than normal video viewing rate until reaching the desired video frame. When the desired video frame has been reached, and as soon as the decoder 720 has also decompressed enough data to display an image, the VSC 150 of FIG. 1 causes the decoder 720 to revert to decompressing at a normal video viewing rate, and to provide the decompressed output 780 as input to the display screen 730, as described below with reference to the time labeled 775 of the timeline 700.

3b) The random access point corresponds exactly to the desired video frame. The decoder 720 preferably decompresses the compressed recorded video segment B 710 from the random access point, and as soon as the decoder 720 has decompressed enough data to display an image, the VSC 150 of FIG. 1 causes the decoder 720 to provide the decompressed output 780 as input to the display screen 730, as described below with reference to the time labeled 775 of the timeline 700. At the time labeled 775 of the timeline 700, the VSC 150 of FIG. 1 causes the decoder 720 to provide decompressed output 780 as input to the display screen 730.

The VSC 150 of FIG. 1 may cause the display screen 730 to switch from displaying the uncompressed video segment C 740, to displaying the output 780 of the decoder 720 at any time after the decoder 720 has decompressed enough data to display an image, and until the display of the uncompressed video segment C 740 ends. FIG. 7 depicts a case where the VSC 150 of FIG. 1 has caused a switch before the end of the uncompressed video segment C 740.

The operation of still another alternative preferred embodiment of the system depicted in FIG. 1 is now described.

Reference is now made to FIGS. 8A-8D, which are simplified pictorial illustrations of a preferred mode of operation of the alternative preferred embodiment of the system of FIG. 1. FIGS. 8A-8D depict a sequence of states, over time, of the system of FIG. 1. The transition between states is controlled by the VSC 150.

FIGS. 8A-8D relate to a case where, when switching from a first compressed video segment to a second compressed video segment, an uncompressed copy of a sub-segment of the first compressed video segment already exists within the system, and the system of FIG. 1 locates a random access point in the second compressed video segment without recording the second compressed video segment.

Figure 8A:
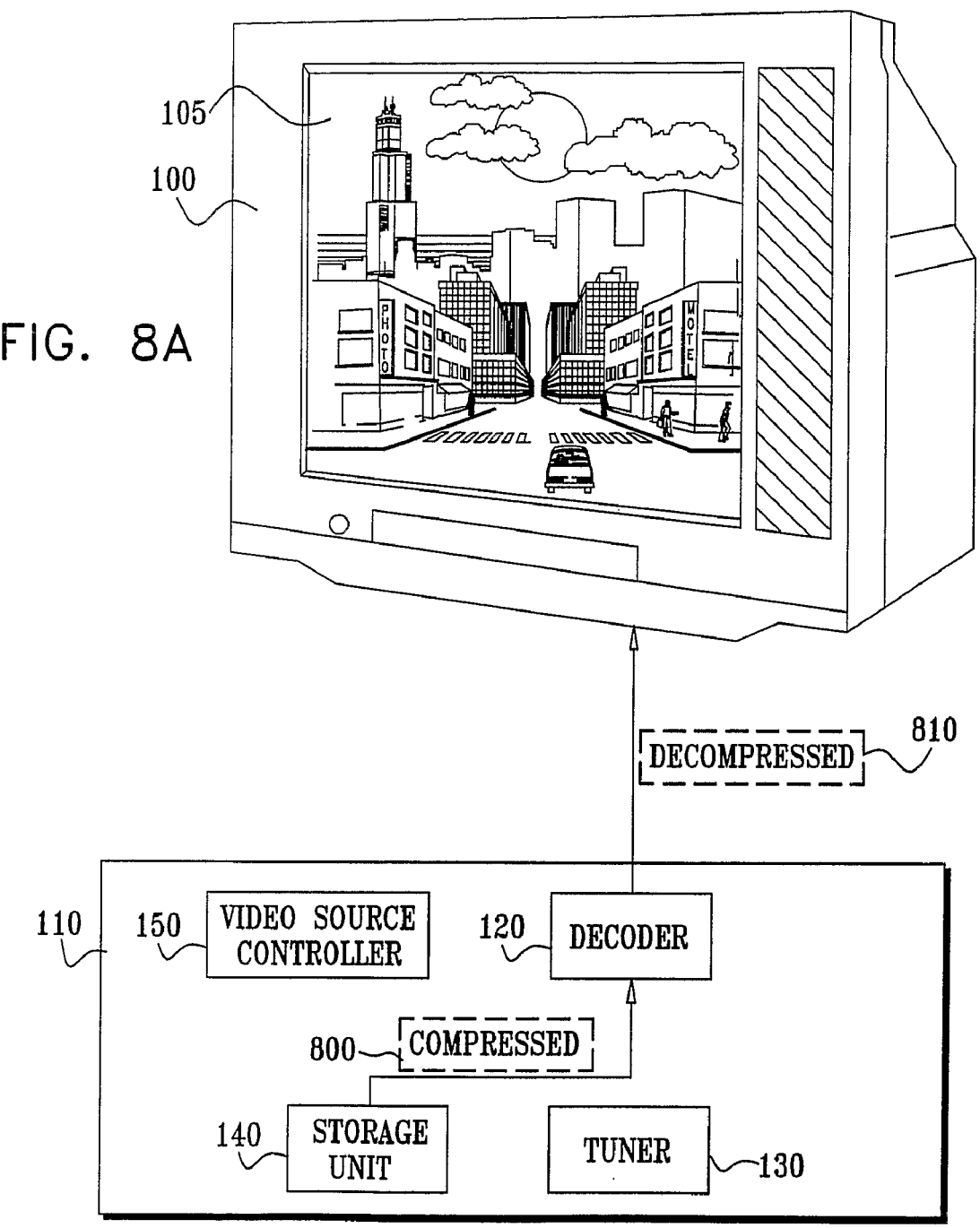

In FIG. 8A the storage unit 140 sends a compressed video segment 800 to the decoder 120. Persons skilled in the art will appreciate that the compressed video segment 800 may originate in the storage unit 140 or may be received, through any appropriate conventional mechanism, from a source external to the system of FIG. 1 such as, for example, a DVD player etc.

The decoder 120 decompresses the compressed video segment 800, producing a decompressed video segment 810 for display on the video display 100.

During the time when the system of FIG. 1 is in the state depicted by FIG. 8A, the display screen 105 of the video display 100 displays the decompressed video segment 810.

Figure 8B:
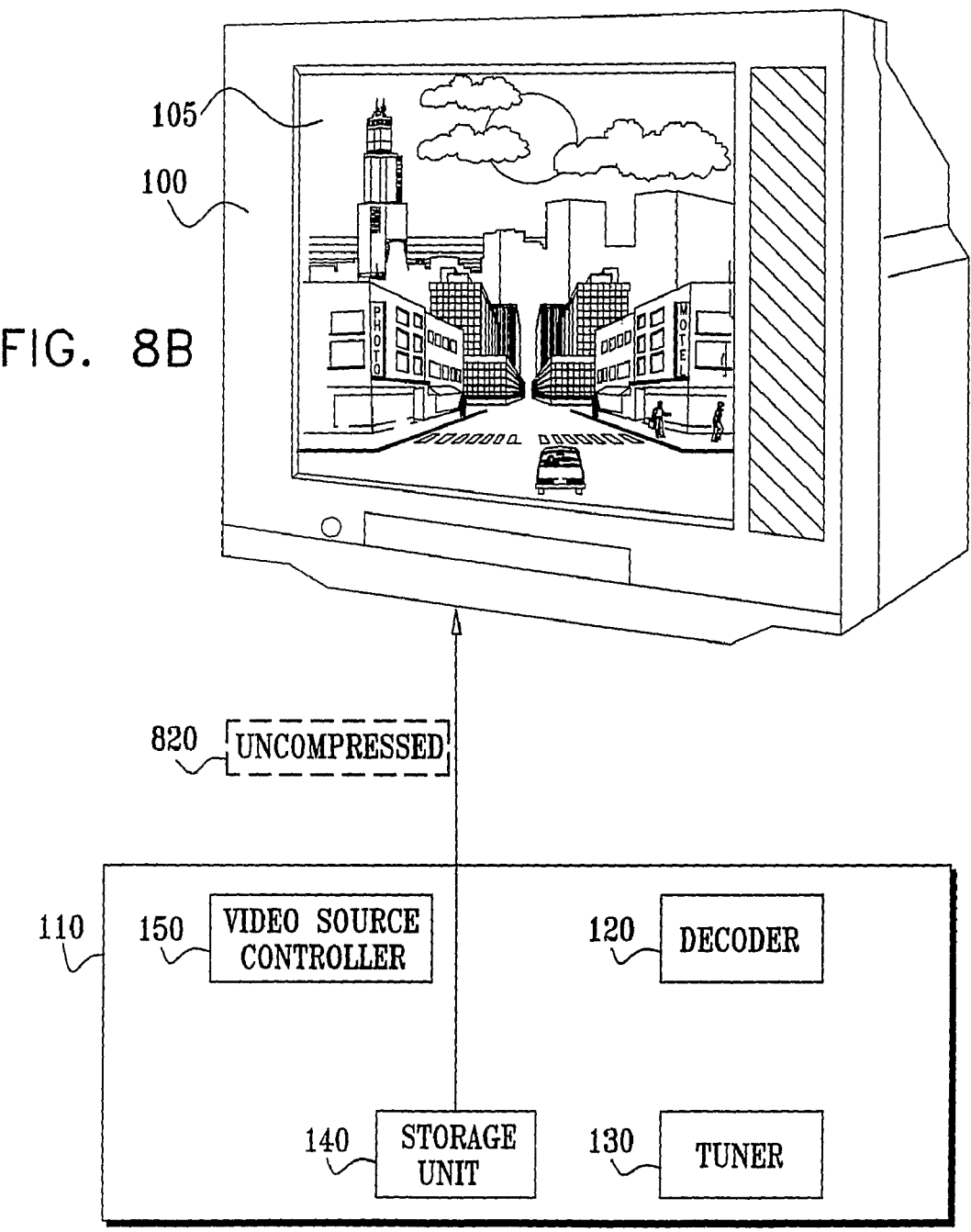

FIG. 8B depicts the system of FIG. 8A, where the VSC 150 has caused:
  the storage unit 140 to stop sending the compressed video segment 800 of FIG. 8A to the decoder 120; and
  the storage unit 140 to retrieve an uncompressed video segment 820 and send the uncompressed video segment 820 for display to the video display 100.

During the time when the system of FIG. 1 is in the state depicted by FIG. 8B, the display screen 105 of the video display 100 displays at least a portion of the uncompressed video segment 820 from the storage unit 140.

FIG. 8C depicts the system of FIG. 8B, where the VSC 150 has caused:
  the storage unit 140 to additionally retrieve a compressed video segment 830, and send the compressed video segment 830 to the decoder 120; and
  the decoder 120 to decompress the compressed video segment 830; however, the decoder 120 does not send output to the video display 100.

During the time when the system of FIG. 1 is in the state depicted by FIG. 8C, the display screen 105 of the video display 100 continues to display at least a portion of the uncompressed video segment 820 from the storage unit 140.

Figure 8D:
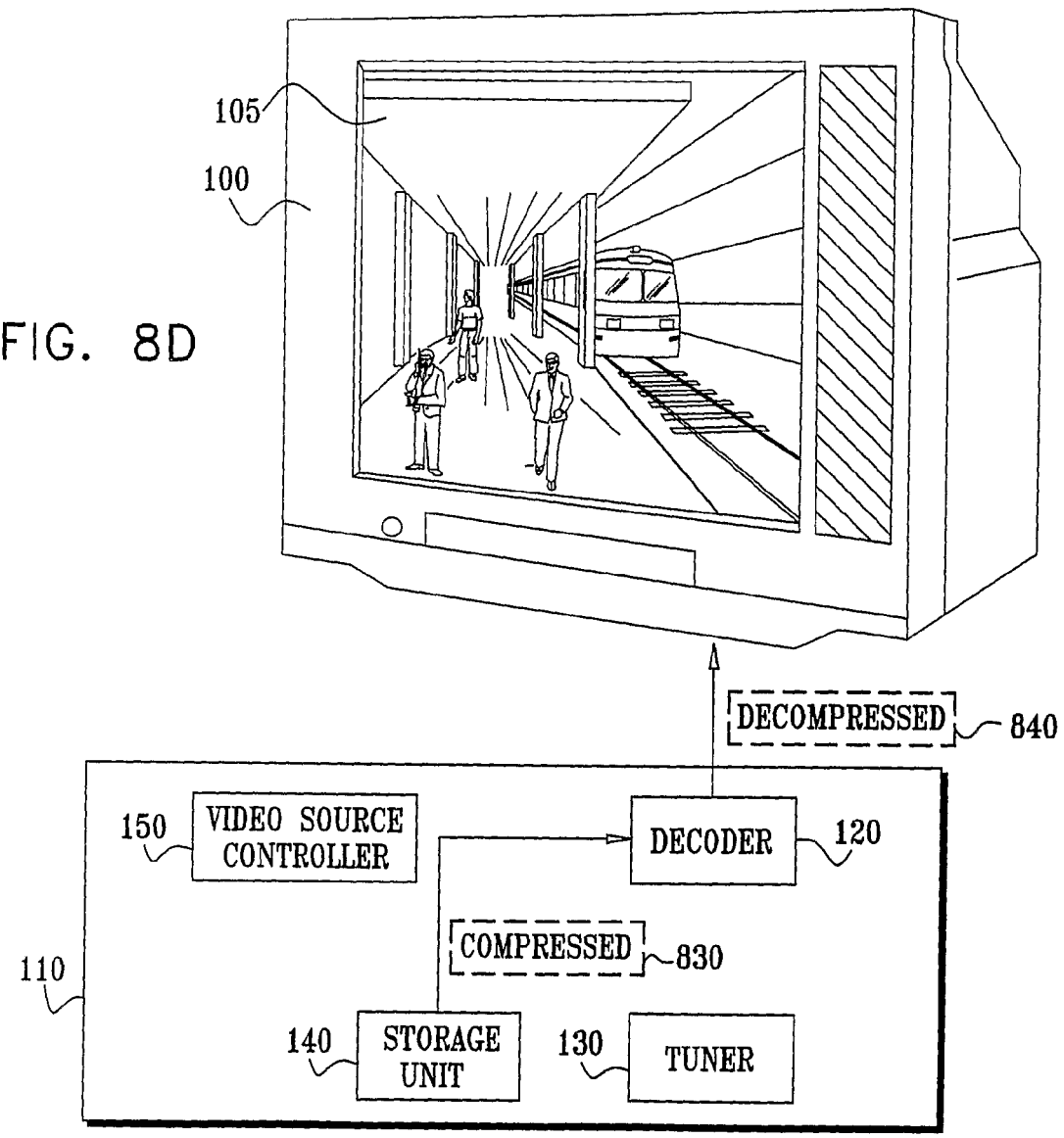

FIG. 8D depicts the system of FIG. 8C, where the VSC 150 has caused the decoder 120 to send a decompressed video segment 840, which corresponds to the compressed video segment 830, to the video display 100, and the storage unit 140 to stop sending the video segment 820 of FIG. 8C for display to the video display 100.

During the time when the system of FIG. 1 is in the state depicted by FIG. 8D, the display screen 105 of the video display 100 displays the decompressed video segment 840.

Reference is now made to FIG. 9, which is a simplified pictorial illustration of a timeline of switching from playing a first compressed video segment to playing a second compressed video segment, useful in understanding the preferred mode of operation of the system of FIG. 1 shown in FIGS. 8A-8D.

FIG. 9 depicts time from left to right, and the following from bottom to top:
  a timeline 900 including significant events;
  a first time bar 910 depicting a first compressed video segment A, which, by way of example and without limiting the generality of the foregoing, is a compressed recorded video segment;
  a second time bar 920 depicting a second compressed video segment B, which, by way of example and without limiting the generality of the foregoing, is another compressed recorded video segment;
  a third time bar 930 depicting the decoder 120 of FIG. 1;
  a fourth time bar 940 depicting the display screen 105 of the video display 100 of FIG. 1; and
  a fifth time bar 950 depicting an uncompressed video segment C, representing an uncompressed copy of a sub-segment of the video segment A.

The mode of operation of FIGS. 8A-8D is now further described using the timeline 900 of FIG. 9, following the timeline 900 from left to right:

At the start of the timeline 900, the compressed recorded video segment A 910 is provided as input 955 to the decoder 930; the decoder 930 decompresses the input 955 and produces a decompressed output 960. The decompressed output 960 of the decoder 930 is provided to the display screen 940. The display screen 940 displays decompressed segment A.

At the time labeled 965 of the timeline 900, the VSC 150 of FIG. 1 causes the uncompressed copy 950 to be provided as an input 975 to the display screen 940, and the compressed recorded video segment B 920 to be provided as an input 970 to the decoder 930. From this time on, the uncompressed copy 950 is provided as an input 975 to the display screen 940, freeing the decoder 930 to decompress the compressed recorded video segment B 920. The decoder 930 decompresses the compressed recorded video segment B 920, but the result of the decompression is not sent to the display screen 940. Persons skilled in the art will appreciate that a short period of time may elapse from the time the decoder 930 stops decompressing the compressed video segment A 910 to the time the decoder 930 starts decompressing the compressed video segment B 920; this elapsed time is not depicted in FIG. 9.

Persons skilled in the art will appreciate that if displaying the compressed recorded video segment B 920 from a specific video frame is desired, the decompression may have to begin from a random access point corresponding to one of the cases listed below:

1) The random access point precedes the specific video frame.
2) The random access point corresponds exactly to the specific video frame.

At the time labeled 980 of the timeline 900, the decoder 930 has decompressed enough data to display the beginning of the compressed recorded video segment B 920, and the VSC 150 of FIG. 1 causes the decoder 930 to stop decompressing the compressed recorded video segment B 920.

Persons skilled in the art will appreciate that all of the cases described above are depicted in FIG. 9 in the transition from the time labeled 965 to the time labeled 980 of the timeline 900.

At the time labeled 985 of the timeline 900, the display of the uncompressed copy 950 ends, and the VSC 150 of FIG. 1 causes:
the compressed video segment B 920 to again be provided as input to decoder 930; and
the decoder 930 to send an output 995 to be provided as input to the display screen 940.

At the time labeled 985 of the timeline 900, the display switches from displaying the compressed recorded video segment A 910 to displaying the compressed recorded video segment B 920.

The VSC 150 of FIG. 1 may cause the display screen 940 to switch from displaying the uncompressed video segment C 950, to displaying the output 995 of the decoder 930 at any time after the decoder 930 has decompressed enough data to display an image, and until the display of the uncompressed video segment C 950 ends. FIG. 9 depicts a case where the VSC 150 of FIG. 1 has caused a switch at the end of the uncompressed video segment C 950. The operation of another alternative preferred embodiment of the system depicted in FIG. 1 is now described.

Reference is now made to FIGS. 10A-10D, which are simplified pictorial illustrations of a preferred mode of operation of an alternative preferred embodiment of the system of FIG. 1.

FIGS. 10A-10D depict a sequence of states, over time, of the system of FIG. 1. The transition between states is controlled by the VSC 150.

In the alternative preferred embodiment of FIGS. 10A-10D a first compressed video segment is continuously decompressed into a buffer, and played out from the buffer after a short time lag. When switching from the first compressed video segment to a second compressed video segment, the display of the first video segment is continued from the buffer, while a decoder starts decompressing the second compressed video segment. When the decoder has decompressed enough of the second compressed video the display switches from displaying the first video segment to displaying the second video segment.

Figure 10A:
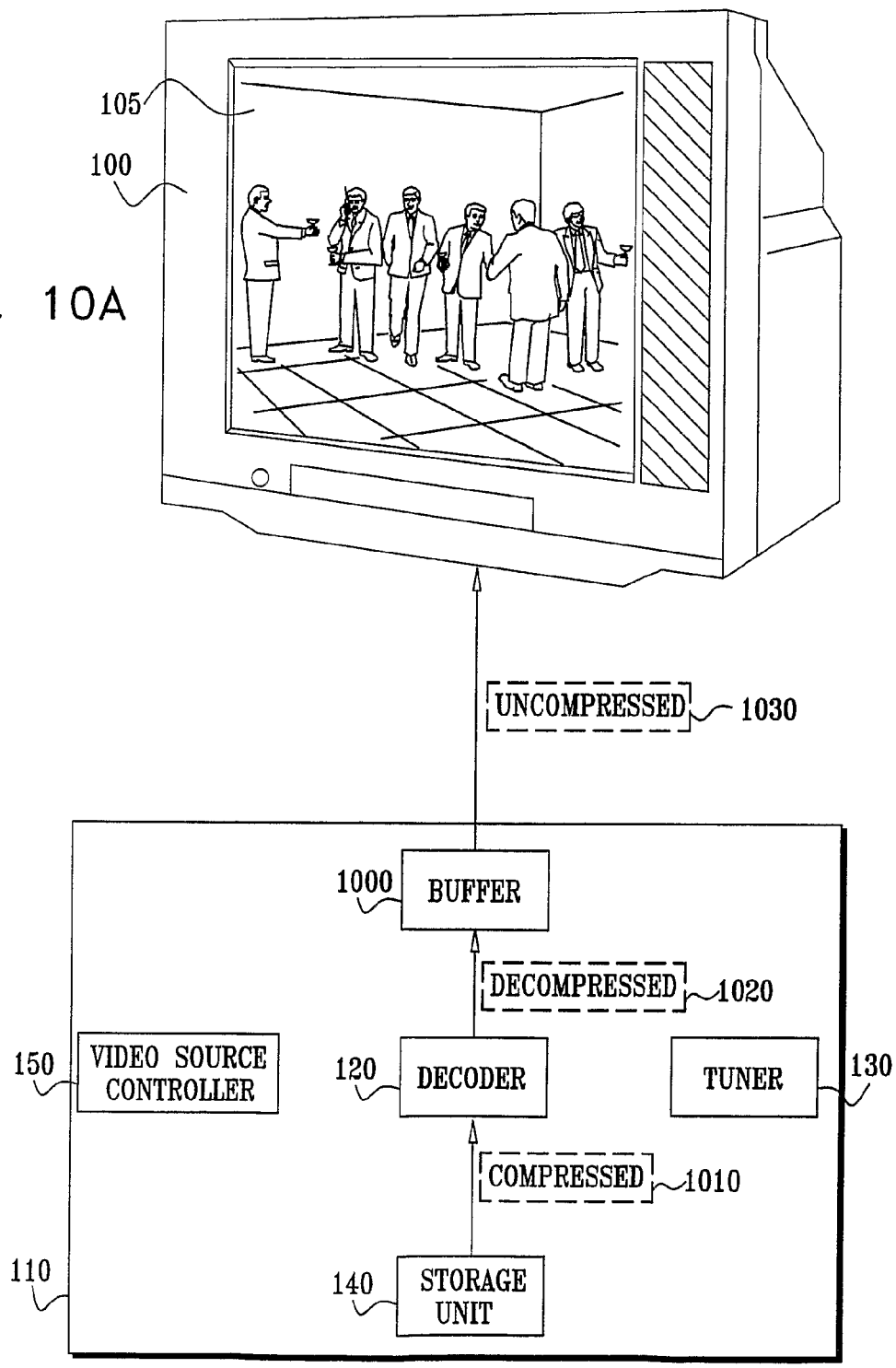
FIGS. 10A-10D are simplified pictorial illustrations of another alternative preferred mode of operation of the system of FIG. 1.

FIG. 10A comprises the components of FIG. 1, whereby the STB 110 of FIG. 1 further comprises a buffer 1000 operative to store and retrieve uncompressed video output from the decoder 120. The components comprised in the STB 110 are described throughout the present specification in terms of their functionality. Persons skilled in the art will appreciate that some of the components comprised in the STB 110 which are described as separate components may be implemented together in any appropriate combination.

In FIG. 10A the storage unit 140 sends a compressed video segment 1010 to the decoder 120. Persons skilled in the art will appreciate that the compressed video segment 1010 may originate in the storage unit 140 or may be received, through any appropriate conventional mechanism, from a source external to the system of FIG. 1 such as, for example, a live broadcast.

The decoder 120 decompresses the compressed video segment 1010, producing a decompressed output 1020 as input to the buffer 1000.

The buffer 1000 produces an uncompressed output 1030 as input for the video display 100.

During the time when the system of FIG. 1 is in the state depicted by FIG. 10A, the display screen 105 of the video display 100 displays the uncompressed video segment 1030.

Figure 10B:
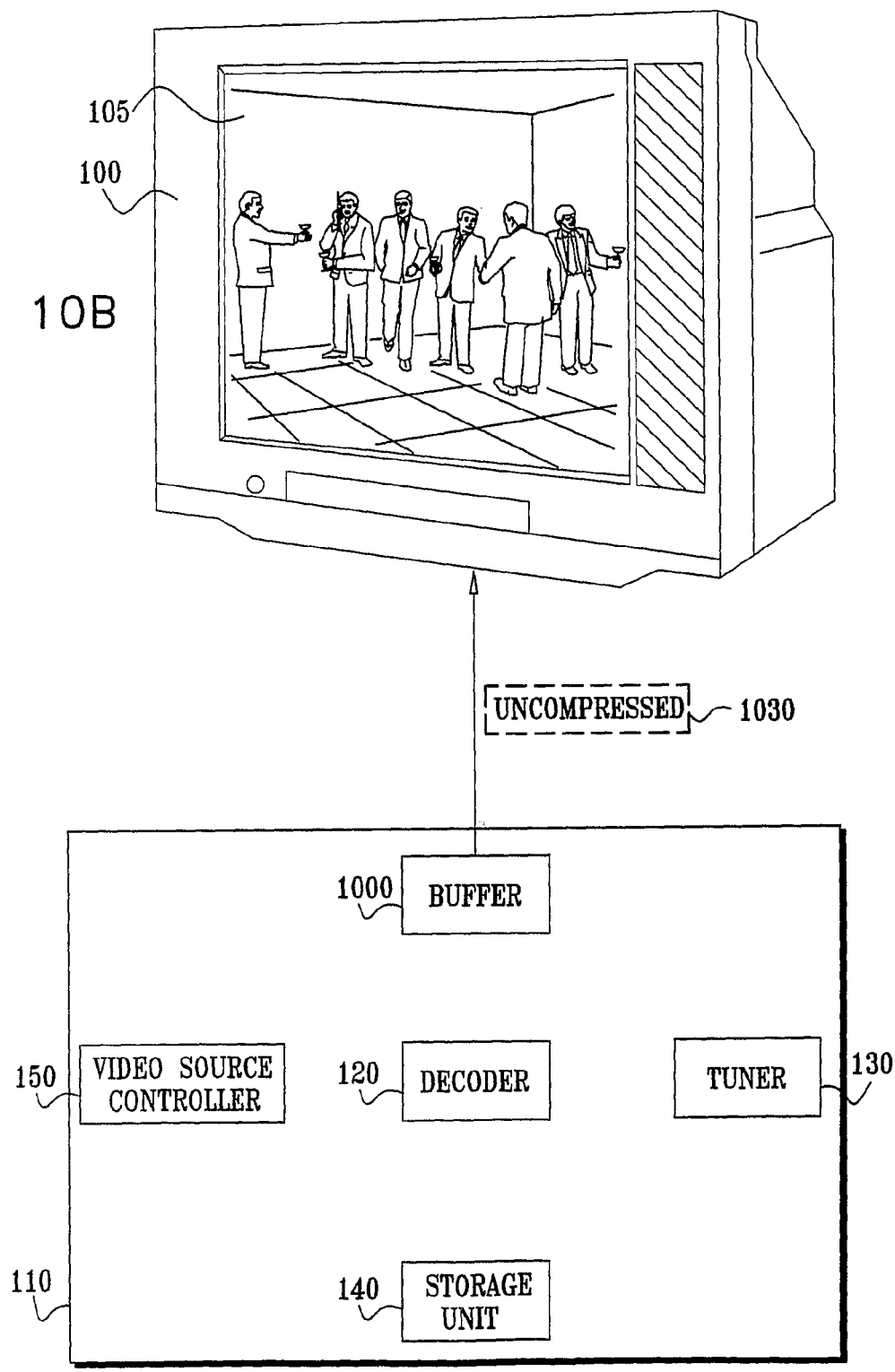

FIG. 10B depicts the system of FIG. 10A, where the VSC 150 has caused:
the storage unit 140 to stop sending the compressed video segment 1010 to the decoder 120; and
the decoder 120 to stop sending the decompressed output 1020 as input to the buffer 1000.

During the time when the system of FIG. 1 is in the state depicted by FIG. 10B, the display screen 105 of the video display 100 continues to display the uncompressed video segment 1030 which is output from the buffer 1000.

Figure 10C:
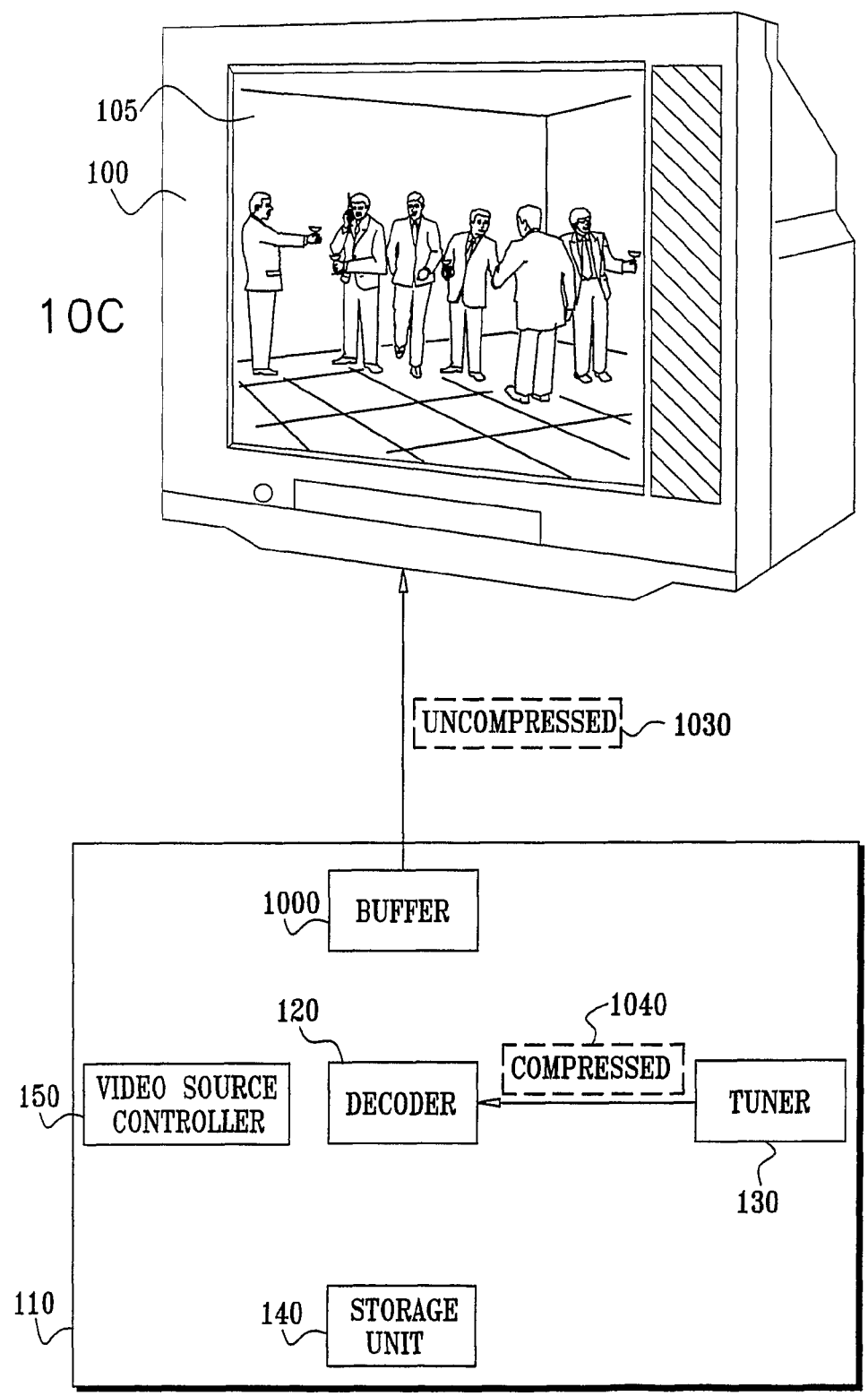

FIG. 10C depicts the system of FIG. 10B, where the VSC 150 has caused the tuner 130 to provide a compressed video segment 1040, and send the compressed video segment 1040 to the decoder 120.

During the time when the system of FIG. 1 is in the state depicted by FIG. 10C, the display screen 105 of the video display 100 continues to display the uncompressed video segment 1030 which is output from the buffer 1000.

Figure 10D:
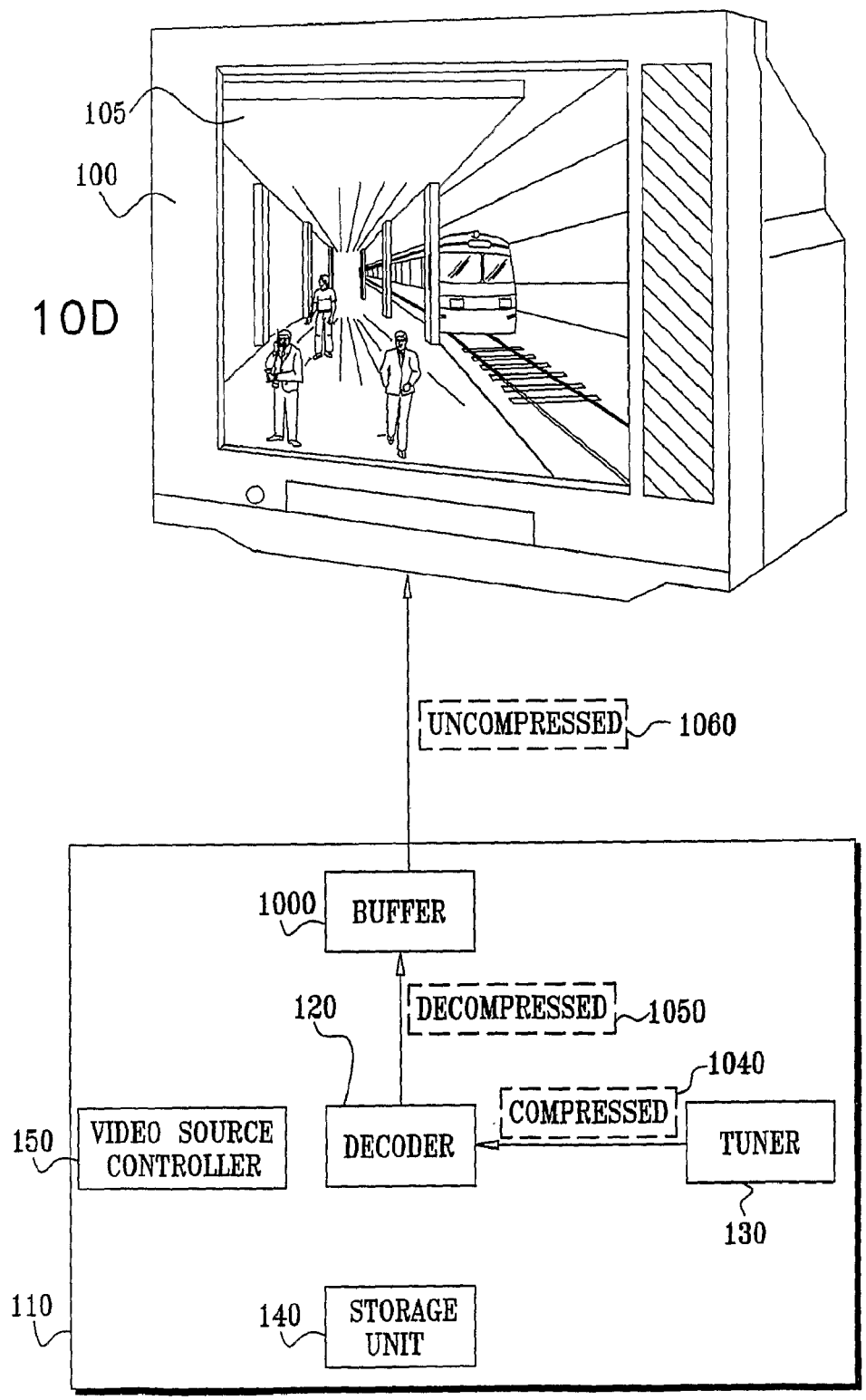
Figure 12:
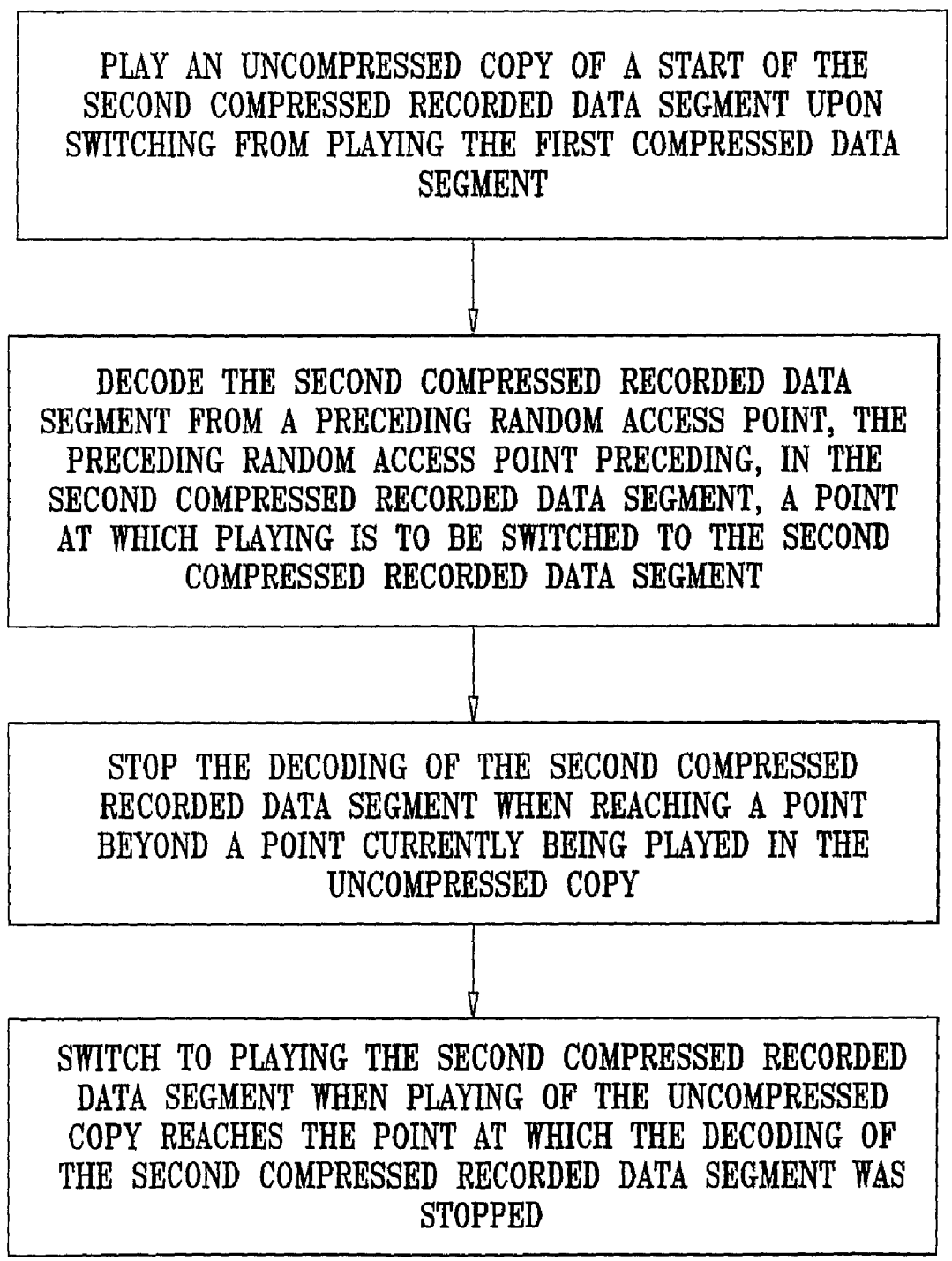
FIGS. 12-22 are simplified flowchart illustrations of various preferred methods of operation of the system of FIG. 1.
Figure 13:
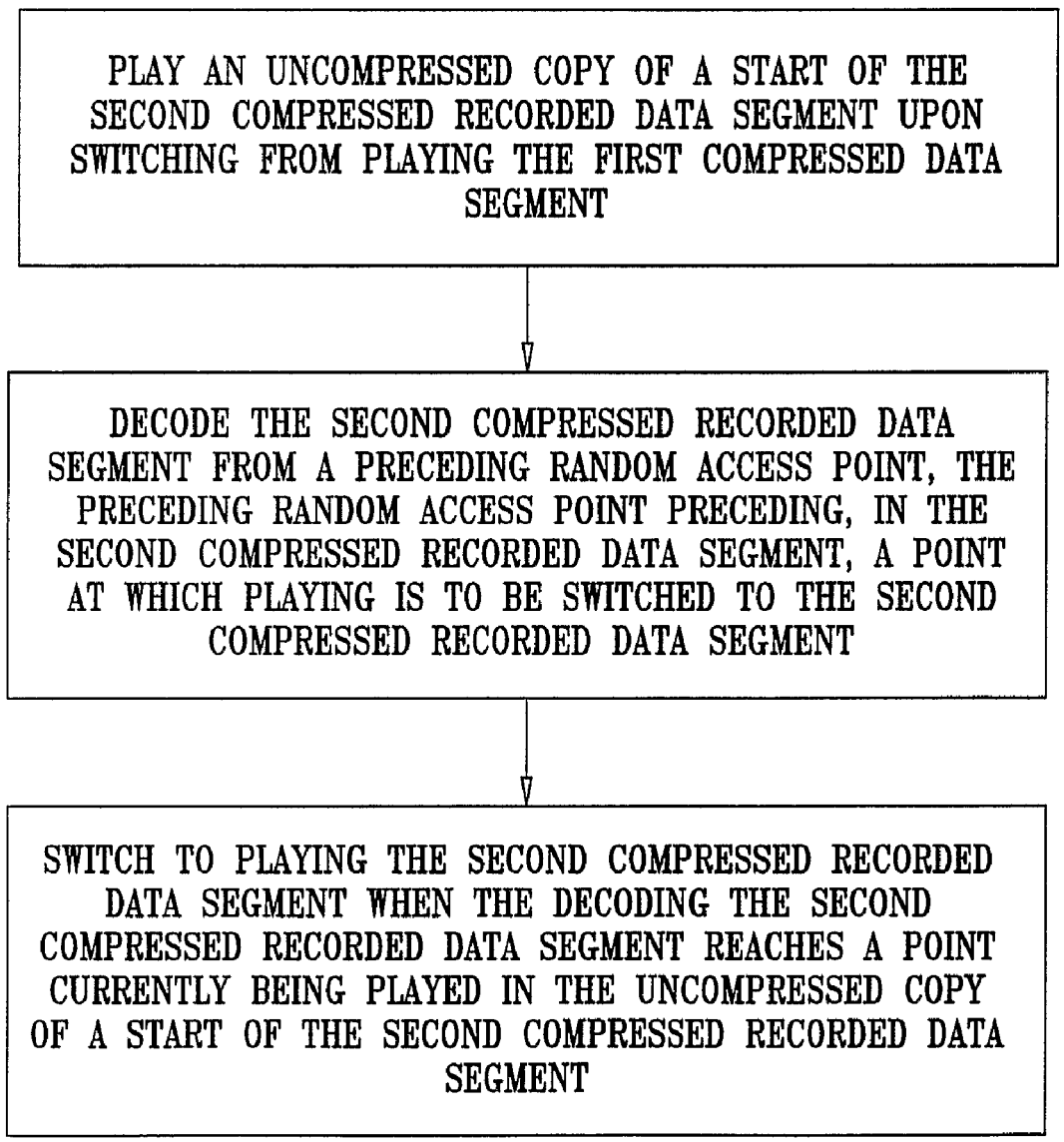
Figure 14:
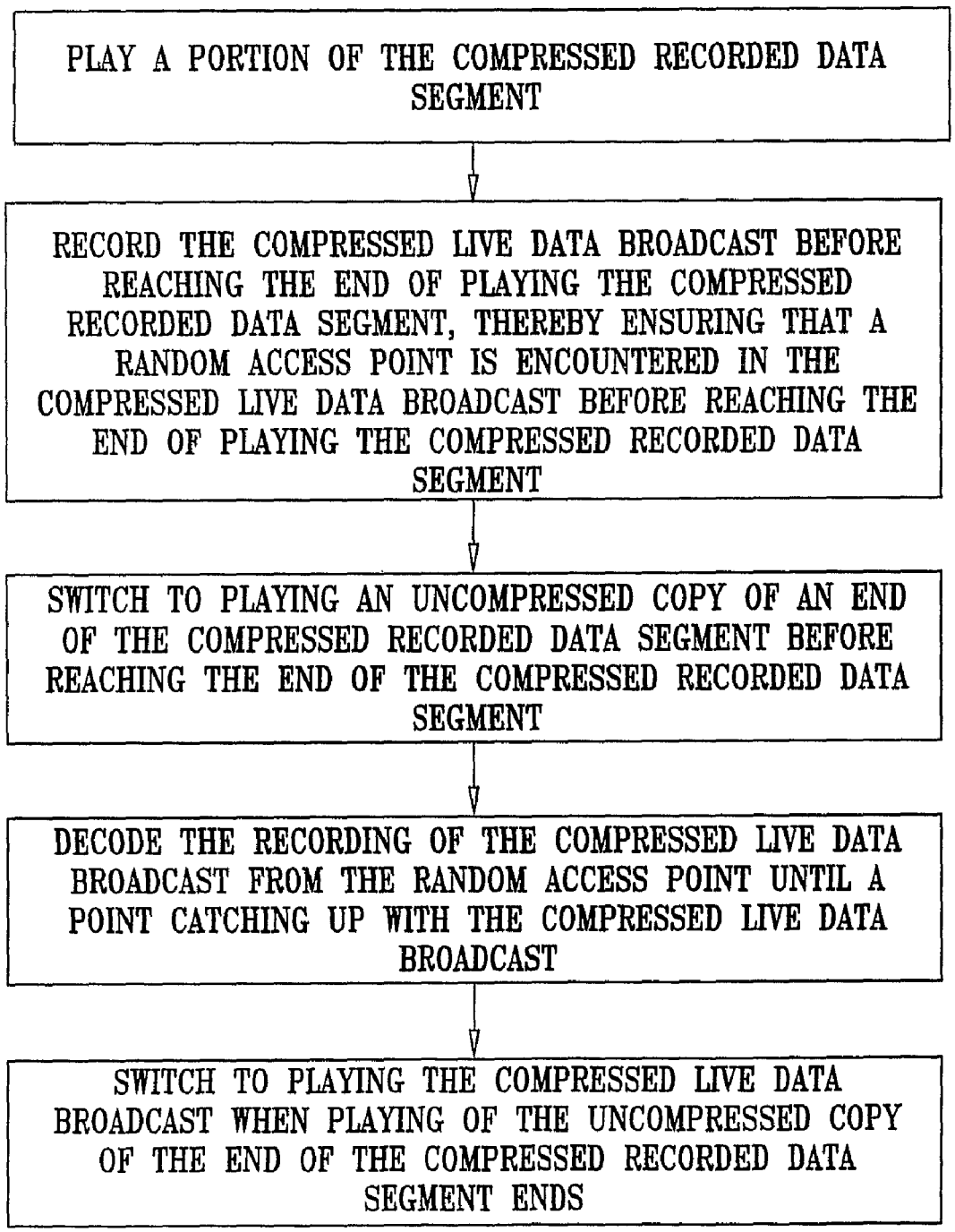
Figure 15:
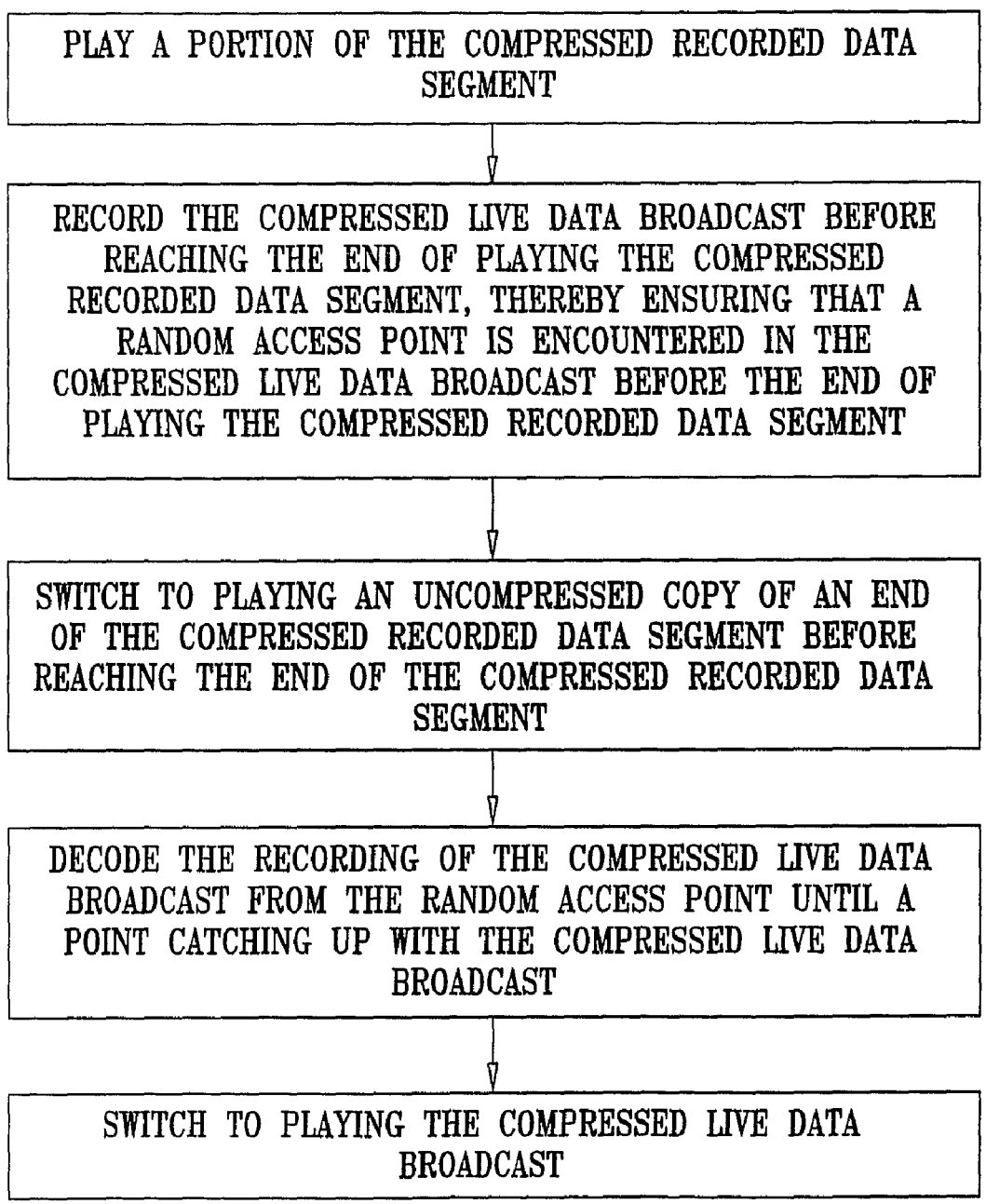
Figure 16:
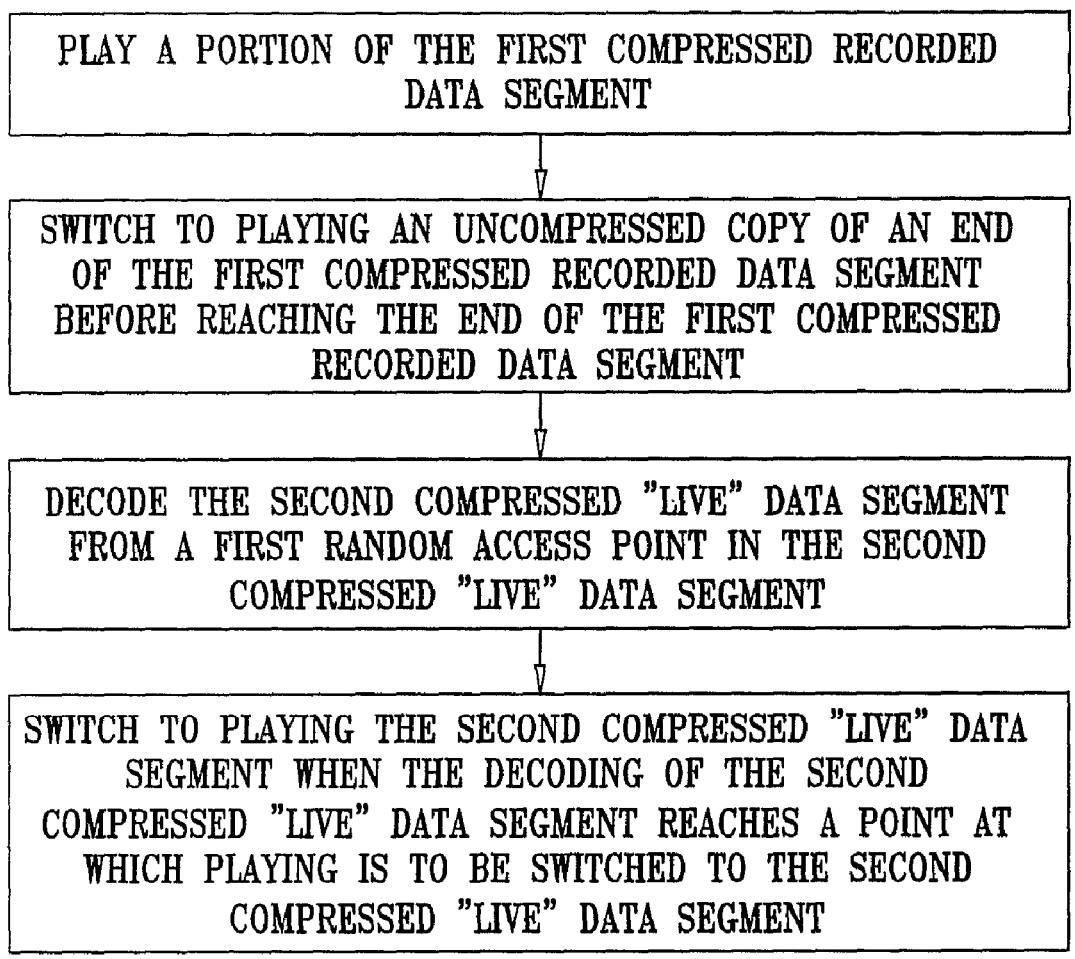
Figure 17:
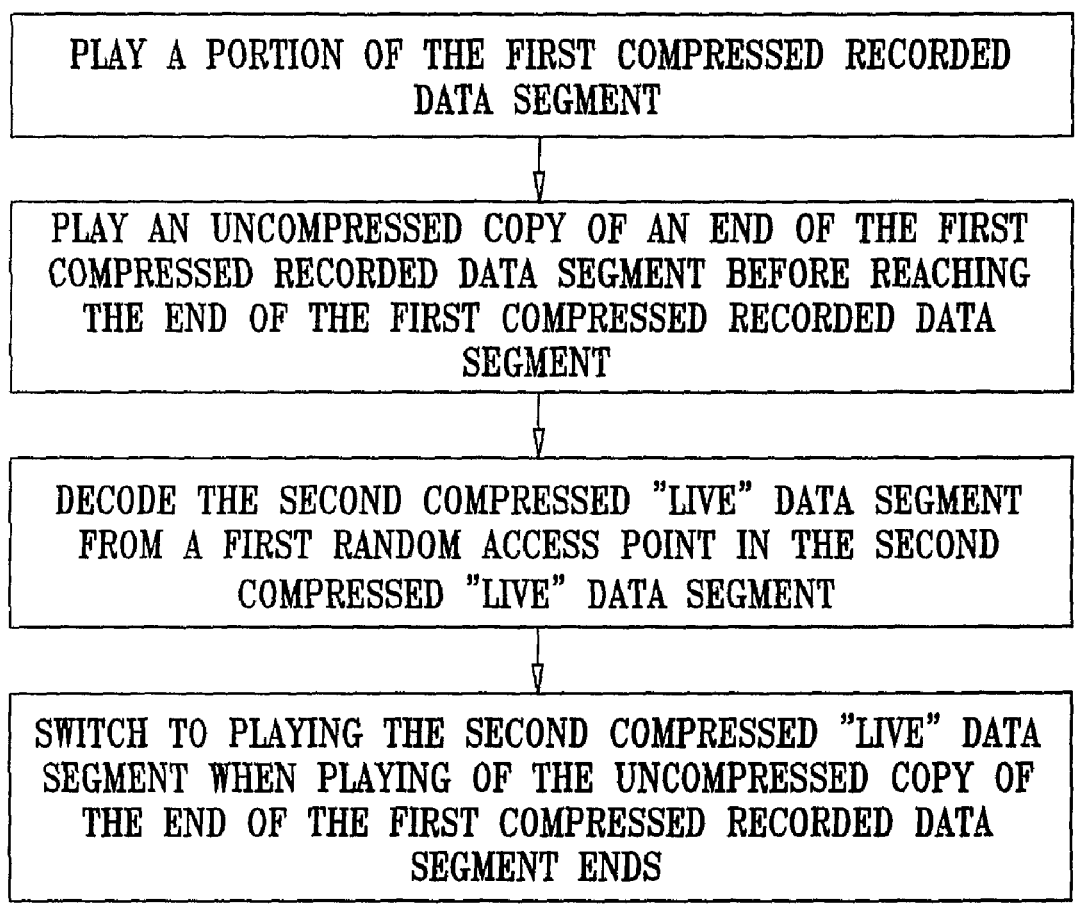
Figure 18:
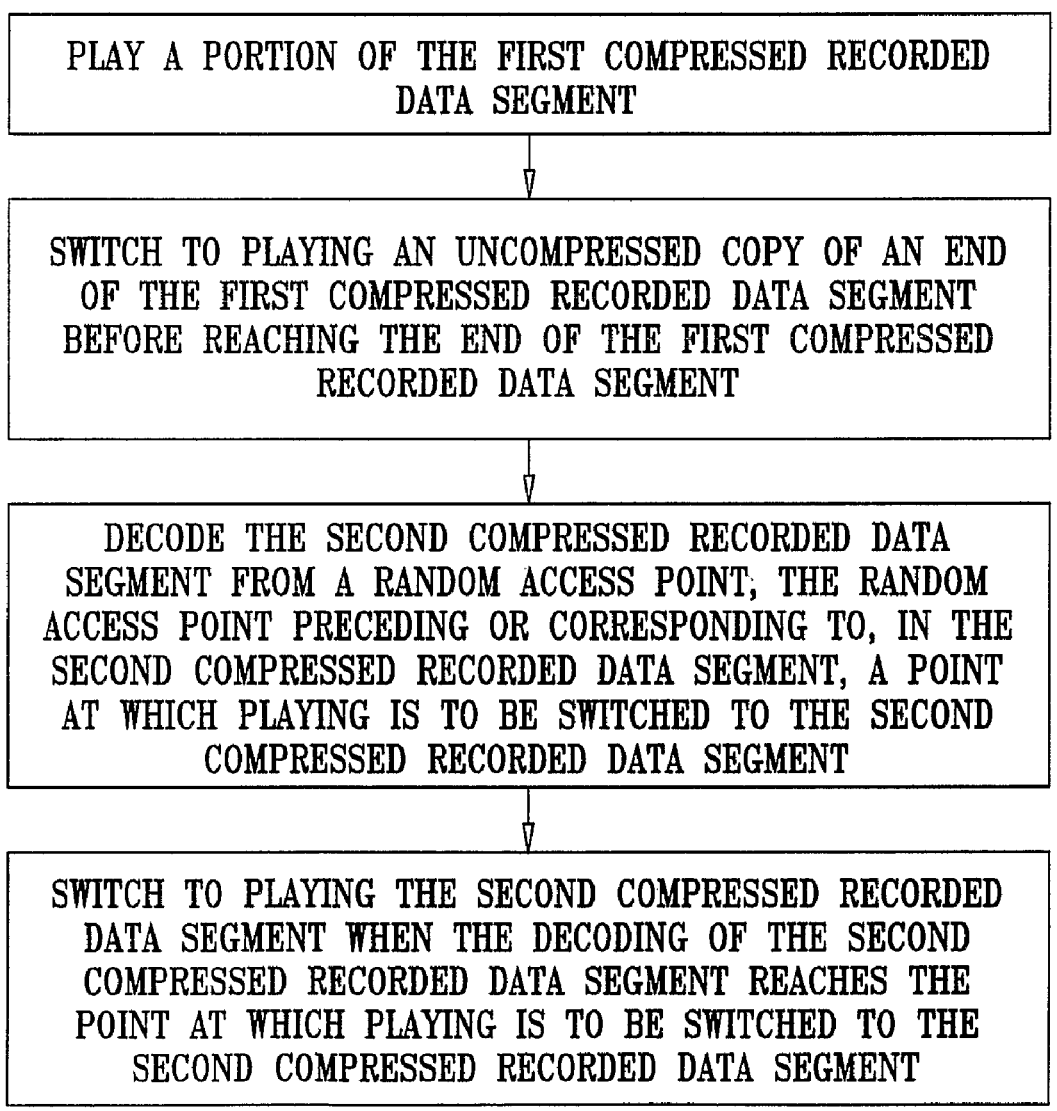
Figure 19:
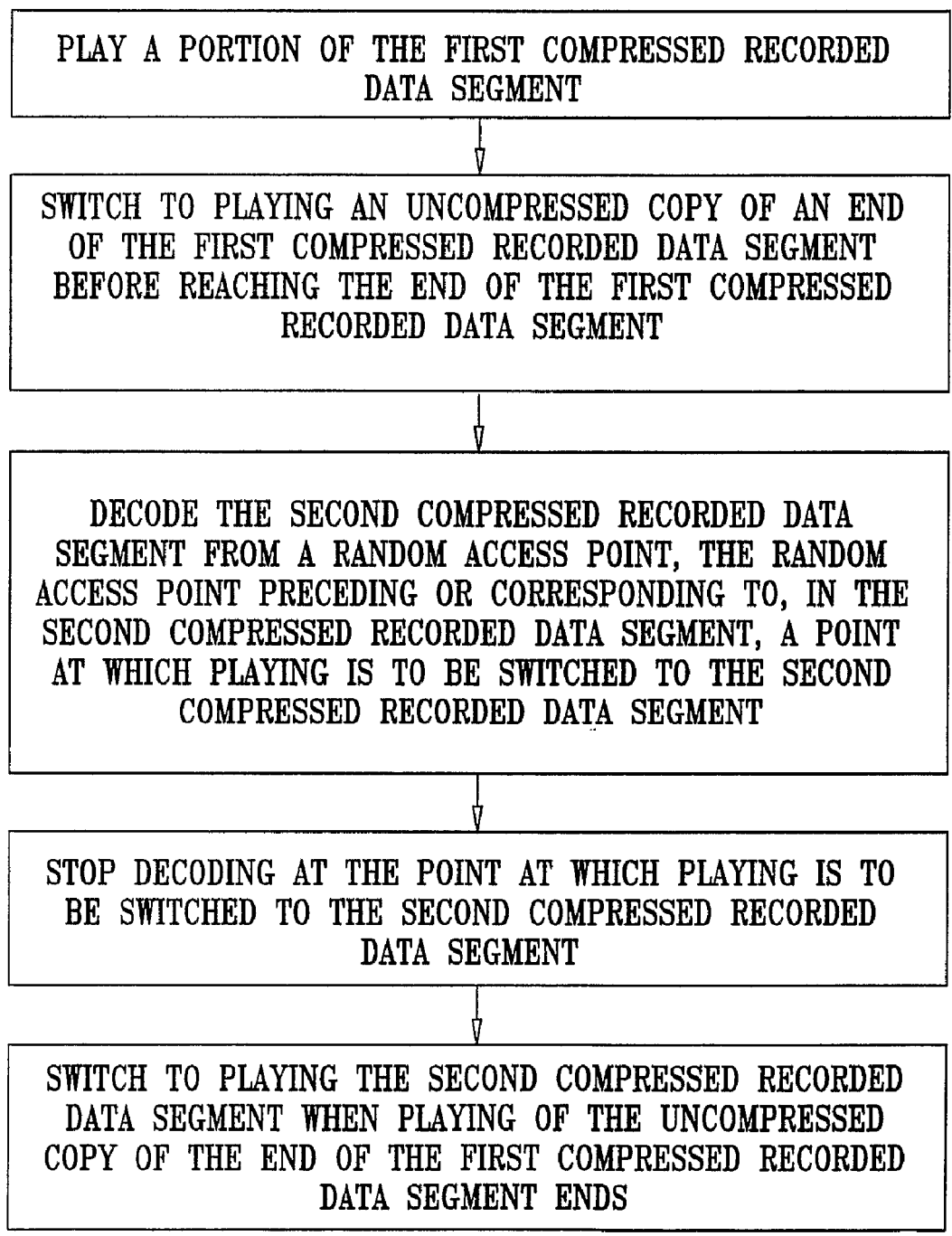
Figure 20:
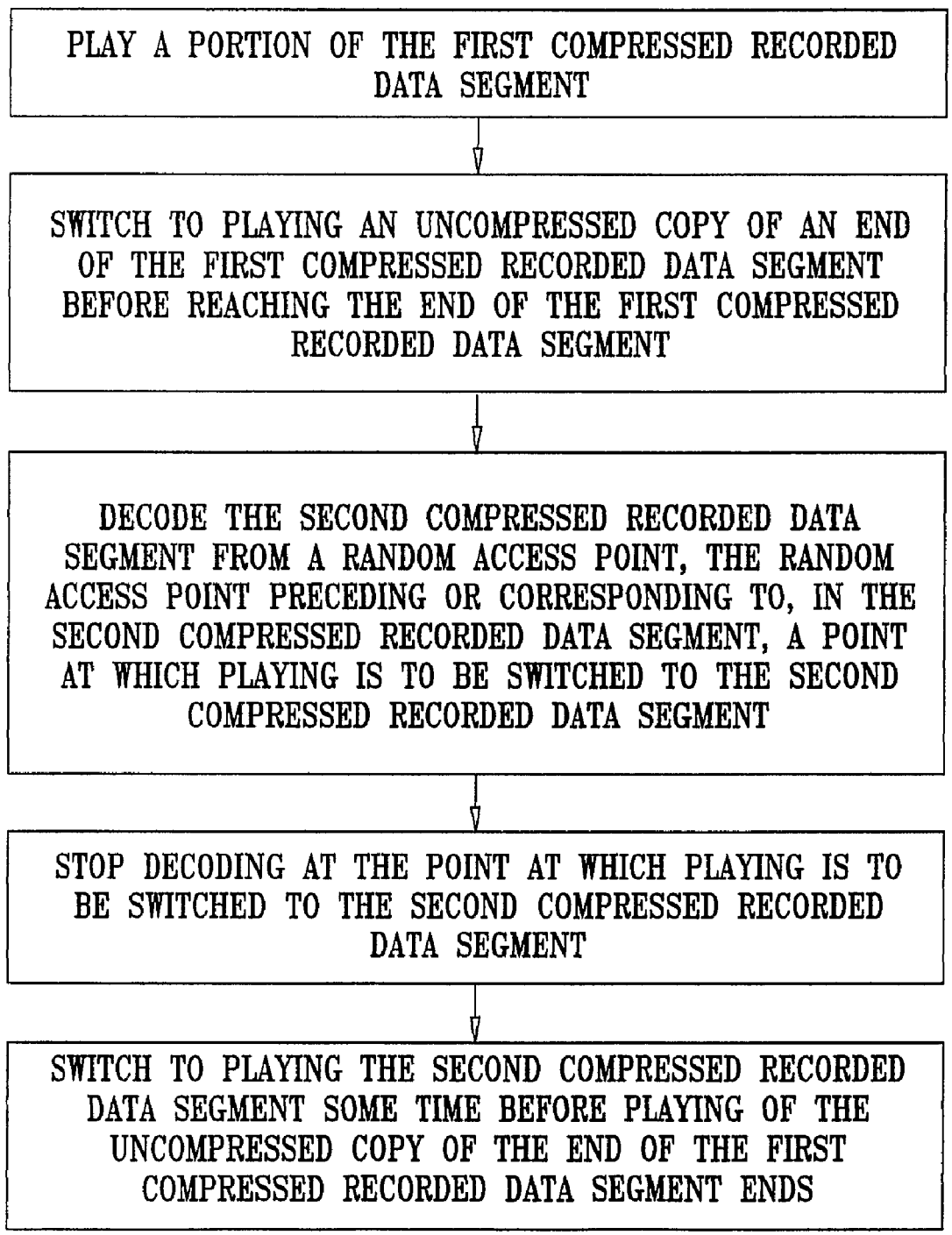
Figure 21:
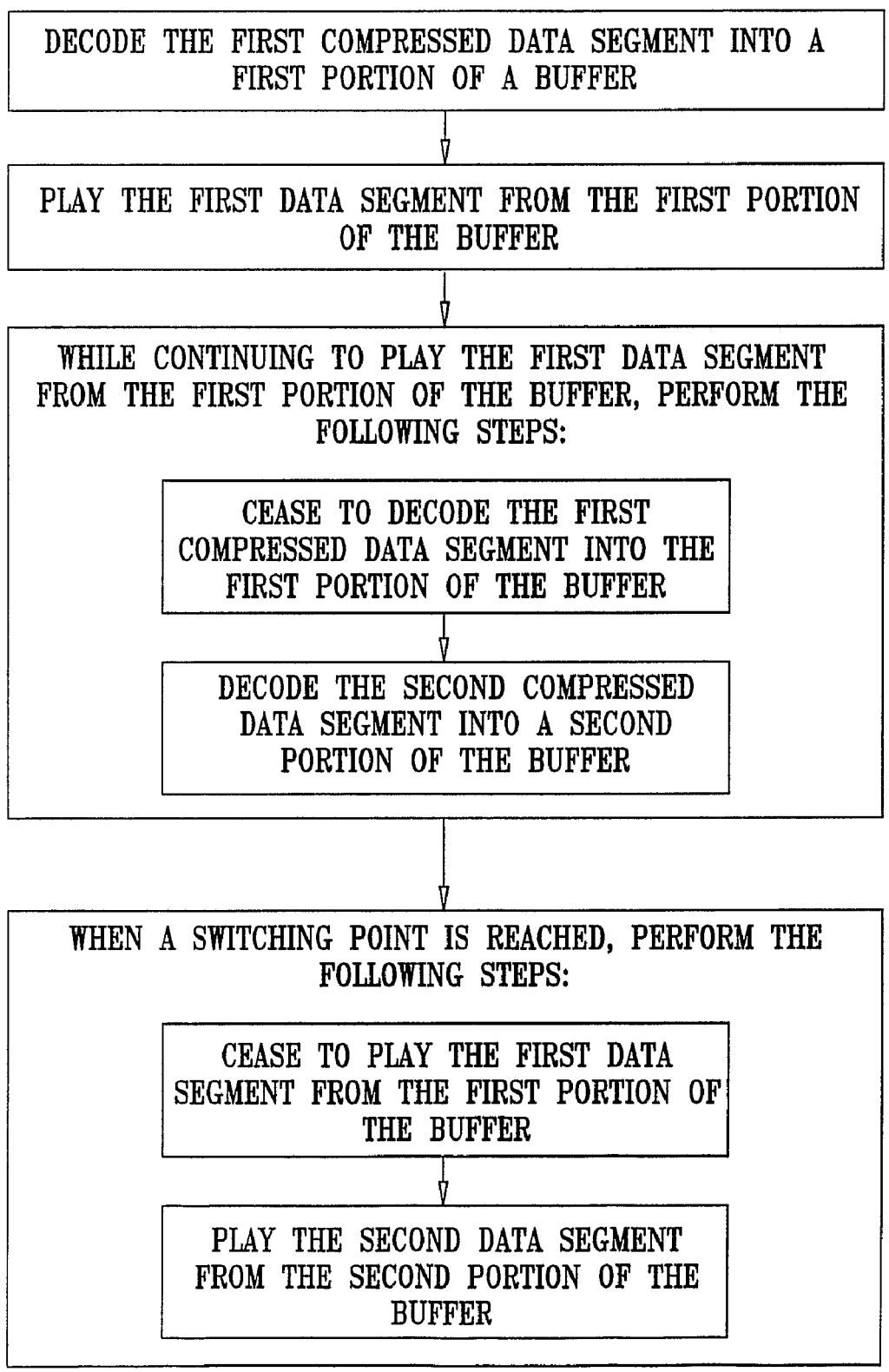
Figure 22:
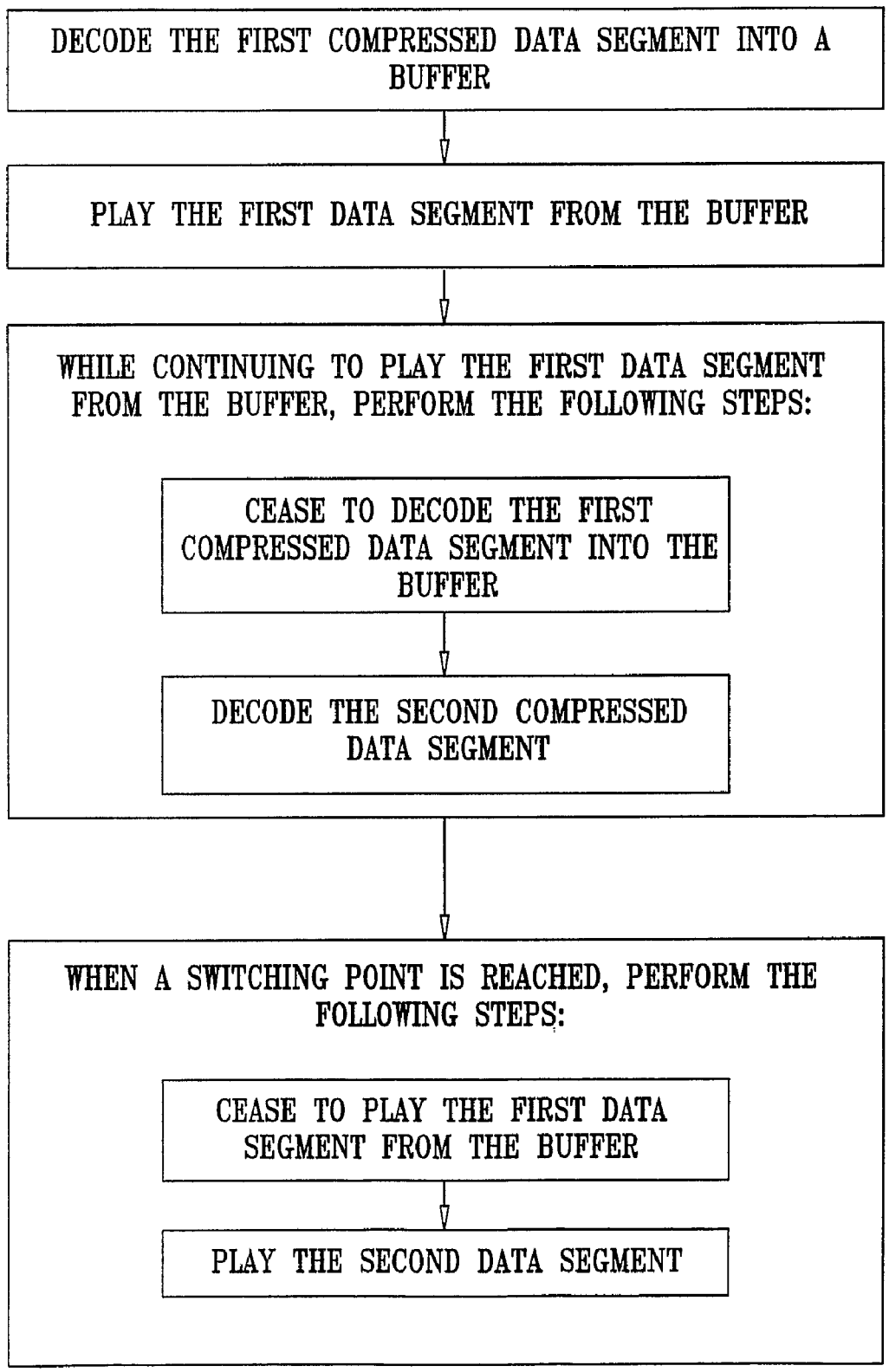

FIG. 10D depicts the system of FIG. 10C, where the decoder 120 has decoded enough data to display an image. At this point in time the VSC 150 has caused:
the decoder 120 to provide a decompressed output 1050 as input to the buffer 1000; and
the buffer 1000 to send an uncompressed output 1060, comprised of the decompressed input 1050, to the video display 100, replacing the former output 1030 of FIG. 10C.

During the time when the system of FIG. 1 is in the state depicted by FIG. 10D, the display screen 105 of the video display 100 displays the decompressed video segment 1060.

Reference is now made to FIG. 11, which is a simplified pictorial illustration of a timeline of switching from playing a first compressed video segment to playing a second compressed video segment, useful in understanding the preferred mode of operation of the system of FIG. 1 shown in FIGS. 10A-10D.

FIG. 11 depicts time from left to right, and the following from bottom to top:
a timeline 1100 including significant events;
a first time bar 1110 depicting a compressed video segment A, which, by way of example and without limiting the generality of the foregoing, is a compressed recorded video segment;
a second time bar 1120 depicting a compressed video segment B, which, by way of example and without limiting the generality of the foregoing, is a compressed "live" video segment;
a third time bar 1130 depicting the decoder 120 of FIG. 10A;
a fourth time bar 1140 depicting the buffer 1000 of FIG. 10A; and a fifth time bar 1150 depicting the display screen 105 of the video display 100 of FIG. 10A.

The mode of operation of FIGS. 10A-10D is now further described using the timeline 1100 of FIG. 11, following the timeline 1100 from left to right:

At the start of the timeline 1100, the compressed recorded video segment 1110 is provided as input 1155 to the decoder 1130; the decoder 1130 decompresses the input 1155 and produces a decompressed output 1160; the decompressed output 1160 of the decoder 1130 is provided as input to the buffer 1140; the buffer 1140 accepts the decompressed output 1160 of the decoder 1130 and provides a time-delayed output 1165 to the display screen 1150; and the display screen 1150 displays a time-delayed, decompressed, segment A.

At the time labeled 1175 of the timeline 1100, the VSC 150 of FIG. 10A causes the compressed video segment B 1120 to be provided as an input 1180 to the decoder 1130, replacing the compressed video segment A 1110, and the decoder 1130 to start decompressing the input 1180. The buffer 1140 continues providing the time-delayed output 1165 to the display screen 1150, and the display screen 1150 continues to display a time-delayed, decompressed, segment A. Persons skilled in the art will appreciate that a short period of time may elapse from the time the decoder 1130 stops decompressing the compressed video segment A 1110 to the time the decoder 1130 starts decompressing the compressed video segment B 1120; this elapsed time is not depicted in FIG. 11.

At the time labeled 1190 of the timeline 1100, the decoder 330 has decompressed enough data to display an image. The VSC 150 of FIG. 10A can cause, from this time on:

the decoder 1130 to provide an output 1195 comprised of the result of decompressing the input 1180; and the buffer 1140 to stop providing output 1165 and to start providing an output 1198 comprised of the input 1195 which the buffer 1140 receives from the decoder 1130, at some time-delay which may be equal to zero.

It is appreciated that once the decoder 330 has decompressed enough data to display an image, the VSC 150 of FIG. 1 may cause the display screen 1150 to switch from displaying the buffered decompressed contents of the compressed video segment A to displaying the buffered decompressed contents of the compressed video segment B at any moment until the display screen 1150 displays the end of the uncompressed A in the buffer.

From the time labeled 1190 of the timeline 1100 on, the display screen 1150 displays an uncompressed video segment B, and the buffer 1140 has lost some or all of the time delay.

Persons skilled in the art will appreciate that the relative lengths of the time bars in FIGS. 3, 5, 7, 9 and 11 are not indicative of the actual relative time spans, but rather of the logical mode of operation of the system of FIG. 1.

Reference is now made to FIGS. 12-22, which are simplified flowchart illustrations of various preferred methods of operation of the system of FIG. 1. FIGS. 12-22 are believed to be self-explanatory with reference to the above discussion of FIGS. 1-11.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for switching from playing a first compressed data segment to playing a second compressed recorded data segment, the method comprising:

retrieving an uncompressed copy of a start of the second compressed recorded data segment from a non-volatile storage;

playing the uncompressed copy of a start of the second compressed recorded data segment upon switching from playing the first compressed data segment;

decoding the second compressed recorded data segment from a preceding random access point, the preceding random access point preceding, in the second compressed recorded data segment, a point at which playing is to be switched to the second compressed recorded data segment, wherein for at least some of the time while the uncompressed copy is provided for display, the second compressed data segment is being decoded;

stopping the decoding of the second compressed recorded data segment when reaching a point beyond a point currently being played in the uncompressed copy; and switching from playing the uncompressed copy to playing the second compressed recorded data segment when playing the uncompressed copy of the start of the second compressed recorded data segment reaches the point at which the decoding of the second compressed recorded data segment was stopped.

2. The method according to claim 1 and wherein the first compressed data segment comprises a first compressed recorded, data segment.

3. The method according to claim 1 and wherein the first compressed data segment comprises a compressed broadcast data segment.

4. The method according to claim 3 and wherein the broadcast comprises one of the following:

a digital terrestrial broadcast;
a satellite broadcast;
a cable broadcast;
an Internet broadcast;
a 3GPP broadcast;
a 3GPP2 broadcast;
a DVB-H broadcast;
a DMB broadcast; and
a DAB broadcast.

5. The method according to claim 1 and wherein the second compressed recorded data segment comprises a recording of a compressed broadcast data segment.

6. The method according to claim 1 and wherein the first compressed data segment comprises a compressed live broadcast data segment.

7. The method according to claim 1 and wherein the preceding random access point precedes the start of the uncompressed copy.

8. The method according to claim 1 and wherein the preceding random access point corresponds with the start of the uncompressed copy.

9. The method according to claim 1 and wherein the preceding random access point follows the start of the uncompressed copy.

10. The method according to claim 1 and wherein the decoding comprises decoding the compressed recorded data segment from the preceding random access point at a faster than normal speed.

11. The method according to claim 1 and also comprising:

recording the first compressed data segment before reaching the end of playing the second compressed recorded data segment, thereby ensuring that a random access point is encountered in the first compressed data segment before the end of playing the second compressed recorded data segment;
switching to playing an uncompressed copy of an end of the second compressed recorded data segment before reaching the end of the second compressed recorded data segment;
decoding the recording of the first compressed data segment from the random access point until a point catching up with the first compressed data segment; and
switching to playing the first compressed data segment.

12. The method according to claim 11 and wherein the first compressed data segment comprises a compressed live broadcast data segment.

13. The method according to claim 11 and wherein the switching to playing the first compressed data segment comprises:
switching to playing the first compressed data segment when playing of the uncompressed copy of the end of the second compressed recorded data segment ends.

14. The method according to claim 13 and wherein the first compressed data segment comprises a compressed live broadcast data segment.

15. The method according to claim 1 and wherein the data comprises at least one of the following:
digital video;
digital audio;
MPEG-2 encoded data; and
MPEG-4 encoded data.

16. A method for switching from playing a first compressed data segment to playing a second compressed recorded data segment, the method comprising:
retrieving an uncompressed copy of a start of the second compressed recorded data segment from a non-volatile storage;
playing the uncompressed copy of a start of the second compressed recorded data segment upon switching from playing the first compressed data segment;
decoding the second compressed recorded data segment from a preceding random access point, the preceding random access point preceding, in the second compressed recorded data segment, a point at which playing is to be switched to the second compressed recorded data segment, wherein for at least some of the time while the uncompressed copy is provided for display, the second compressed recorded data segment is being decoded; and
switching from playing the uncompressed copy to playing the second compressed recorded data segment when the decoding the second compressed recorded data segment reaches a point currently being played in the uncompressed copy of the start of the second compressed recorded data segment.

17. The method according to claim 16 and wherein the first compressed data segment comprises a first compressed recorded data segment.

18. The method according to claim 16 and wherein the first compressed data segment comprises a compressed broadcast data segment.

19. The method according to claim 16 and wherein the second compressed recorded data segment comprises a recording of a compressed broadcast data segment.

20. The method according to claim 16 and wherein the first compressed data segment comprises a compressed live broadcast data segment.

21. The method according to claim 16 and wherein the preceding random access point precedes the start of the uncompressed copy.

22. The method according to claim 16 and wherein the preceding random access point corresponds with the start of the uncompressed copy.

23. The method according to claim 16 and wherein the preceding random access point follows the start of the uncompressed copy.

24. The method according to claim 16 and wherein the decoding comprises decoding the compressed recorded data segment from the preceding random access point at a faster than normal speed.

25. The method according to claim 16 and also comprising:
recording the first compressed data segment before reaching the end of playing the second compressed recorded data segment, thereby ensuring that a random access point is encountered in the first compressed data segment before the end of playing the second compressed recorded data segment;
switching to playing an uncompressed copy of an end of the second compressed recorded data segment before reaching the end of the second compressed recorded data segment;
decoding the recording of the first compressed data segment from the random access point until a point catching up with the first compressed data segment; and
switching to playing the first compressed data segment.

26. The method according to claim 25 and wherein the first compressed data segment comprises a compressed live broadcast data segment.

27. The method according to claim 25 and wherein the switching to playing the first compressed data segment comprises:
switching to playing the first compressed data segment when playing of the uncompressed copy of the end of the second compressed recorded data segment ends.

28. The method according to claim 27 and wherein the first compressed data segment comprises a compressed live broadcast data segment.

29. A method for switching from playing a compressed recorded data segment to playing a compressed live data broadcast, the method comprising:
playing a portion of the compressed recorded data segment;
recording the compressed live data broadcast before reaching the end of playing the compressed recorded data segment, thereby ensuring that a random access point is encountered in the compressed live data broadcast before reaching the end of playing the compressed recorded data segment;
retrieving an uncompressed copy of an end of the compressed recorded data segment from a non-volatile storage;
switching to playing the uncompressed copy of an end of the compressed recorded data segment before reaching the end of the compressed recorded data segment;
decoding the recording of the compressed live data broadcast from the random access point until a point catching up with the compressed live data broadcast, wherein for at least some of the time while the uncompressed copy is provided for display, the recording of the compressed live data broadcast is being decoded; and
switching from playing the uncompressed copy to playing the compressed live data broadcast when playing of the uncompressed copy of the end of the compressed recorded data segment ends.

30. The method according to claim 29 and wherein the decoding comprises decoding the recording of the compressed live data broadcast from the random access point at a faster than normal speed.

31. A method for switching from playing a compressed recorded data segment to playing a compressed live data broadcast, the method comprising:
 playing a portion of the compressed recorded data segment;
 recording the compressed live data broadcast before reaching the end of playing the compressed recorded data segment, thereby ensuring that a random access point is encountered in the compressed live data broadcast before the end of playing the compressed recorded data segment;
 retrieving an uncompressed copy of an end of the compressed recorded data segment from a non-volatile storage;
 switching to playing the uncompressed copy of an end of the compressed recorded data segment before reaching the end of the compressed recorded data segment;
 decoding the recording of the compressed live data broadcast from the random access point until a point catching up with the compressed live data broadcast, wherein for at least some of the time while the uncompressed copy is provided for display, the recording of the compressed live data broadcast is being decoded; and
 switching from playing the uncompressed copy to playing the compressed live data broadcast.

32. The method according to claim 31 and wherein the decoding comprises decoding the recording of the compressed live data broadcast from the random access point at a faster than normal speed.

33. A method for switching from playing a first compressed recorded data segment to playing a second compressed "live" data segment, the method comprising:
 playing a portion of the first compressed recorded data segment;
 retrieving an uncompressed copy of an end of the first compressed recorded data segment from a non-volatile storage;
 switching to playing the uncompressed copy of an end of the first compressed recorded data segment before reaching the end of the first compressed recorded data segment;
 decoding the second compressed "live" data segment from a first random access point in the second compressed "live" data segment, wherein for at least some of the time while the uncompressed copy is provided for display, the second compressed "live" data segment is being decoded; and
 switching from playing the uncompressed copy to playing the second compressed "live" data segment when the decoding of the second compressed "live" data segment reaches a point at which playing is to be switched to the second compressed "live" data segment.

34. The method according to claim 33 and wherein the decoding comprises decoding the second compressed "live" data segment from the first random access point at a faster than normal speed.

35. A method for switching from playing a first compressed recorded data segment to playing a second compressed "live" data segment, the method comprising:
 playing a portion of the first compressed recorded data segment;
 retrieving an uncompressed copy of an end of the first compressed recorded data segment from a non-volatile storage;
 playing the uncompressed copy of an end of the first compressed recorded data segment before reaching the end of the first compressed recorded data segment;
 decoding the second compressed "live" data segment from a first random access point in the second compressed "live" data segment, wherein for at least some of the time while the uncompressed copy is provided for display, the compressed "live" data segment is being decoded; and
 switching from playing the uncompressed copy to playing the second compressed "live" data segment when playing of the uncompressed copy of the end of the first compressed recorded data segment ends.

36. The method according to claim 35 and wherein the decoding comprises decoding the second compressed "live" data segment from the first random access point at a faster than normal speed.

37. A method for switching from playing a first compressed recorded data segment to playing a second compressed recorded data segment, the method comprising:
 playing a portion of the first compressed recorded data segment;
 retrieving an uncompressed copy of an end of the first compressed recorded data segment from a non-volatile storage;
 switching to playing the uncompressed copy of an end of the first compressed recorded data segment before reaching the end of the first compressed recorded data segment;
 decoding the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded; and
 switching from playing the uncompressed copy to playing the second compressed recorded data segment when the decoding of the second compressed recorded data segment reaches the point at which playing is to be switched to the second compressed recorded data segment.

38. The method according to claim 37 and wherein the decoding comprises decoding the second compressed recorded data segment from a preceding random access point at a faster than normal speed.

39. A method for switching from playing a first compressed recorded data segment to playing a second compressed recorded data segment, the method comprising:
 playing a portion of the first compressed recorded data segment;
 retrieving an uncompressed copy of an end of the first compressed recorded data segment from a non-volatile storage;
 switching to playing the uncompressed copy of an end of the first compressed recorded data segment before reaching the end of the first compressed recorded data segment;
 decoding the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded;

stopping decoding at the point at which playing is to be switched to the second compressed recorded data segment; and switching from playing the uncompressed copy to playing the second compressed recorded data segment when playing of the uncompressed copy of the end of the first compressed recorded data segment ends.

40. The method according to claim 39 and wherein the decoding comprises decoding the second compressed recorded data segment from a preceding random access point at a faster than normal speed.

41. A method for switching from playing a first compressed recorded data segment to playing a second compressed recorded data segment, the method comprising:

playing a portion of the first compressed recorded data segment;

retrieving an uncompressed copy of an end of the first compressed recorded data segment from a non-volatile storage;

switching to playing the uncompressed copy of an end of the first compressed recorded data segment before reaching the end of the first compressed recorded data segment;

decoding the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded;

stopping decoding at the point at which playing is to be switched to the second compressed recorded data segment; and switching from playing the uncompressed copy to playing the second compressed recorded data segment some time before playing of the uncompressed copy of the end of the first compressed recorded data segment ends.

42. The method according to claim 41 and wherein the decoding comprises decoding the second compressed recorded data segment from a preceding random access point at a faster than normal speed.

43. Apparatus for switching from playing a first compressed data segment to playing a second compressed recorded data segment comprising physical computing machinery including:

a source controller to: retrieve an uncompressed copy of a start of the second compressed recorded data segment from a non-volatile storage; and play the uncompressed copy upon switching from playing the first compressed data segment; and a decoder which, under control of the source controller, is operative to:

decode the second compressed recorded data segment from a preceding random access point, the preceding random access point preceding, in the second compressed recorded data segment, a point at which playing is to be switched to the second compressed recorded data segment, wherein for at least some of the time while the uncompressed copy is provided for display, the second compressed recorded data segment is being decoded; and stop the decoding of the second compressed recorded data segment upon receiving a signal from the source controller indicating that a point has been reached beyond a point currently being played in the uncompressed copy, wherein the source controller is operative to switch from playing the uncompressed copy to playing the second compressed recorded data segment when playing of the uncompressed copy reaches a point at which the decoding of the second compressed recorded data segment was stopped.

44. Apparatus for switching from playing a first compressed data segment to playing a second compressed recorded data segment comprising physical computing machinery including:

a source controller to: retrieve an uncompressed copy of a start of the second compressed recorded data segment from a non-volatile storage; and play the uncompressed copy upon switching from playing the first compressed data segment; and a decoder which, under control of the source controller, is operative to decode the second compressed recorded data segment from a preceding random access point, the preceding random access point preceding, in the second compressed recorded data segment, a point at which playing is to be switched to the second compressed recorded data segment, wherein for at least some of the time while the uncompressed copy is provided for display, the second compressed recorded data segment is being decoded, wherein the source controller is operative to switch from playing the uncompressed copy to playing the second compressed recorded data segment when the decoder which decodes the second compressed recorded data segment reaches a point currently being played in the uncompressed copy of a start of the second compressed recorded data segment.

45. Apparatus for switching from playing a compressed recorded data segment to playing a compressed live data broadcast comprising physical computing machinery including:

a source controller to play a portion of the compressed recorded data segment;

a recorder which, under control of the source controller, is operative to record the compressed live data broadcast before the source controller reaches the end of playing the compressed recorded data segment, thereby ensuring that a random access point is encountered in the compressed live data broadcast before the source controller reaches the end of playing the compressed recorded data segment; and a decoder which is operative to decode compressed data, wherein the source controller is operative to: retrieve an uncompressed copy of an end of the compressed recorded data segment from a non-volatile storage; and switch to playing the uncompressed copy before the source controller has reached the end of the compressed recorded data segment, the decoder, under control of the source controller, is operative to decode the recording of the compressed live data broadcast from the random access point until a point catching up with the compressed live data broadcast, wherein for at least some of the time while the uncompressed copy is provided for display, the compressed live data broadcast is being decoded, and the source controller is operative to switch from playing the uncompressed copy to playing the compressed live data broadcast when playing of the uncompressed copy of the end of the compressed recorded data segment ends.

46. Apparatus for switching from playing a compressed recorded data segment to playing a compressed live data broadcast comprising physical computing machinery including:
- a source controller to play a portion of the compressed recorded data segment;
- a recorder which, under control of the source controller, is operative to record the compressed live data broadcast before the source controller reaches the end of playing the compressed recorded data segment, thereby ensuring that a random access point is encountered in the compressed live data broadcast before the source controller reaches the end of playing the compressed recorded data segment; and
- a decoder which is operative to decode compressed data,
- wherein the source controller is operative to: retrieve an uncompressed copy of an end of the compressed recorded data segment from a non-volatile storage; and play the uncompressed copy before reaching the end of the compressed recorded data segment,
- the decoder, under control of the source controller, is operative to decode the recording of the compressed live data broadcast from the random access point until a point catching up with the compressed live data broadcast, wherein for at least some of the time while the uncompressed copy is provided for display, the compressed live data broadcast is being decoded, and
- the source controller is operative to switch from playing the uncompressed copy to playing the compressed live data broadcast.

47. Apparatus for switching from playing a first compressed recorded data segment to playing a second compressed "live" data segment comprising physical computing machinery including:
- a source controller to:
  - play a portion of the first compressed recorded data segment, and
  - retrieve an uncompressed copy of an end of the first compressed recorded data segment from a non-volatile storage;
  - switch to playing the uncompressed copy before reaching the end of the first compressed recorded data segment; and
- a decoder which, under control of the source controller, is operative to decode the second compressed "live" data segment from a first random access point in the second compressed "live" data segment, wherein for at least some of the time while the uncompressed copy is provided for display, the second compressed "live" data segment is being decoded,
- wherein the source controller is operative to switch from playing the uncompressed copy to playing the second compressed "live" data segment when the decoder which decodes the second compressed "live" data segment reaches a point at which playing is to be switched to the second compressed "live" data segment.

48. Apparatus for switching from playing a first compressed recorded data segment to playing a second compressed "live" data segment comprising physical computing machinery including:
- a source controller to:
  - play a portion of the first compressed recorded data segment; and
  - retrieve an uncompressed copy of an end of the first compressed recorded data segment from a non-volatile storage; and
  - switch to playing the uncompressed copy before reaching the end of the first compressed recorded data segment; and
- a decoder which, under control of the source controller, is operative to decode the second compressed "live" data segment from a first random access point in the second compressed "live" data segment, wherein for at least some of the time while the uncompressed copy is provided for display, the second compressed "live" data segment is being decoded,
- wherein the source controller is operative to switch from playing the uncompressed copy to playing the second compressed "live" data segment when playing of the uncompressed copy of the end of the first compressed recorded data segment ends.

49. Apparatus for switching from playing a first compressed recorded data segment to playing a second compressed recorded data segment comprising physical computing machinery including:
- a source controller to:
  - play a portion of the first compressed recorded data segment; and
  - retrieve an uncompressed copy of an end of the first compressed recorded data segment from a non-volatile storage; and
  - switch to playing the uncompressed copy before reaching the end of the first compressed recorded data segment; and
- a decoder which, under control of the source controller, is operative to decode the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded,
- wherein the source controller is operative to switch from playing the uncompressed copy to playing the second compressed recorded data segment when the decoder which decodes the second compressed recorded data segment reaches the point at which playing is to be switched to the second compressed recorded data segment.

50. Apparatus for switching from playing a first compressed recorded data segment to playing a second compressed recorded data segment comprising physical computing machinery including:
- a source controller to:
  - play a portion of the first compressed recorded data segment; and
  - retrieve an uncompressed copy of an end of the first compressed recorded data segment from a non-volatile storage; and
  - switch to playing the uncompressed copy before reaching the end of the first compressed recorded data segment; and
- a decoder which, under control of the source controller, is operative to:
  - decode the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded; and stop decoding upon receiving a signal from the source controller indicating that a point has been reached at which playing is to be switched to the second compressed recorded data segment, wherein the source controller is operative to switch from playing the uncompressed copy to playing the second compressed recorded data segment when playing of the uncompressed copy of the end of the first compressed recorded data segment ends.

51. Apparatus for switching from playing a first compressed recorded data segment to playing a second compressed recorded data segment comprising physical computing machinery including:

a source controller to:

play a portion of the first compressed recorded data segment; and retrieve an uncompressed copy of an end of the first compressed recorded data segment from a non-volatile storage; and switch to playing the uncompressed copy before reaching the end of the first compressed recorded data segment; and a decoder which, under control of the source controller, is operative to:

decode the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded; and stop decoding upon receiving a signal from the source controller indicating that a point has been reached at which playing is to be switched to the second compressed recorded data segment, wherein the source controller is operative to switch from playing the uncompressed copy to playing the second compressed recorded data segment some time before playing of the uncompressed copy of the end of the first compressed recorded data segment ends.

52. Apparatus for switching from playing a first compressed data segment to playing a second compressed recorded data segment comprising:

means for retrieving an uncompressed copy of a start of the second compressed recorded data segment from a non-volatile storage;

means for playing the uncompressed copy of a start of the second compressed recorded data segment upon switching from playing the first compressed data segment; and means for decoding which, under control of the means for playing, is operative to:

decode the second compressed recorded data segment from a preceding random access point, the preceding random access point preceding, in the second compressed recorded data segment, a point at which playing is to be switched to the second compressed recorded data segment, wherein for at least some of the time while the uncompressed copy is provided for display, the second compressed recorded data segment is being decoded; and stop the decoding of the second compressed recorded data segment upon receiving a signal from the means for playing indicating that a point has been reached beyond a point currently being played in the uncompressed copy, wherein the means for playing is operative to switch from playing the uncompressed copy to playing the second compressed recorded data segment when playing of the uncompressed copy reaches a point at which the decoding of the second compressed recorded data segment was stopped.

53. Apparatus for switching from playing a first compressed data segment to playing a second compressed recorded data segment comprising:

means for retrieving an uncompressed copy of a start of the second compressed recorded data segment from a non-volatile storage;

means for playing the uncompressed copy of a start of the second compressed recorded data segment upon switching from playing the first compressed data segment; and means for decoding which, under control of the means for playing, is operative to decode the second compressed recorded data segment from a preceding random access point, the preceding random access point preceding, in the second compressed recorded data segment, a point at which playing is to be switched to the second compressed recorded data segment, wherein for at least some of the time while the uncompressed copy is provided for display, the second compressed recorded data segment is being decoded, wherein the means for playing is operative to switch from playing the uncompressed copy to playing the second compressed recorded data segment when the means for decoding which decodes the second compressed recorded data segment reaches a point currently being played in the uncompressed copy of a start of the second compressed recorded data segment.

54. Apparatus for switching from playing a compressed recorded data segment to playing a compressed live data broadcast comprising:

means for playing a portion of the compressed recorded data segment;

means for recording which, under control of the means for playing, is operative to record the compressed live data broadcast before the means for playing reach the end of playing the compressed recorded data segment, thereby ensuring that a random access point is encountered in the compressed live data broadcast before the means for playing reach the end of playing the compressed recorded data segment; and means for decoding compressed data, wherein the means for playing is operative to: retrieve an uncompressed copy of an end of the compressed recorded data segment from a non-volatile storage; and switch to playing the uncompressed copy of an end of the compressed recorded data segment before the means for playing have reached the end of the compressed recorded data segment, the means for decoding, under control of the means for playing, being operative to decode the recording of the compressed live data broadcast from the random access point until a point catching up with the compressed live data broadcast, wherein for at least some of the time while the uncompressed copy is provided for display, the recording of the compressed live data broadcast is being decoded, and the means for playing being operative to switch from playing the uncompressed copy to playing the compressed live data broadcast when playing of the uncompressed copy of the end of the compressed recorded data segment ends.

55. Apparatus for switching from playing a compressed recorded data segment to playing a compressed live data broadcast comprising:
   means for playing a portion of the compressed recorded data segment;
   means for recording which, under control of the means for playing, is operative to record the compressed live data broadcast before the means for playing reach the end of playing the compressed recorded data segment, thereby ensuring that a random access point is encountered in the compressed live data broadcast before the means for playing reach the end of playing the compressed recorded data segment; and
   means for decoding compressed data,
   wherein the means for playing is operative to: retrieve an uncompressed copy of an end of the compressed recorded data segment from a non-volatile storage; and switch to playing the uncompressed copy of an end of the compressed recorded data segment before reaching the end of the compressed recorded data segment,
   the means for decoding, under control of the means for playing, is operative to decode the recording of the compressed live data broadcast from the random access point until a point catching up with the compressed live data broadcast, wherein for at least some of the time while the uncompressed copy is provided for display, the recording of the compressed live data broadcast is being decoded, and
   the means for playing is operative to switch from playing the uncompressed copy to playing the compressed live data broadcast.

56. Apparatus for switching from playing a first compressed recorded data segment to playing a second compressed "live" data segment comprising:
   means for playing which is operative to:
      play a portion of the first compressed recorded data segment, and
      retrieve an uncompressed copy of an end of the first compressed recorded data segment from a non-volatile storage; and
      switch to playing the uncompressed copy before reaching the end of the first compressed recorded data segment; and
   means for decoding which, under control of the means for playing, is operative to decode the second compressed "live" data segment from a first random access point in the second compressed "live" data segment, wherein for at least some of the time while the uncompressed copy is provided for display, the second compressed "live" data segment is being decoded,
   wherein the means for playing is operative to switch from playing the uncompressed copy to playing the second compressed "live" data segment when the means for decoding which decodes the second compressed "live" data segment reaches a point at which playing is to be switched to the second compressed "live" data segment.

57. Apparatus for switching from playing a first compressed recorded data segment to playing a second compressed "live" data segment comprising:
   means for playing which is operative to:
      play a portion of the first compressed recorded data segment; and
      retrieve an uncompressed copy of an end of the first compressed recorded data segment from a non-volatile storage; and
      switch to playing the uncompressed copy before reaching the end of the first compressed recorded data segment; and
   means for decoding which, under control of the means for playing, is operative to decode the second compressed "live" data segment from a first random access point in the second compressed "live" data segment, wherein for at least some of the time while the uncompressed copy is provided for display, the second compressed "live" data segment is being decoded,
   wherein the means for playing is operative to switch from playing the uncompressed copy to playing the second compressed "live" data segment when playing of the uncompressed copy of the end of the first compressed recorded data segment ends.

58. Apparatus for switching from playing a first compressed recorded data segment to playing a second compressed recorded data segment comprising:
   means for playing which is operative to:
      play a portion of the first compressed recorded data segment; and
      retrieve an uncompressed copy of an end of the first compressed recorded data segment from a non-volatile storage; and
      switch to playing the uncompressed copy before reaching the end of the first compressed recorded data segment; and
   means for decoding which, under control of the means for playing, is operative to decode the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded,
   wherein the means for playing is operative to switch from playing the uncompressed copy to playing the second compressed recorded data segment when the means for decoding which decodes the second compressed recorded data segment reaches the point at which playing is to be switched to the second compressed recorded data segment.

59. Apparatus for switching from playing a first compressed recorded data segment to playing a second compressed recorded data segment comprising:
   means for playing which is operative to:
      play a portion of the first compressed recorded data segment; and
      retrieve an uncompressed copy of an end of the first compressed recorded data segment from a non-volatile storage; and
      switch to playing the uncompressed copy before reaching the end of the first compressed recorded data segment; and
   means for decoding which, under control of the means for playing, is operative to:
      decode the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded; and stop decoding upon receiving a signal from the means for playing indicating that a point has been reached at which playing is to be switched to the second compressed recorded data segment, wherein the means for playing is operative to switch from playing the uncompressed copy to playing the second compressed recorded data segment when playing of the uncompressed copy of the end of the first compressed recorded data segment ends.

60. Apparatus for switching from playing a first compressed recorded data segment to playing a second compressed recorded data segment comprising:

means for playing which is operative to:

play a portion of the first compressed recorded data segment; and retrieve an uncompressed copy of an end of the first compressed recorded data segment from a non-volatile storage; and switch to playing the uncompressed copy before reaching the end of the first compressed recorded data segment; and means for decoding which, under control of the means for playing, is operative to:

decode the second compressed recorded data segment from a random access point, the random access point preceding or corresponding to, in the second compressed recorded data segment, a point at which playing is to be switched to the second compressed recorded data segment, wherein for at least some of the time while the uncompressed copy is provided for display, the second compressed recorded data segment is being decoded; and stop decoding upon receiving a signal from the means for playing indicating that a point has been reached at which playing is to be switched to the second compressed recorded data segment, wherein the means for playing is operative to switch from playing the uncompressed copy to playing the second compressed recorded data segment some time before playing of the uncompressed copy of the end of the first compressed recorded data segment ends.

* * * * *